US011120792B2

United States Patent
Kim et al.

(10) Patent No.: US 11,120,792 B2
(45) Date of Patent: Sep. 14, 2021

(54) SYSTEM FOR PROCESSING USER UTTERANCE AND CONTROLLING METHOD THEREOF

(71) Applicant: Samsung Electronics Co., Ltd., Gyeonggi-do (KR)

(72) Inventors: Jihyun Kim, Gyeonggi-do (KR); Gajin Song, Gyeonggi-do (KR); Dongho Jang, Gyeonggi-do (KR); Sangwook Kang, Gyeonggi-do (KR); Hyunwoo Kang, Gyeonggi-do (KR); Soojung Choi, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 90 days.

(21) Appl. No.: 16/296,467

(22) Filed: Mar. 8, 2019

(65) Prior Publication Data

US 2019/0279632 A1    Sep. 12, 2019

(30) Foreign Application Priority Data

Mar. 8, 2018  (KR) .......................... 10-2018-0027507

(51) Int. Cl.
  *G10L 15/22*  (2006.01)
  *G06F 3/16*  (2006.01)
  (Continued)

(52) U.S. Cl.
  CPC .............. *G10L 15/22* (2013.01); *G06F 3/167* (2013.01); *G10L 15/26* (2013.01); *G10L 13/00* (2013.01); *H04W 4/14* (2013.01)

(58) Field of Classification Search
  CPC ................................................... G10L 15/22
  See application file for complete search history.

(56) References Cited

U.S. PATENT DOCUMENTS 8,714,766 B2  5/2014  Schneider
9,526,127 B1  12/2016  Taubman et al.
(Continued)

FOREIGN PATENT DOCUMENTS

EP         2 575 128 A2    4/2013
KR   10-2005-0016929 A    2/2005
(Continued)

OTHER PUBLICATIONS

International Search Report dated Jul. 4, 2019.
European Search Report dated Feb. 23, 2021.

*Primary Examiner* — Jialong He
(74) *Attorney, Agent, or Firm* — Cha & Reiter, LLC

(57) ABSTRACT

An electronic device and method are disclosed. The electronic device includes a communication interface, a microphone, a speaker, a processor and a memory. The processor executes the method, including receiving a first message through a communication interface from an external device, in response to receiving a first user input associated with the first message through an input interface including a microphone, converting first text included in the first message into speech, outputting the speech through an output interface of the electronic device including a speaker, determining whether to execute an additional operation associated with the first message, based on at least one of a state of the first electronic device, the first message, and a second user input received via the microphone, and initiate a conversational mode for executing the additional operation based at least partly on the determination.

16 Claims, 33 Drawing Sheets

(51) Int. Cl.
*G10L 15/26* (2006.01)
*H04W 4/14* (2009.01)
*G10L 13/00* (2006.01)

(56) References Cited

U.S. PATENT DOCUMENTS

| | | |
|---|---|---|
| 9,602,672 B2 | 3/2017 | Engelhart, Sr. |
| 9,792,275 B2 | 10/2017 | Panemangalore et al. |
| 9,805,717 B2 | 10/2017 | Panemangalore et al. |
| 10,074,369 B2 | 9/2018 | Devaraj et al. |
| 10,102,854 B2 | 10/2018 | Gelfenbeyn et al. |
| 10,148,807 B2 | 12/2018 | Kim et al. |
| 2003/0167167 A1* | 9/2003 | Gong ............... G10L 15/22 704/250 |
| 2005/0032544 A1 | 2/2005 | Jei |
| 2008/0104169 A1* | 5/2008 | Combel ............... H04L 51/04 709/204 |
| 2011/0219080 A1* | 9/2011 | McWithey ............ H04L 67/18 709/206 |
| 2012/0016678 A1* | 1/2012 | Gruber ............... G06F 40/30 704/275 |
| 2012/0259633 A1 | 10/2012 | Aihara et al. |
| 2012/0265528 A1* | 10/2012 | Gruber ............. G10L 15/183 704/235 |
| 2013/0275875 A1* | 10/2013 | Gruber ............... H04L 67/12 715/728 |
| 2014/0074483 A1* | 3/2014 | van Os ............... G06F 3/167 704/275 |
| 2014/0195252 A1* | 7/2014 | Gruber ............... G10L 15/22 704/275 |
| 2014/0228008 A1 | 8/2014 | Engelhart, Sr. |
| 2015/0207939 A1 | 7/2015 | Engelhart, Sr. |
| 2015/0289119 A1* | 10/2015 | Singhal ............... H04W 4/14 455/466 |
| 2015/0373183 A1* | 12/2015 | Woolsey ............. H04M 1/7255 348/14.08 |
| 2016/0259780 A1 | 9/2016 | Panemangalore et al. |
| 2016/0260430 A1 | 9/2016 | Panemangalore et al. |
| 2016/0308799 A1* | 10/2016 | Schubert ............. H04L 51/02 |
| 2017/0110129 A1 | 4/2017 | Gelfenbeyn et al. |
| 2017/0132019 A1 | 5/2017 | Karashchuk et al. |
| 2017/0230497 A1 | 8/2017 | Kim et al. |
| 2018/0061402 A1 | 3/2018 | Devaraj et al. |
| 2018/0061403 A1 | 3/2018 | Devaraj et al. |
| 2018/0061404 A1 | 3/2018 | Devaraj et al. |
| 2018/0232203 A1 | 8/2018 | Gelfenbeyn et al. |
| 2018/0373398 A1* | 12/2018 | Seixeiro ............. H04M 1/00 |
| 2019/0027143 A1 | 1/2019 | Gelfenbeyn et al. |
| 2019/0124049 A1* | 4/2019 | Bradley ............. H04L 63/164 |

FOREIGN PATENT DOCUMENTS

| | | |
|---|---|---|
| KR | 10-2010-0066596 A | 6/2010 |
| KR | 10-2013-0135567 A | 12/2013 |
| KR | 10-2017-0093027 A | 8/2017 |

* cited by examiner

SYSTEM FOR PROCESSING USER UTTERANCE AND CONTROLLING METHOD THEREOF

CROSS-REFERENCE TO RELATED APPLICATION(S)

This application is based on and claims priority under 35 U.S.C. § 119 to Korean Patent Application No. 10-2018-0027507, filed on Mar. 8, 2018, in the Korean Intellectual Property Office, the disclosure of which is incorporated by reference herein its entirety.

BACKGROUND

1. Field

The present disclosure relates to a technology for processing a user utterance.

2. Description of Related Art

New input methods are being developed beyond conventional methods, such as keyboard or a mouse inputs. Electronic devices have recently begun supporting other input schemes, such as a voice input and the like. For example, electronic devices, such as smart phones or tablet personal computers (PCs), may receive a user voice (e.g., via a microphone), and responsively provide a service performing an operation corresponding to the user voice input.

The ability to recognize the user commands based on speech is dependent on speech recognition technology which is continually advancing, and includes natural language processing. Natural language processing refers to computer recognition that can detect an intent indicated by a user utterance, and generate a result matching the detected intent, in order to provide the user with a desired service.

The above information is presented as background information only to assist with an understanding of the present disclosure. No determination has been made, and no assertion is made, as to whether any of the above might be applicable as prior art with regard to the present disclosure.

SUMMARY

When an electronic device processes a user utterance requesting transmission or reception of a message, the electronic device may intermittently transmit a message, or intermittently output a received message. When the electronic device intermittently transmits a message or intermittently outputs a received message, it may be difficult to transmit or receive a message continuously, especially in a context in which users are communicating using the messages in real-time or near real-time, which may be further aided by assistance from vocal commands and voice based inputs.

Alternatively, when the electronic device receives a user input requesting transmission of a message from a user, it is difficult for the electronic device to verify that the user actively desires continues transmission and reception. As such, the state of the electronic device may be changed to a state involving continuous transmission and reception of messages, even when the user does not desire a continuous transmission and reception state.

Aspects of the present disclosure are to address at least the above-mentioned problems and/or disadvantages and to provide at least the advantages described below. Accordingly, an aspect of the present disclosure is to provide a system capable of continuously transmitting or receiving a message by executing a chatting mode depending on a user input and the state of an electronic device.

In accordance with an aspect of the present disclosure, an electronic device includes a communication interface, an input interface including a microphone, an output interface including a speaker, at least one processor, at least one memory, wherein instructions stored in the memory, are executable by the at least one processor to receive a first message through the communication interface from an external device, in response to receiving a first user input associated with the first message through the input interface, convert first text included in the first message into speech, output the speech using the output interface, determine whether to execute an additional operation associated with the first message, based on at least one of a state of the electronic device, the first message, and a second user input received via the microphone, and initiate a conversational mode for executing the additional operation based at least partly on the determination.

In accordance with another aspect of the present disclosure, a method is disclosed, including: receiving a first message through a communication interface from an external device, in response to receiving a first user input associated with the first message through an input interface including a microphone, converting first text included in the first message into speech, outputting the speech through an output interface of the electronic device including a speaker, determining whether to execute an additional operation associated with the first message, based on at least one of a state of the first electronic device, the first message, and a second user input received via the microphone, and initiate a conversational mode for executing the additional operation based at least partly on the determination.

According to certain embodiments of the present disclosure, a user terminal may provide a user experience (UE) similar to talking to users, by executing a chatting mode capable of outputting the message received in response to a user input, through a speaker and of transmitting or receiving the message through a user utterance.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses certain embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to description of drawings, similar components may be assigned with similar reference numerals. As used herein, singular forms may include plural forms as well unless the context clearly indicates otherwise.

DETAILED DESCRIPTION

It should be understood that certain embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure.

Prior to describing an embodiment of the present disclosure, an integrated intelligent system to which an embodiment of the present disclosure is capable of being applied will be described.

Figure 1:
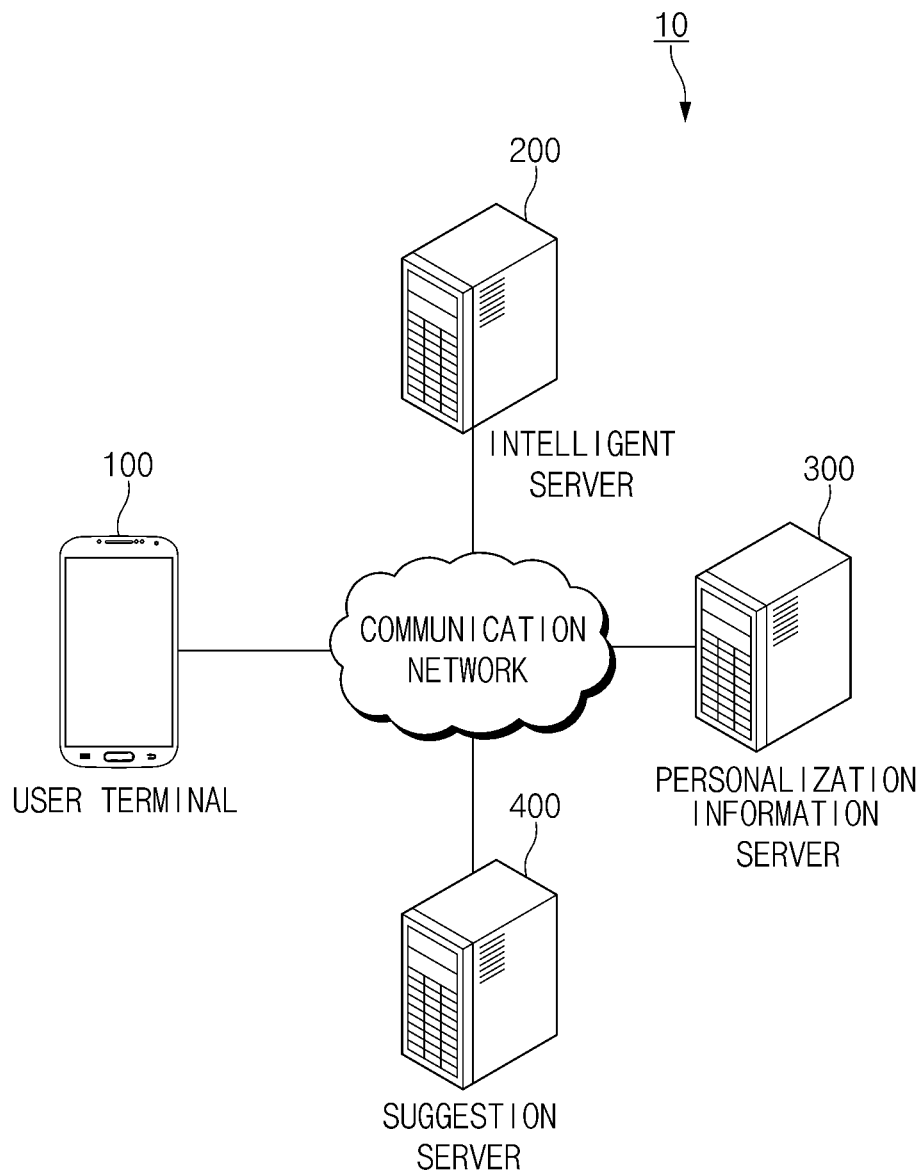
FIG. 1 is a view illustrating an integrated intelligent system, according to certain embodiments.

FIG. 1 is a view illustrating an integrated intelligent system, according to certain embodiments of the present disclosure.

Referring to FIG. 1, an integrated intelligent system 10 may include a user terminal 100, an intelligent server 200, a personalization information server 300, or a suggestion server 400.

The user terminal 100 may provide a service utilized for a user through an app (or an application program) (e.g., an alarm app, a message app, a picture (gallery) app, or the like) stored in the user terminal 100. For example, the user terminal 100 may execute and operate other app through an intelligent app (or a speech recognition app) stored in the user terminal 100. The user terminal 100 may receive a user input for executing the other app and executing an action through the intelligent app of the user terminal 100. For example, the user input may be received through a physical button, a touch pad, a voice input, a remote input, or the like. According to an embodiment, various types of terminal devices (or an electronic device), which are connected with Internet, such as a mobile phone, a smartphone, personal digital assistant (PDA), a notebook computer, and the like may correspond to the user terminal 100.

According to an embodiment, the user terminal 100 may receive a user utterance as a user input. The user terminal 100 may receive the user utterance and may generate a command for operating an app based on the user utterance. As such, the user terminal 100 may operate the app by using the command.

The intelligent server 200 may receive a voice input of a user from the user terminal 100 over a communication network and may convert the voice input to text data. In another embodiment, the intelligent server 200 may generate (or select) a path rule based on the text data. The path rule may include information about an action (or an operation) for performing the function of an app or information about a parameter utilized to perform the action. In addition, the path rule may include the order of the action of the app. The user terminal 100 may receive the path rule, may select an app depending on the path rule, and may execute the action included in the path rule in the selected app.

Generally, the term "path rule" of the present disclosure may mean, but not limited to, the sequence of states, which allows the electronic device to perform the task requested by the user. In other words, the path rule may include information about the sequence of the states. For example, the task may be a certain action that the intelligent app is capable of providing. The task may include the generation of a schedule, the transmission of a picture to a desired opponent, or the provision of weather information. The user terminal 100 may perform the task by sequentially having at least one or more states (e.g., an operating state of the user terminal 100).

According to an embodiment, the path rule may be provided or generated by an artificial intelligent (AI) system. The artificial intelligent system may be a rule-based system, or may be a neural network-based system (e.g., a feedforward neural network (FNN) or a recurrent neural network (RNN)). Alternatively, the artificial intelligent system may be a combination of the above-described systems or an artificial intelligent system different from the above-described system. According to an embodiment, the path rule may be selected from a set of predefined path rules or may be generated in real time in response to a user request. For example, the artificial intelligent system may select at least a path rule of predefined plurality of path rules, or may generate a path rule dynamically (or in real time). Furthermore, the user terminal 100 may use a hybrid system to provide the path rule.

According to an embodiment, the user terminal 100 may execute the action and may display a screen corresponding to a state of the user terminal 100, which executes the action, in a display. For another example, the user terminal 100 may execute the action and may not display the result obtained by executing the action in the display. For example, the user terminal 100 may execute a plurality of actions and may display the result of a part of the plurality of actions in the display. For example, the user terminal 100 may display the result, which is obtained by executing the last action, in the display. For another example, the user terminal 100 may receive the user input to display the result obtained by executing the action in the display.

The personalization information server 300 may include a database in which user information is stored. For example, the personalization information server 300 may receive the user information (e.g., context information, information about execution of an app, or the like) from the user terminal 100 and may store the user information in the database. The intelligent server 200 may be used to receive the user information from the personalization information server 300 over the communication network and to generate a path rule associated with the user input. According to an embodiment, the user terminal 100 may receive the user information from the personalization information server 300 over the communication network, and may use the user information as information for managing the database.

The suggestion server 400 may include a database storing information about a function in a terminal, introduction of an application, or a function to be provided. For example, the suggestion server 400 may include a database associated with a function that a user utilizes by receiving the user information of the user terminal 100 from the personalization information server 300. The user terminal 100 may receive information about the function to be provided from the suggestion server 400 over the communication network and may provide the information to the user.

According to an embodiment, the integrated intelligent system 10 may include the user terminal 100, at least one processor, which is a part of the user terminal 100 or which remotely communicates with the user terminal 100, at least one memory, which is operatively connected to the processor and which resides in the user terminal 100. Instructions stored in the memory may be performed to cause the processor to perform the following operation.

Figure 2:
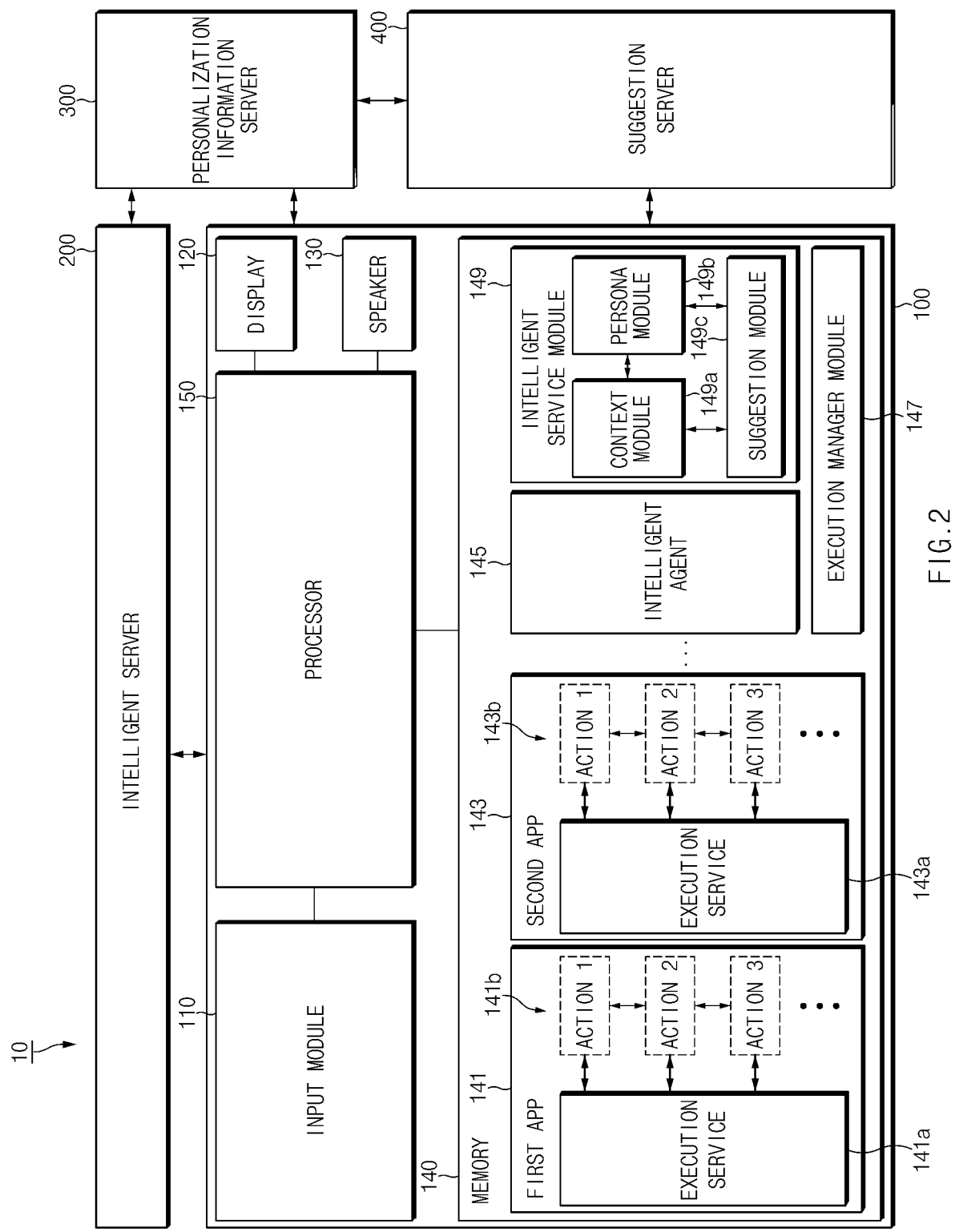
FIG. 2 is a block diagram illustrating a user terminal of an integrated intelligent system, according to an embodiment.

FIG. 2 is a block diagram illustrating a user terminal of an integrated intelligent system 10, according to an embodiment of the present disclosure.

Referring to FIG. 2, the user terminal 100 may include an input module 110, a display 120, a speaker 130, a memory 140, or a processor 150. The user terminal 100 may further include housing, and elements of the user terminal 100 may be seated in the housing or may be positioned on the housing. The user terminal 100 may further include a communication circuit positioned in the housing. The user terminal 100 may transmit or receive data (or information) to or from an external server (e.g., the intelligent server 200) through the communication circuit.

According to an embodiment, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) positioned in the user terminal 100 (or the housing of the user terminal 100).

According to an embodiment, the input module 110 may include a microphone that is capable of receiving the utterance of the user as a voice signal. For example, the input module 110 may include an utterance input system and may receive the utterance of the user as a voice signal through the utterance input system. For example, the microphone may be exposed through a part (e.g., a first portion) of the housing.

According to an embodiment, the display 120 may display an image, a video, and/or an execution screen of an application. For example, the display 120 may display a graphic user interface (GUI) of an app. According to an embodiment, the display 120 may be exposed to a part (e.g., a second part) of the housing.

According to an embodiment, the speaker 130 may output the voice signal. For example, the speaker 130 may output the voice signal generated in the user terminal 100 to the outside. According to an embodiment, the speaker 130 may be exposed to a part (e.g., a third portion) of the housing.

According to an embodiment, the memory 140 may store a plurality of apps (or application program) 141 and 143. For example, the plurality of apps 141 and 143 may be a program for performing a function corresponding to the user input. According to an embodiment, the memory 140 may store an intelligent agent 145, an execution manager module 147, or an intelligent service module 149. For example, the intelligent agent 145, the execution manager module 147 and the intelligent service module 149 may be a framework (or application framework) for processing the received user input (e.g., user utterance).

According to an embodiment, the memory 140 may include a database capable of storing information utilized to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may operate after being loaded by the execution manager module 147. The plurality of apps 141 and 143 may include execution service modules 141a and 143a performing a function. In an embodiment, the plurality of apps 141 and 143 may perform a plurality of actions (e.g., a sequence of states) 141b and 143b through execution service modules 141a and 143a for the purpose of performing a function. In other words, the execution service modules 141a and 143a may be activated by the execution manager module 147, and then may execute the plurality of actions 141b and 143b.

According to an embodiment, when the actions 141b and 143b of the apps 141 and 143 are executed, an execution state screen according to the execution of the actions 141b and 143b may be displayed in the display 120. For example, the execution state screen may be a screen in a state where the actions 141b and 143b are completed. For another example, the execution state screen may be a screen in a state where the execution of the actions 141b and 143b is in partial landing (e.g., in the case where a parameter utilized for the actions 141b and 143b are not entered).

According to an embodiment, the execution service modules 141a and 143a may execute the actions 141b and 143b depending on a path rule. For example, the execution service modules 141a and 143a may be activated by the execution manager module 147, may receive an execution request from the execution manager module 147 depending on the path rule, and may execute functions of the apps 141 and 143 by performing the actions 141b and 143b depending on the execution request. When the execution of the actions 141b and 143b is completed, the execution service modules 141a and 143a may transmit completion information to the execution manager module 147.

According to an embodiment, in the case where the plurality of the actions 141b and 143b are respectively executed in the apps 141 and 143, the plurality of the actions 141b and 143b may be sequentially executed. When the execution of one action (e.g., action 1 of the first app 141 or action 1 of the second app 143) is completed, the execution service modules 141a and 143a may open the next action (e.g., action 2 of the first app 141 or action 2 of the second app 143) and may transmit the completion information to the execution manager module 147. Here, it is understood that opening an arbitrary action is to change a state of the arbitrary action to an executable state or to prepare the execution of the action. In other words, when the arbitrary action is not opened, the corresponding action may be not executed. When the completion information is received, the execution manager module 147 may transmit the execution request associated with the next action (e.g., action 2 of the first app 141 or action 2 of the second app 143) to the execution service modules 141a and 143a. According to an embodiment, in the case where the plurality of apps 141 and 143 are executed, the plurality of apps 141 and 143 may be sequentially executed. For example, when receiving the completion information after the execution of the last action (e.g., action 3 of the first app 141) of the first app 141 is completed, the execution manager module 147 may transmit the execution request of the first action (e.g., action 1 of the second app 143) of the second app 143 to the execution service module 143a.

According to an embodiment, in the case where the plurality of the actions 141b and 143b are executed in the apps 141 and 143, a result screen according to the execution of each of the executed plurality of the actions 141b and 143b may be displayed in the display 120. According to an embodiment, a part of a plurality of result screens according to the executed plurality of the actions 141b and 143b may be displayed in the display 120.

According to an embodiment, the memory 140 may store an intelligent app (e.g., a speech recognition app) operating in conjunction with the intelligent agent 145. The app operating in conjunction with the intelligent agent 145 may receive and process the utterance of the user as a voice signal. According to an embodiment, the app operating in conjunction with the intelligent agent 145 may be operated by a specific input (e.g., an input through a hardware key, an input through a touchscreen, or a specific voice input) input through the input module 110.

According to an embodiment, the intelligent agent 145, the execution manager module 147, or the intelligent service module 149 stored in the memory 140 may be performed by the processor 150. The functions of the intelligent agent 145, the execution manager module 147, or the intelligent service module 149 may be implemented by the processor 150. It is described that the function of each of the intelligent agent 145, the execution manager module 147, and the intelligent service module 149 is the operation of the processor 150. According to an embodiment, the intelligent agent 145, the execution manager module 147, or the intelligent service module 149 stored in the memory 140 may be implemented with hardware as well as software.

According to an embodiment, the processor 150 may control overall operations of the user terminal 100. For example, the processor 150 may control the input module 110 to receive the user input. The processor 150 may control the display 120 to display an image. The processor 150 may control the speaker 130 to output the voice signal. The processor 150 may control the memory 140 to execute a program and to read or store utilized information.

In an embodiment, the processor 150 may execute the intelligent agent 145, the execution manager module 147, or the intelligent service module 149 stored in the memory 140. As such, the processor 150 may implement the function of the intelligent agent 145, the execution manager module 147, or the intelligent service module 149.

According to an embodiment, the processor 150 may execute the intelligent agent 145 to generate an instruction for launching an app based on the voice signal received as the user input. According to an embodiment, the processor 150 may execute the execution manager module 147 to launch the apps 141 and 143 stored in the memory 140 depending on the generated instruction. According to an embodiment, the processor 150 may execute the intelligent service module 149 to manage information of a user and may process a user input by using the information of the user.

The processor 150 may execute the intelligent agent 145 to transmit a user input received through the input module 110 to the intelligent server 200 and may process the user input through the intelligent server 200.

According to an embodiment, before transmitting the user input to the intelligent server 200, the processor 150 may execute the intelligent agent 145 to pre-process the user input. According to an embodiment, to pre-process the user input, the intelligent agent 145 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input and may search for a part in which the user voice is present, by using the detected end-point. The AGC module may recognize the user input and may adjust the volume of the user input so as to be suitable to process the recognized user input. According to an embodiment, the processor 150 may execute all the pre-processing elements for performance. However, in another embodiment, the processor 150 may execute a part of the pre-processing elements to operate at low power.

According to an embodiment, the intelligent agent 145 may execute a wakeup recognition module stored in the memory 140 for the purpose of recognizing a call of a user. As such, the processor 150 may recognize the wakeup command of a user through the wakeup recognition module and may execute the intelligent agent 145 for receiving user input when receiving the wakeup command. The wakeup recognition module may be implemented with a low-power processor (e.g., a processor included in an audio codec). According to an embodiment, when receiving a user input through a hardware key, the processor 150 may execute the intelligent agent 145. In the case where the intelligent agent 145 is executed, an intelligent app (e.g., a speech recognition app) operating in conjunction with the intelligent agent 145 may be executed.

According to an embodiment, the intelligent agent 145 may include a speech recognition module for performing the user input. The processor 150 may recognize the user input for executing an action in an app through the speech recognition module. For example, the processor 150 may recognize a limited user (voice) input (e.g., an utterance such as "click" for performing a capture operation when a camera app is being executed) for performing an action such as the wakeup command in the apps 141 and 143 through the speech recognition module. For example, the processor 150 may assist the intelligent server 200 to recognize and rapidly process a user command capable of being processed in the user terminal 100 through the speech recognition module. According to an embodiment, the speech recognition module of the intelligent agent 145 for executing a user input may be implemented in an app processor.

According to an embodiment, the speech recognition module (including the speech recognition module of a wake up module) of the intelligent agent 145 may recognize the user input by using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the processor 150 may execute the intelligent agent 145 to convert the voice input of the user into text data. For example, the processor 150 may transmit the voice of the user to the intelligent server 200 through the intelligent agent 145 and may receive the text data corresponding to the voice of the user from the intelligent server 200. As such, the processor 150 may display the converted text data in the display 120.

According to an embodiment, the processor 150 may execute the intelligent agent 145 to receive a path rule from the intelligent server 200. According to an embodiment, the processor 150 may transmit the path rule to the execution manager module 147 through the intelligent agent 145.

According to an embodiment, the processor 150 may execute the intelligent agent 145 to transmit the execution result log according to the path rule received from the intelligent server 200 to the intelligent service module 149, and the transmitted execution result log may be accumulated and managed in preference information of the user of a persona module 149b.

According to an embodiment, the processor 150 may execute the execution manager module 147, may receive the path rule from the intelligent agent 145, and may execute the apps 141 and 143; and the processor 150 may allow the apps 141 and 143 to execute the actions 141b and 143b included in the path rule. For example, the processor 150 may transmit command information (e.g., path rule information) for executing the actions 141b and 143b to the apps 141 and 143, through the execution manager module 147; and the processor 150 may receive completion information of the actions 141b and 143b from the apps 141 and 143.

According to an embodiment, the processor 150 may execute the execution manager module 147 to transmit the command information (e.g., path rule information) for executing the actions 141b and 143b of the apps 141 and 143 between the intelligent agent 145 and the apps 141 and 143. The processor 150 may bind the apps 141 and 143 to be executed depending on the path rule through the execution manager module 147 and may transmit the command information (e.g., path rule information) of the actions 141b and 143b included in the path rule to the apps 141 and 143. For example, the processor 150 may sequentially transmit the actions 141b and 143b included in the path rule to the apps 141 and 143, through the execution manager module 147 and may sequentially execute the actions 141b and 143b of the apps 141 and 143 depending on the path rule.

According to an embodiment, the processor 150 may execute the execution manager module 147 to manage execution states of the actions 141b and 143b of the apps 141 and 143. For example, the processor 150 may receive information about the execution states of the actions 141b and 143b from the apps 141 and 143, through the execution manager module 147. For example, in the case where the execution states of the actions 141b and 143b are in partial landing (e.g., in the case where a parameter utilized for the actions 141b and 143b are not input), the processor 150 may transmit information about the partial landing to the intelligent agent 145, through the execution manager module 147. The processor 150 may make a request for an input of utilized information (e.g., parameter information) to the user by using the received information through the intelligent agent 145. For another example, in the case where the execution state of each of the actions 141b and 143b is an operating state, the processor 150 may receive an utterance from the user through the intelligent agent 145. The processor 150 may transmit information about the apps 141 and 143 being executed and the execution states of the apps 141 and 143 to the intelligent agent 145, through the execution manager module 147. The processor 150 may transmit the user utterance to the intelligent server 200 through the intelligent agent 145. The processor 150 may receive parameter information of the utterance of the user from the intelligent server 200 through the intelligent agent 145. The processor 150 may transmit the received parameter information to the execution manager module 147 through the intelligent agent 145. The execution manager module 147 may change a parameter of each of the actions 141b and 143b to a new parameter by using the received parameter information.

According to an embodiment, the processor 150 may execute the execution manager module 147 to transmit parameter information included in the path rule to the apps 141 and 143. In the case where the plurality of apps 141 and 143 are sequentially executed depending on the path rule, the execution manager module 147 may transmit the parameter information included in the path rule from one app to another app.

According to an embodiment, the processor may execute the execution manager module 147 to receive a plurality of path rules. The processor 150 may select a plurality of path rules based on the utterance of the user, through the execution manager module 147. For example, in the case where the user utterance specifies one app 141 executing one action 141b but does not specify the other app 143 executing the other action 143b, the processor 150 may receive a plurality of different path rules, in which the same app 141 (e.g., gallery app) executing the one action 141b is executed and in which a different app 143 (e.g., message app or Telegram app) executing the other action 143b is executed, through the execution manager module 147. For example, the processor 150 may execute the same actions 141b and 143b (e.g., the same successive actions 141b and 143b) of the plurality of path rules, through the execution manager module 147. In the case where the processor 150 executes the same action, the processor 150 may display a state screen for selecting the different apps 141 and 143 respectively included in the plurality of path rules in the display 120, through the execution manager module 147.

According to an embodiment, the intelligent service module 149 may include a context module 149a, the persona module 149b, or a suggestion module 149c.

The processor 150 may execute the context module 149a to collect current states of the apps 141 and 143 from the apps 141 and 143. For example, the processor 150 may receive context information indicating the current states of the apps 141 and 143 and may collect the current states of the apps 141 and 143 through the received context information.

The processor 150 may execute the persona module 149b to manage personal information of the user utilizing the user terminal 100. For example, the processor 150 may collect usage information and the execution result of the user terminal 100 and may manage the personal information of the user by using the collected usage information and the collected execution result of the user terminal 100.

The processor 150 may execute the suggestion module 149c to predict the intent of the user and may recommend an instruction to the user based on the intent of the user. For example, the processor 150 may recommend an instruction to the user depending on the current state (e.g., a time, a place, a situation, or an app) of the user.

According to an embodiment, the processor 150 may execute the intelligent agent 145 to perform a reading function. For example, the reading function may output the received message and the text included in an alarm, through the speaker 130.

According to an embodiment, the processor 150 may execute the intelligent agent 145 to transmit textual information for performing the reading function depending on a user input, to the intelligent server 200. For example, the user input may include a request for performing the reading function. According to an embodiment, the intelligent server 200 may generate voice data corresponding to the text information through the natural language generation module and may transmit the generated voice data to the user terminal 100. According to an embodiment, the processor 150 may execute the intelligent agent 145 to output the generated voice data.

According to an embodiment, the processor 150 may execute the intelligent agent 145 to change the mode of the user terminal 100 into a "chatting mode" (e.g., a "conversational mode"). Chatting mode may indicate a special operational state in which messages may be received, read audially, generated using vocal commands and responsively transmitted through text-to-speech, speech-to-text and other voice commands generated by a user, in addition to corresponding user interface displays to assist. According to an embodiment, the processor 150 may execute a message app (e.g., the first app 141) in a chatting mode to perform an operation of transmitting and or receiving a message.

According to an embodiment, in the chatting mode, the processor 150 may execute the intelligent agent 145 to operate (or open) the microphone and may stand by for the purpose of receiving a user utterances. According to an embodiment, the processor 150 may receive a message corresponding to a user input. For example, when the end point of a user input is sensed, the processor 150 may transmit the message. For example, the end point of the user input may be detected via an end point detection (EPD) module of the intelligent server 200.

According to an embodiment, when a message is received from an external device in the chatting mode, the processor 150 may execute the intelligent agent 145 to perform the reading function on the received message. For example, the processor 150 may immediately perform the reading function of the received message. According to an embodiment, the processor 150 may perform the reading function, in the chatting mode. For example, in the chatting mode, the processor 150 may perform the reading function without a user input. According to an embodiment, when the processor 150 performs the reading function while receiving a user input, the processor 150 may perform a noise processing function. For example, when the sound output through the speaker is input to a microphone, the processor 150 may remove the sound input through the microphone and may receive the user input.

According to an embodiment, in the chatting mode, when the processor 150 transmits a message or completes the execution of the reading function, the processor 150 may execute the intelligent agent 145 to keep the microphone in an operating state. According to an embodiment, when there is no user input during a specified time, the processor 150 may allow the microphone not to operate (or to be closed). According to an embodiment, when the processor 150 receives a specified user input, the processor 150 may operate the microphone again. For example, the specified user input may include a wake up command (e.g., "wake up!"), the name of a sender (e.g., "Sam"), or a message transmitting command (e.g. "please send it").

According to an embodiment, in the chatting mode, the processor 150 may execute the intelligent agent 145 to change the state of the microphone, using the input module 110. For example, the processor 150 may change the state of the microphone through a physical button. The physical button may change the state of the microphone through, for example, the physical button of the user terminal 100 and the physical button of a device (e.g., a headset) connected to the user terminal 100.

According to an embodiment, when the processor 150 receives a message from an external device while receiving a user input in the chatting mode, the processor 150 may execute the intelligent agent 145 to provide a notification that the message has been received through the sound different from the set message receiving alarm sound.

According to an embodiment, the processor 150 may execute the intelligent agent 145 to receive a feedback on the result of performing an operation corresponding to a user input, from a user. According to an embodiment, the processor 150 may receive information about the result of performing an operation according to a path rule, from the execution manager module 147. According to an embodiment, the processor 150 may execute the intelligent agent 145 to process information about the result through the intelligent server 200 and may output the processed result as at least one of text data and voice data.

According to an embodiment, when the processor 150 executes the intelligent agent 145 to transmit information about the result executed depending on the operation, the processor 150 may transmit information about the state of the user terminal 100 to the intelligent server 200 together. For example, the processor 150 may transmit information about the state of the user terminal 100 operating in the specified mode, to the intelligent server 200. For example, the specified mode may include state information of the user terminal 100 operating in an eye free mode. The eye free mode may be a mode in the case where the user cannot visually verify an image displayed on a display (e.g., a state where a screen is covered with a cover). According to an embodiment, the processor 150 may verify the state of the user terminal 100 through at least one sensor. For example, the processor 150 may verify the state of a user through a proximity sensor, an ambient light sensor, or a heart rate sensor (HRM sensor). Alternatively, the processor 150 may execute the context module 149a to verify the state of the user terminal 100. For example, the processor 150 may verify the state of a user through a Bluetooth connection (e.g., headset connection), a set mode (e.g., a driving mode), and the like. That is, certain values detected by one or more of the aforementioned sensors can indicate to the electronic device that the user cannot view the present display. According to an embodiment, when the processor 150 executes the intelligent agent 145 to transmit information about the execution of an operation based on state information of the user terminal 100, the processor 150 may transmit a request to receive a feedback for changing the mode of the user terminal 100 to a chatting mode to the intelligent server 200 together.

According to an embodiment, the processor 150 may execute the intelligent agent 145 to receive a user input corresponding to the provided feedback. The feedback may include, for example, a request to confirm a change to a specified mode (e.g., chatting mode). According to an embodiment, the processor 150 may transmit information about a user input corresponding to the feedback, to the intelligent server 200. For example, the processor 150 may transmit flag information corresponding to an input to confirm the change to the specified mode, to the intelligent server 200. According to an embodiment, the intelligent server 200 may transmit a path rule corresponding to the received information to the user terminal 100. According to an embodiment, the processor 150 may change the mode of the user terminal 100 to the specified mode depending on the received path rule.

According to an embodiment, the processor 150 may execute the execution manager module 147 to determine whether to transmit a request to receive a feedback for changing the mode of the user terminal 100 to the specified mode. According to an embodiment, the processor 150 may determine whether to transmit a request depending on whether the executed first app 141 (or the second app 143) is capable of executing an operation of a specified mode. According to an embodiment, the processor 150 may determine whether to transmit a request, depending on additional information (e.g., user information) transmitted from the context module 149a.

According to an embodiment, the processor 150 may execute the context module 149a to obtain information about the user terminal 100 (or a user). For example, the information about the user terminal 100 may be information about the state of the user terminal 100 (e.g., the eye free mode) obtained through a sensor. For example, the information about the user terminal 100 may be information about information (e.g., contact frequency) about the user. According to an embodiment, the processor 150 may transmit the obtained information to the execution manager module 147. As such, when receiving the information about the user terminal 100, the processor 150 may transmit a request to receive a feedback, to the intelligent server 200.

Figure 3:
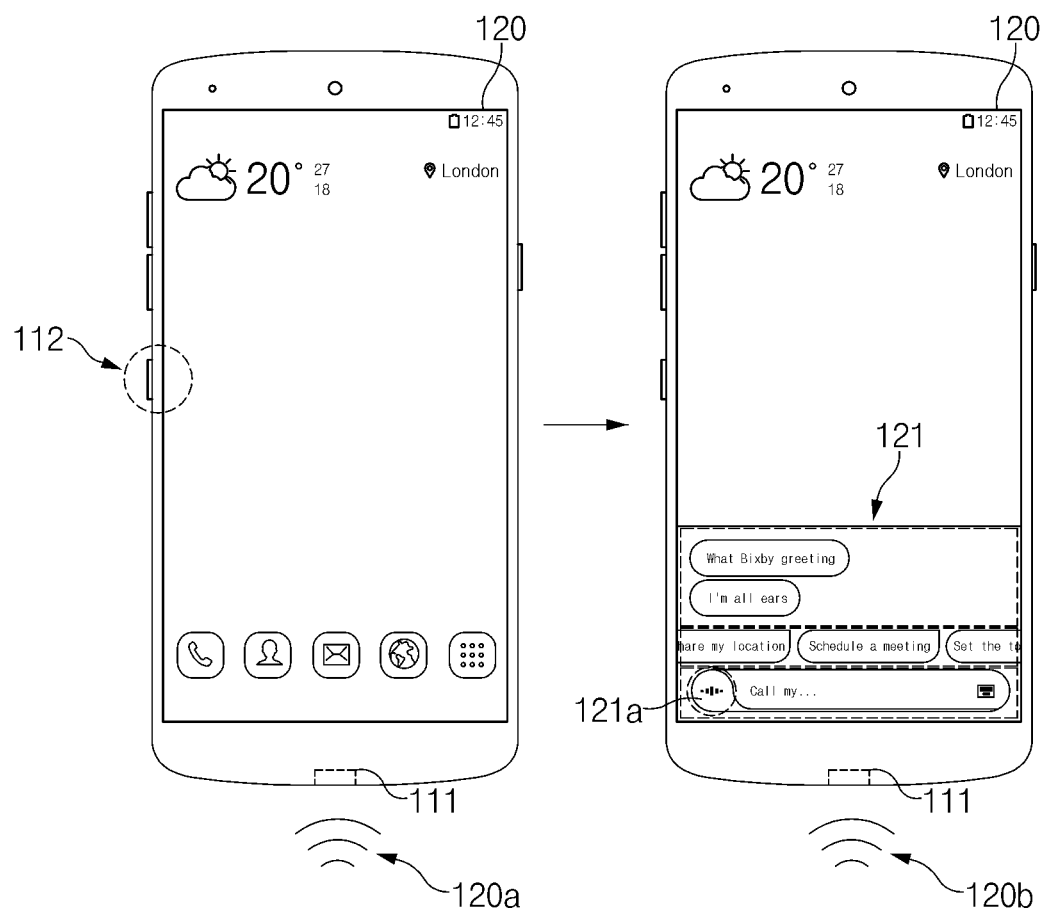
FIG. 3 is a view illustrating that an intelligent app of a user terminal is executed, according to an embodiment of the present disclosure.

FIG. 3 is a view illustrating a state of the user terminal when an intelligent is executed, according to an embodiment of the present disclosure.

The user terminal 100 receives a user input requesting executing of an intelligent app (e.g., a speech recognition app) operating in conjunction with the intelligent agent 145.

According to an embodiment, the user terminal 100 may execute the intelligent app for recognizing a voice responsive to an inputs electing a hardware key 112. For example, when the user terminal 100 receives the user input through the hardware key 112, the user terminal 100 may display a UI 121 of the intelligent app in the display 120. For example, a user may select a speech recognition button 121a displayed to the UI 121 of the intelligent app, for indicating an intention to enter a voice 120b (e.g., a voice input) when the UI 121 of the intelligent app is displayed in the display 120. In another example, the user may press the hardware key 112 continuously to active a state in which the terminal is ready to detected the voice 120b (e.g., a voice input). Thus, while the hardware key 112 is selected, the user may utter the voice 120b input.

According to an embodiment, the user terminal 100 may execute the intelligent app for recognizing a voice in response to an input detected through a microphone 111. For example, in the case where a pre-specified voice command (e.g., "wake up!") is entered (120a) through the microphone 111, the user terminal 100 may display the UI 121 of the intelligent app in the display 120 and enter a state of readiness to receive further voice commands that are different from the pre-specified voice command.

Figure 4:
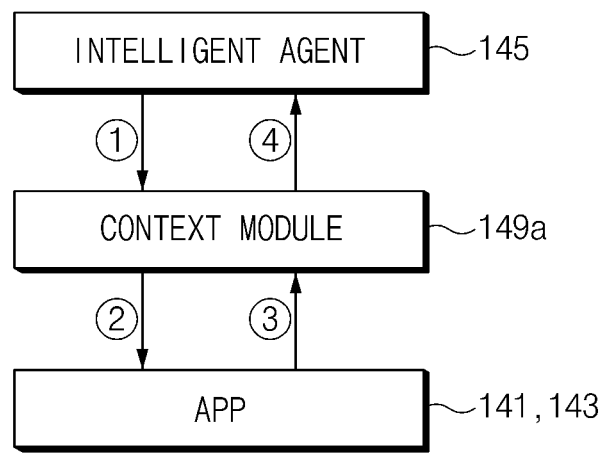
FIG. 4 is a block diagram illustrating that a context module of an intelligent service module collects a current state, according to an embodiment of the present disclosure.

FIG. 4 is a block diagram illustrating a context module of an intelligent service module retrieving current states, according to an embodiment of the present disclosure.

Referring to FIG. 4, when receiving a context request from the intelligent agent 145 (①), the processor 150 may request context information indicating the current state of apps 141 and 143 through the context module 149a (②). According to an embodiment, the processor 150 may receive the context information from the apps 141 and 143 ③ through the context module 149a and may transmit the context information to the intelligent agent 145 ④.

According to an embodiment, the processor 150 may receive pieces of context information from apps 141 and 143 through the context module 149a. The context information may be information about the most recently executed apps 141 and 143. For another example, the context information may be information (e.g., in the case where a user watches a picture through a gallery app, information about the corresponding picture) bout the current states in the apps 141 and 143.

According to an embodiment, the processor 150 may receive context information indicating a current state of the user terminal 100 from a device platform as well as the apps 141 and 143, through the context module 149a. The context information may include general context information, user context information, or device context information.

The general context information may include general information of the user terminal 100. The general context information may be verified by receiving data through a sensor hub or the like of the device platform such that the data is processed through an internal algorithm. For example, the general context information may include information about current time and space. For example, the information about the current time and space may include information about current time or a current location of the user terminal 100. The current time may be verified through the time on the user terminal 100, and the information about the current location may be verified through a global positioning system (GPS). For another example, the general context information may include information about physical motion. For example, the information about the physical motion may include information about walking, running, driving, or the like. The information about the physical motion may be verified through a motion sensor. The information about the driving may be verified by sensing Bluetooth connection in a vehicle such that boarding and parking is verified as well as verifying the driving through the motion sensor. For another example, the general context information may include user activity information. For example, the user activity information may include information about commuting, shopping, travel, or the like. The user activity information may be verified by using information about a place where a user or an app registers in a database.

The user context information may include information about the user. For example, the user context information may include information about an emotional state of the user. For example, the information about the emotional state of the user may include information about happiness, sadness, anger, or the like of the user. For another example, the user context information may include information about the current state of the user. For example, the information about the current state of the user may include information about interest, intent, or the like (e.g., shopping).

The device context information may include information about the state of the user terminal 100. For example, the device context information may include information about a path rule that the execution manager module 147 performs. For another example, the device information may include information about a battery. For example, the information about the battery may be verified through charging and discharging states of the battery. For another example, the device information may include information about a connected device and a network. For example, the information about the connected device may be verified through a communication interface connected with the device.

Figure 5:
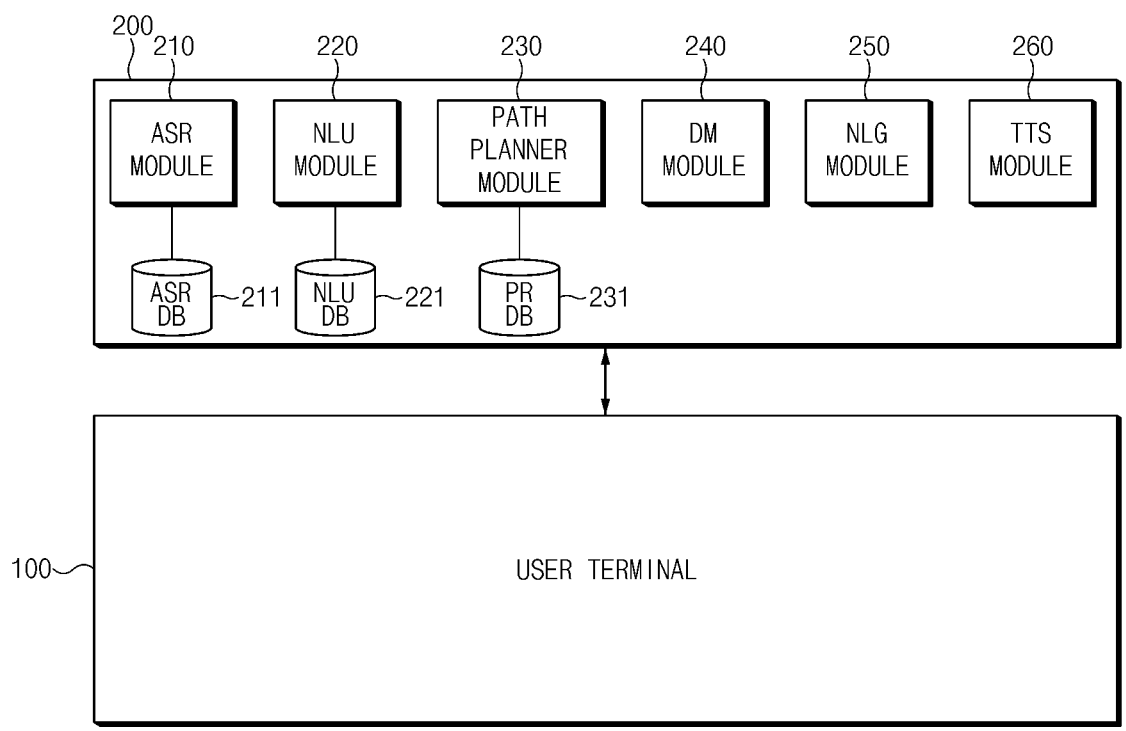
FIG. 5 is a block diagram illustrating an intelligent server of an integrated intelligent system, according to an embodiment of the present disclosure.

FIG. 5 is a block diagram illustrating an intelligent server of an integrated intelligent system, according to an embodiment of the present disclosure.

Referring to FIG. 5, the intelligent server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. According to an embodiment, the intelligent server 200 may include a communication circuit, a memory, and a processor. The processor may execute an instruction stored in the memory to drive the ASR module 210, the NLU module 220, the path planner module 230, the DM module 240, the NLG module 250, and the TTS module 260. The intelligent server 200 may transmit or receive data (or information) to or from an external electronic device (e.g., the user terminal 100) through the communication circuit.

The NLU module 220 or the path planner module 230 of the intelligent server 200 may generate a path rule.

According to an embodiment, the ASR module 210 may change the user input received from the user terminal 100 to text data.

According to an embodiment, the ASR module 210 may convert the user input received from the user terminal 100 to text data. For example, the ASR module 210 may include a speech recognition module. The speech recognition module may include an acoustic model and a language model. For example, the acoustic model may include information associated with phonation, and the language model may include unit phoneme information and information about a combination of unit phoneme information. The speech recognition module may convert user speech to text data by using the information associated with phonation and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) utilized to express the intent, from the user input.

According to an embodiment, the NLU module 220 may determine the intent of the user and parameter by using a matching rule that is divided into a domain, intent, and a parameter (or a slot) utilized to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more utilized parameters. The matching rule may be stored in a natural language understanding database (NLU DB) 221.

According to an embodiment, the NLU module 220 may grasp the meaning of words extracted from a user input by using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words, which are based for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action (e.g., at least one or more states) to be executed in the app, and a parameter utilized to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the action to be executed in the app, and a parameter utilized to execute the action based on the intent of the user input and the parameter for the purpose of generating one path rule or a plurality of path rules. For example, the NLU module 220 may arrange the app to be executed and the action to be executed in the app by using information of the user terminal 100 depending on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, in the case where a part of action is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, in the case where a part of action is specified based on the user utterance, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligent agent 145, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is definite. For example, the DM module 240 may determine whether the user intent is clear, based on whether the information of a parameter is sufficient. The DM module 240 may determine whether the parameter grasped by the NLU module 220 is sufficient to perform a task. According to an embodiment, in the case where the user intent is not clear, the DM module 240 may perform a feedback for making a request for utilized information to the user. For example, the DM module 240 may perform a feedback for making a request for information about the parameter for grasping the user intent.

According to an embodiment, the DM module 240 may include a content provider module. In the case where the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 6:
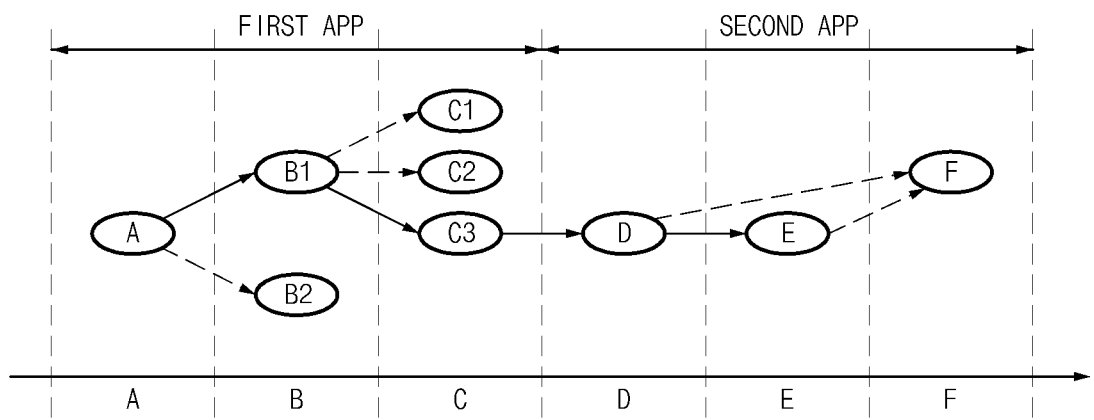
FIG. 6 is a diagram illustrating a path rule generating method of a path planner module, according to an embodiment of the present disclosure.

FIG. 6 is a diagram illustrating a path rule generating method of a path planner module, according to an embodiment of the present disclosure.

Referring to FIG. 6, according to an embodiment, the NLU module 220 may divide the function of an app into one or more unit actions (e.g., states A to F) and may store the divided unit actions in the PR DB 231. For example, the NLU module 220 may store a path rule set including a plurality of path rules A-B1-C1, A-B1-C2, A-B1-C3-D-F, and A-B1-C3-D-E-F, which are divided into actions (e.g., states), in the PR DB 231.

According to an embodiment, the PR DB 231 of the path planner module 230 may store the path rule set for performing the function of an app. The path rule set may include a plurality of path rules each of which includes a plurality of actions (e.g., a sequence of states). An action executed depending on a parameter input to each of the plurality of actions may be sequentially arranged in each of the plurality of path rules. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, in the case where there is no path rule completely matched to the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

According to another embodiment, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment, in the case where a user input in which information is insufficient is received by the intelligent server 200, the NLU module 220 may generate a path rule partly corresponding to the received user input. For example, the NLU module 220 may transmit the partly corresponding path rule to the intelligent agent 145. The processor 150 may execute the intelligent agent 145 to receive the path rule and may transmit the partly corresponding path rule to the execution manager module 147. The processor 150 may execute the first app 141 depending on the path rule through the execution manager module 147. The processor 150 may transmit information about an insufficient parameter to the intelligent agent 145 through the execution manager module 147 while executing the first app 141. The processor 150 may make a request for an additional input to a user by using the information about the insufficient parameter, through the intelligent agent 145. When an additional input is received by a user through the intelligent agent 145, the processor 150 may transmit and process a user input to the intelligent server 200. The NLU module 220 may generate a path rule to be added, based on the intent of the user input additionally entered and parameter information and may transmit the path rule to be added, to the intelligent agent 145. The processor 150 may transmit the path rule to the execution manager module 147 through the intelligent agent 145 to execute the second app 143.

According to an embodiment, in the case where a user input, in which a portion of information is missed, is received by the intelligent server 200, the NLU module 220 may transmit a user information request to the personalization information server 300. The personalization information server 300 may transmit information of a user entering the user input stored in a persona database to the NLU module 220. The NLU module 220 may select a path rule corresponding to the user input in which a part of an action is partly missed, by using the user information. As such, even though the user input in which a portion of information is missed is received by the intelligent server 200, the NLU module 220 may make a request for the missed information to receive an additional input or may determine a path rule corresponding to the user input by using user information.

According to an embodiment, Table 1 attached below may indicate an example form of a path rule associated with a task that a user requests.

TABLE 1

| Path rule ID | State | parameter |
|---|---|---|
| Gallery_101 | pictureView(25) | NULL |
|  | searchView(26) | NULL |
|  | searchViewResult(27) | Location, time |
|  | SearchEmptySelectedView(28) | NULL |
|  | SearchSelectedView(29) | ContentType, selectall |
|  | CrossShare(30) | anaphora |

Referring to Table 1, a path rule that is generated or selected by an intelligent server (the intelligent server 200 of FIG. 1) depending on user speech (e.g., "please share a picture") may include at least one state 25, 26, 27, 28, 29 or 30. For example, the at least one state (e.g., one operating state of a terminal) may correspond to at least one of the picture application execution PicturesView 25, the picture search function execution SearchView 26, the search result display screen output SearchViewResult 27, the search result display screen output, in which a picture is non-selected, SearchEmptySelectedView 28, the search result display screen output, in which at least one picture is selected, SearchSelectedView 29, or the share application selection screen output CrossShare 30.

In an embodiment, parameter information of the path rule may correspond to at least one state. For example, the search result display screen output, in which at least one picture is selected, SearchSelectedView 29 may be included in the at least one state.

The task (e.g., "please share a picture!") that the user requests may be performed depending on the execution result of the path rule including the sequence of the states 25, 26, 27, 28, and 29.

Figure 7:
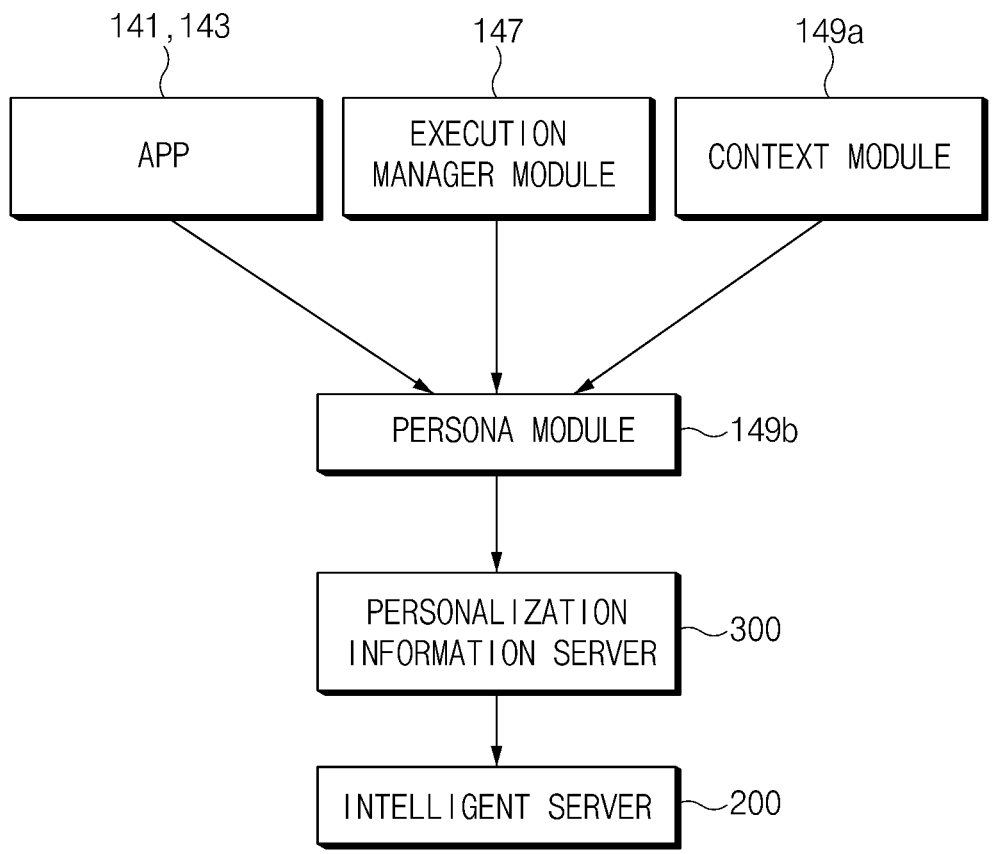
FIG. 7 is a diagram illustrating that a persona module of an intelligent service module manages information of a user, according to an embodiment of the present disclosure.

FIG. 7 is a diagram illustrating that a persona module of an intelligent service module manages information of a user, according to an embodiment of the present disclosure.

Referring to FIG. 7, the processor 150 may receive information of the user terminal 100 from the apps 141 and 143, the execution manager module 147, or the context module 149a through the persona module 149b. The processor 150 may store information about the result obtained by executing the actions 141b and 143b of an app in an action log database through the apps 141 and 143 and the execution manager module 147. The processor 150 may store information about a current state of the user terminal 100 in a context database through the context module 149a. The processor 150 may receive the stored information from the action log database or the context database through the persona module 149b. For example, data stored in the action log database and the context database may be analyzed by an analysis engine and may be transmitted to the persona module 149b.

According to an embodiment, the processor 150 may transmit information received from the apps 141 and 143, the execution manager module 147, or the context module 149a to the suggestion module 149c through the persona module 149b. For example, the processor 150 may transmit the data stored in the action log database or the context database to the suggestion module 149c through the persona module 149b.

According to an embodiment, the processor 150 may transmit information received from the apps 141 and 143, the execution manager module 147, or the context module 149a to the personalization information server 300 through the persona module 149b. For example, the processor 150 may periodically transmit the data, which is accumulated and stored in the action log database or the context database, to the personalization information server 300 through the persona module 149b.

According to an embodiment, the processor 150 may transmit the data stored in the action log database or the context database to the suggestion module 149c through the persona module 149b. The user information generated through the persona module 149b may be stored in a persona database. The persona module 149b may periodically transmit the user information stored in the persona database to the personalization information server 300. According to an embodiment, the information transmitted to the personalization information server 300 through the persona module 149b may be stored in the persona database. The personalization information server 300 may infer user information utilized to generate a path rule of the intelligent server 200 by using the information stored in the persona database.

According to an embodiment, the user information inferred by using the information transmitted through the persona module 149b may include profile information or preference information. The profile information or the preference information may be inferred through an account of the user and accumulated information.

The profile information may include personal information of the user. For example, the profile information may include demographic information of the user. For example, the demographic information may include gender, age, or the like of the user. For another example, the profile information may include life event information. For example, the life event information may be inferred by comparing log information with a life event model and may be reinforced by analyzing a behavior pattern. For another example, the profile information may include interest information. For example, the interest information may include shopping items of interest, interesting fields (e.g., sports, politics, and the like). For another example, the profile information may include activity area information. For example, the activity area information may include information about a house, a work place, or the like. The information about the activity area may include information about an area where a priority is recorded based on accumulated stay time and the number of visits as well as information about a location of a place. For another example, the profile information may include activity time information. For example, the activity time information may include information about a wakeup time, a commute time, a sleep time, or the like. The information about the commute time may be inferred by using the activity area information (e.g., information about a house and a workplace). The information about the sleep time may be inferred through an unused time of the user terminal 100.

The preference information may include preference information of the user. For example, the preference information may include information about app preference. For example, the app preference may be inferred through a usage log (e.g., a time- and place-specific usage log) of an app. The app preference may be used to determine an app to be executed depending on a current state (e.g., time or place) of the user. For another example, the preference information may include information about contact preference. For example, the contact preference may be inferred by analyzing information about a contact frequency (e.g., a time- and place-specific frequency of contacting) of a contact. The contact preference may be used to determine a contact to be contacted depending on a current state (e.g., a contact for duplicate names) of the user. For another example, the preference information may include setting information. For example, the setting information may be inferred by analyzing information about setting frequency (e.g., a time- and place-specific frequency of setting a setting value) of a specific setting value. The setting information may be used to set a specific setting value depending on the current state (e.g., a time, a place, or a situation) of the user. For another example, the preference information may include place preference. For example, the place preference may be inferred through visit history (e.g., a time-specific visit history) of a specific place. The place preference may be used to determine a place to visit depending on the current state (e.g., time) of the user. For another example, the preference information may include instruction preference. For example, the instruction preference may be inferred through a usage frequency (e.g., a time- and place-specific usage frequency) of an instruction. The instruction preference may be used to determine an instruction pattern to be used depending on the current state (e.g., time or place) of the user. In particular, the instruction preference may include information about a menu most frequently selected by the user in the current state of an app being executed by analyzing the log information.

Figure 8:
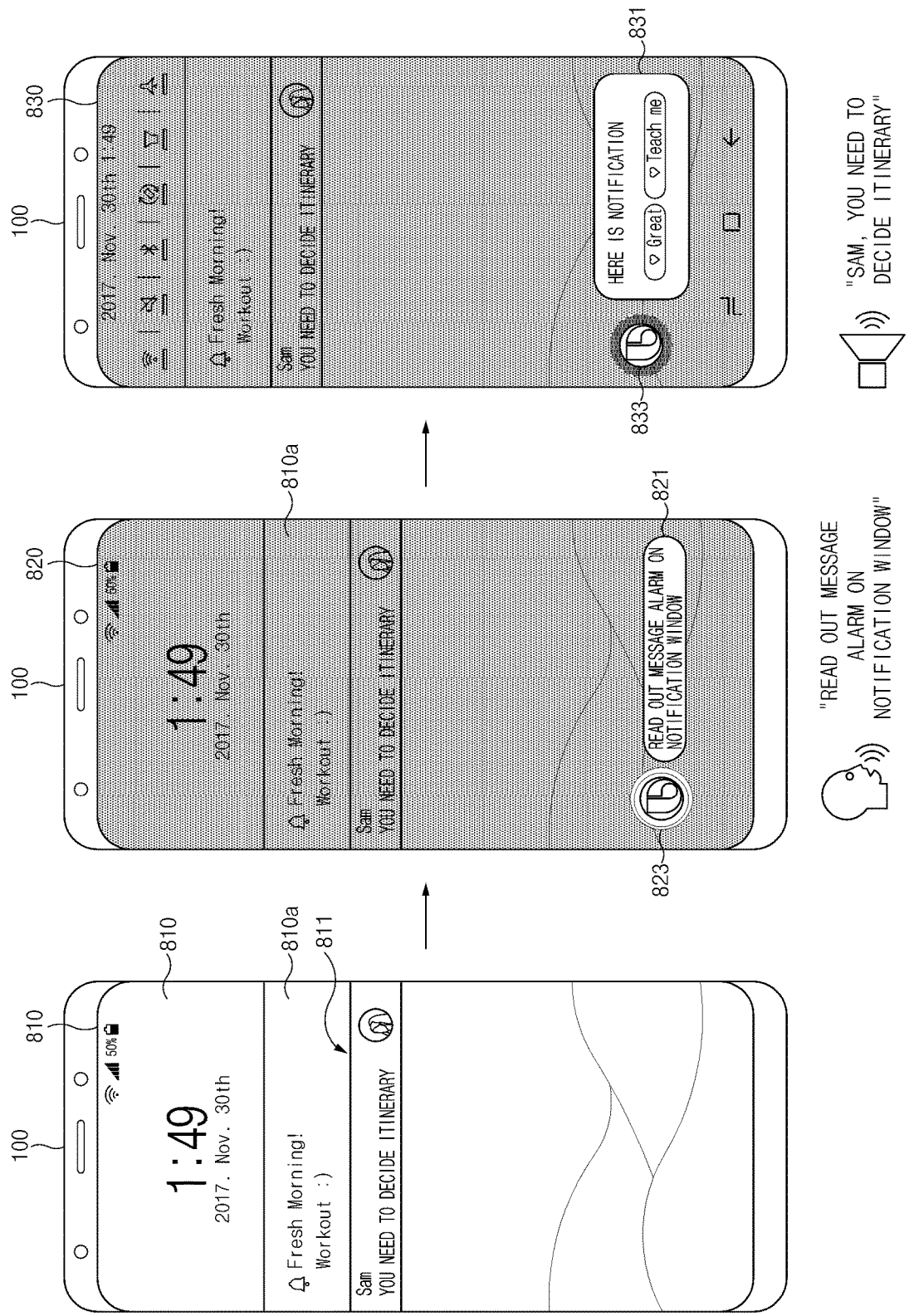
FIG. 8 is a screen in which a user terminal performs a reading function, according to certain embodiments.

FIG. 8 is a screen in which the user terminal 100 performs a reading function, according to certain embodiments.

Referring to FIG. 8, the user terminal 100 may perform a reading function which output the content of a message displayed on a notification window, through a speaker (e.g., the speaker 130 of FIG. 2) using a text-to-speech function.

According to an embodiment, in screen 810, the user terminal 100 may receive a message from an external device. For example, the user terminal 100 may receive a message 811 including the text "you need to decide itinerary", from an external device (e.g., an external user terminal). According to an embodiment, the user terminal 100 may display the received message on a notification window (or a notification area) 810a.

According to an embodiment, in screen 820, the user terminal 100 may receive a user input requesting audial output of the content of the message (as displayed on the notification window or an area 810a) through the speaker. For example, the user terminal 100 may receive a spoken user input, stating, "read out message alarm on notification window!" According to an embodiment, as the user terminal 100 processes the spoken user input, the user terminal 100 may display a text 821 corresponding to the received user input on a display.

According to an embodiment, in screen 830, responsive to the user command, the user terminal 100 may output the content of the received message through the speaker in response to the received user input (e.g., using text-to-speech functionality). For example, the user terminal 100 may output "Sam, you need to decide itinerary" through the speaker of the user terminal 100. According to an embodiment, the user terminal 100 may display guide information 831 associated with outputting a message on the display.

According to an embodiment, the user terminal 100 may display indicators 823 and 833 corresponding to an app for processing a user input, on the display. According to an embodiment, the user terminal 100 may vary the colors, effects, or the like of the indicators 823 and 833 depending on the action of the app. For example, when receiving a user input, the user terminal 100 may display the indicator 823 in a first state, which could include for example a white effect or no-effect. When outputting the received message, the user terminal 100 may display the indicator 833 in a second state (e.g., blue or wave effect).

According to an embodiment, in screen 810, screen 820, and screen 830, the user terminal 100 may output utilized information through the speaker, without displaying a screen, in which a user input is processed, on the display.

Figure 9:
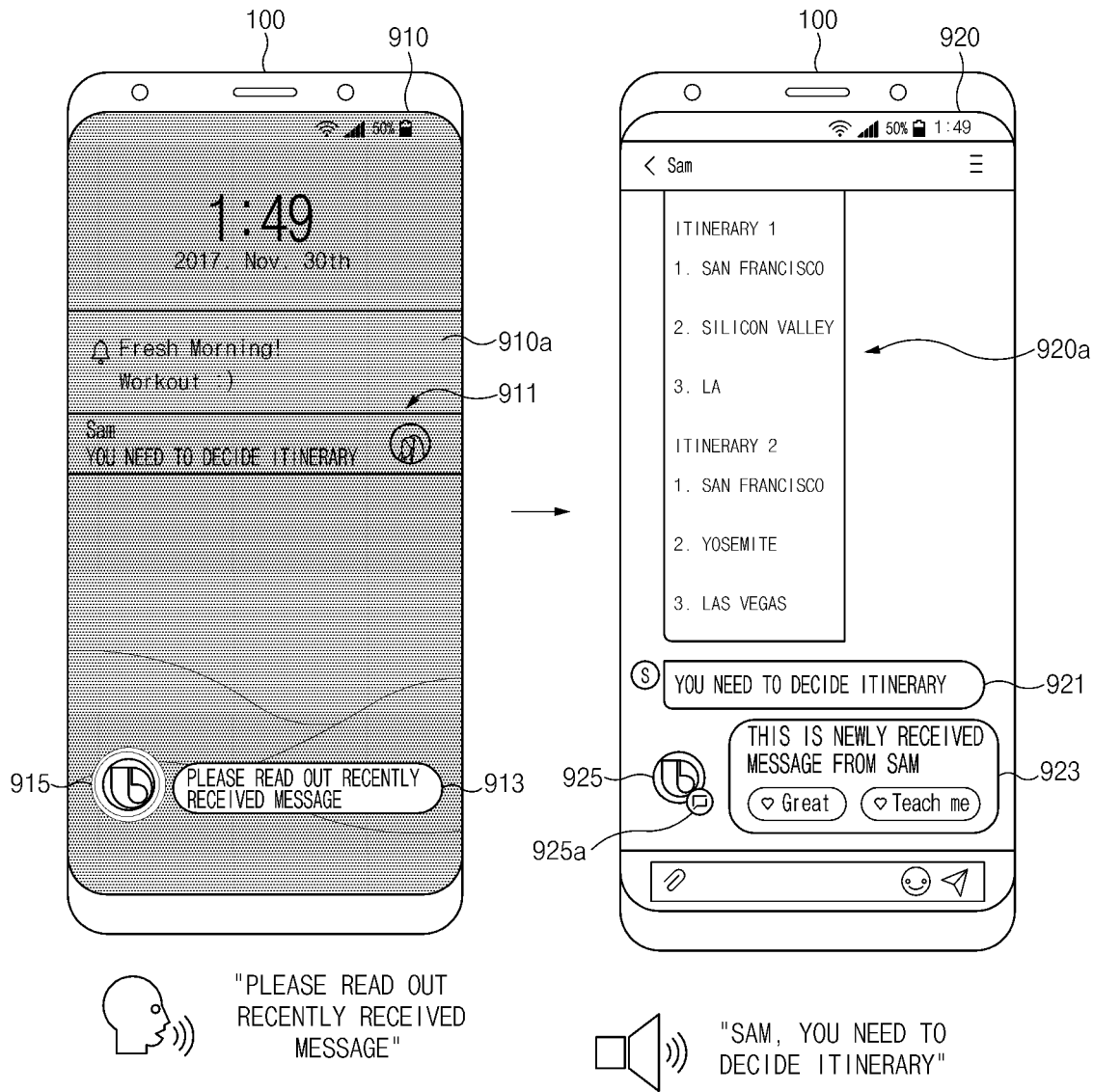
FIG. 9 is a screen in which a user terminal performs a reading function, according to certain embodiments.

FIG. 9 is a screen in which the user terminal 100 performs a reading function, according to certain embodiments.

Referring to FIG. 9, the user terminal 100 may perform a reading function (e.g., a text-to-speech function) to output the content of a message displayed on a user interface (UI) 910*a* of the executed message app, through a speaker (e.g., the speaker 130 of FIG. 2).

According to an embodiment, as seen in screen 910, the user terminal 100 may receive a message from an external device, and display a received message 911 through a notification window. For example, the user terminal 100 may display the message 911 saying that "you need to decide itinerary", received from an external device (e.g., an external user terminal), on a notification window 910*a*. According to an embodiment, the user terminal 100 may receive a user input requesting output the content of the received message through the speaker. For example, the user terminal 100 may receive a voice input stating "please read out recently received message." According to an embodiment, as the user terminal 100 processes the voice input in order to extract the text, the user terminal 100 may display a text 913 corresponding to the received voice input on the display. According to an embodiment, the user terminal 100 may further display an indicator 915, which corresponds to an app processing the voice input, on the display.

According to an embodiment, in screen 920, the user terminal 100 may execute an app (e.g., a message app) for transmitting and receiving messages, and display a UI 920*a* of the executed app on a display. For example, the UI 920*a* may include a received message 921. According to an embodiment, and as described above, the user terminal 100 may output the content of the received message in response to the received user input. For example, the user terminal 100 may output information (e.g., "Sam, you need to decide itinerary") about at least one of a text and a sender, which are included in the message, through the speaker. Furthermore, the user terminal 100 may display guide information 923 corresponding to the output message on the display.

According to an embodiment, the user terminal 100 may display indicators 915 and 925 corresponding to an app that is processing the user input, on the display. According to an embodiment, the user terminal 100 may vary display of the indicators 915 and 925 depending on the action of the app. According to an embodiment, the user terminal 100 may display marks 925*a* of an app (e.g., a message app) currently executed, on the indicators 925.

According to an embodiment, a user of the user terminal 100 may be in a state where the user cannot view the display (e.g., or in an "eye free" state). When the user is in an eye free state, the user terminal 100 may perform the reading function (e.g., the text-to-speech function). According to an embodiment, when the user is in an eye free state, the user terminal 100 may receive a user input to perform a reading function, through a microphone. As such, the user may receive the content of the received message without looking at the display.

According to an embodiment, in screen 910 and screen 920, the user terminal 100 may output utilized information through the speaker, without displaying a screen from processing a user input on the display.

Figure 10:
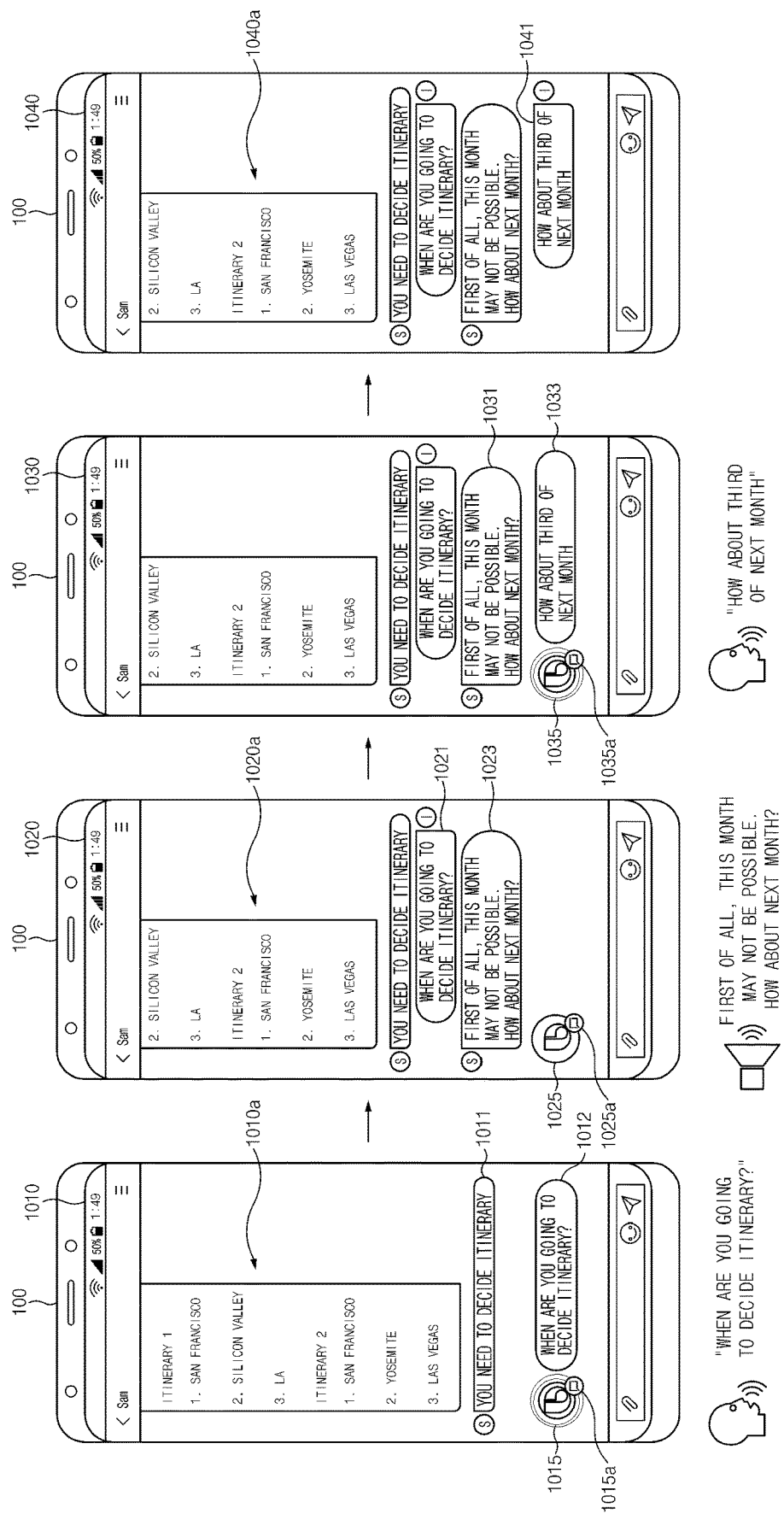
FIG. 10 is a screen illustrating an operation of transmitting and receiving a message in a chatting mode of a user terminal, according to certain embodiments.

FIG. 10 is a screen illustrating an operation of transmitting and receiving a message in a chatting mode of the user terminal 100, according to certain embodiments.

Referring to FIG. 10, the user terminal 100 may output a first message (e.g., "you need to decide itinerary") received from an external device, through a speaker (e.g., the speaker 130 of FIG. 2), and may execute a "chatting mode" to transceive further messages, as will be described below.

According to an embodiment, in screen 1010, the user terminal 100 may receive a user input for generation of a second message 1012. The second message 1012 may be a reply to the received first message 1011. For example, the user terminal 100 may receive a user input to transmit a second message 1012 as a reply message including the text, "when are you going to decide the itinerary?", which is the reply of the first message 1011 saying that "you need to decide itinerary". According to an embodiment, the user terminal 100 may then transmit the second message 1012 to an external device. According to an embodiment, the user terminal 100 may execute a message app for displaying the received message and visual elements corresponding to a user input, and may further display a UI 1010*a* of the executed message app on a display. According to an embodiment, the user terminal 100 may display the first message 1011 and the second message 1012 on the UI 1010*a*.

According to an embodiment, the user terminal 100 may receive a third message 1023 from the external device, the third message 1023 being the reply to the transmitted second message 1021. For example, the third message 1023 may include the text, "first of all, this month may not be possible. How about next month?". According to an embodiment, the user terminal 100 may display the third message 1023 on the UI 1020*a* of the message app. According to an embodiment, the user terminal 100 may output the third message 1023 through the speaker using text-to-speech functionality. For example, the user terminal 100 may output at least one (e.g., "Sam, this month may not be possible. How about next month?") of the text of the third message 1023 and information about a sender, through the speaker.

According to an embodiment, in screen 1030, the user terminal 100 may receive a user input to generate transmit a fourth message in reply to a third message 1031 (e.g., 1023 in screen 1020) using a microphone. For example, the user terminal 100 may receive a user input saying that "How about the 3rd of next month?" the text of which forms the fourth message, through the microphone. According to an embodiment, the user terminal 100 may display a text 1033 extracted from the user input on a display.

According to an embodiment, in screen 1040, after transmitting the fourth message 1041, the user terminal 100 may display the transmitted fourth message 1041 on the UI 1040*a* of the message app.

According to an embodiment, the user terminal 100 may display indicators 1015, 1025, and 1035 corresponding to an app for processing a user input, on the display. According to an embodiment, the user terminal 100 may vary display of the indicators 1015, 1025, and 1035 depending on a state for processing a user input. According to an embodiment, the user terminal 100 may display an app (e.g., a message app), which is currently executed, on the indicators 1015, 1025, and 1035 (1015*a*, 1025*a*, and 1035*a*).

According to an embodiment, when receiving a message, the user terminal 100 may perform a reading function. According to an embodiment, when completing the execution of the reading function or when transmitting a message, the user terminal 100 may change the state of microphone to an operation state.

Figure 11:
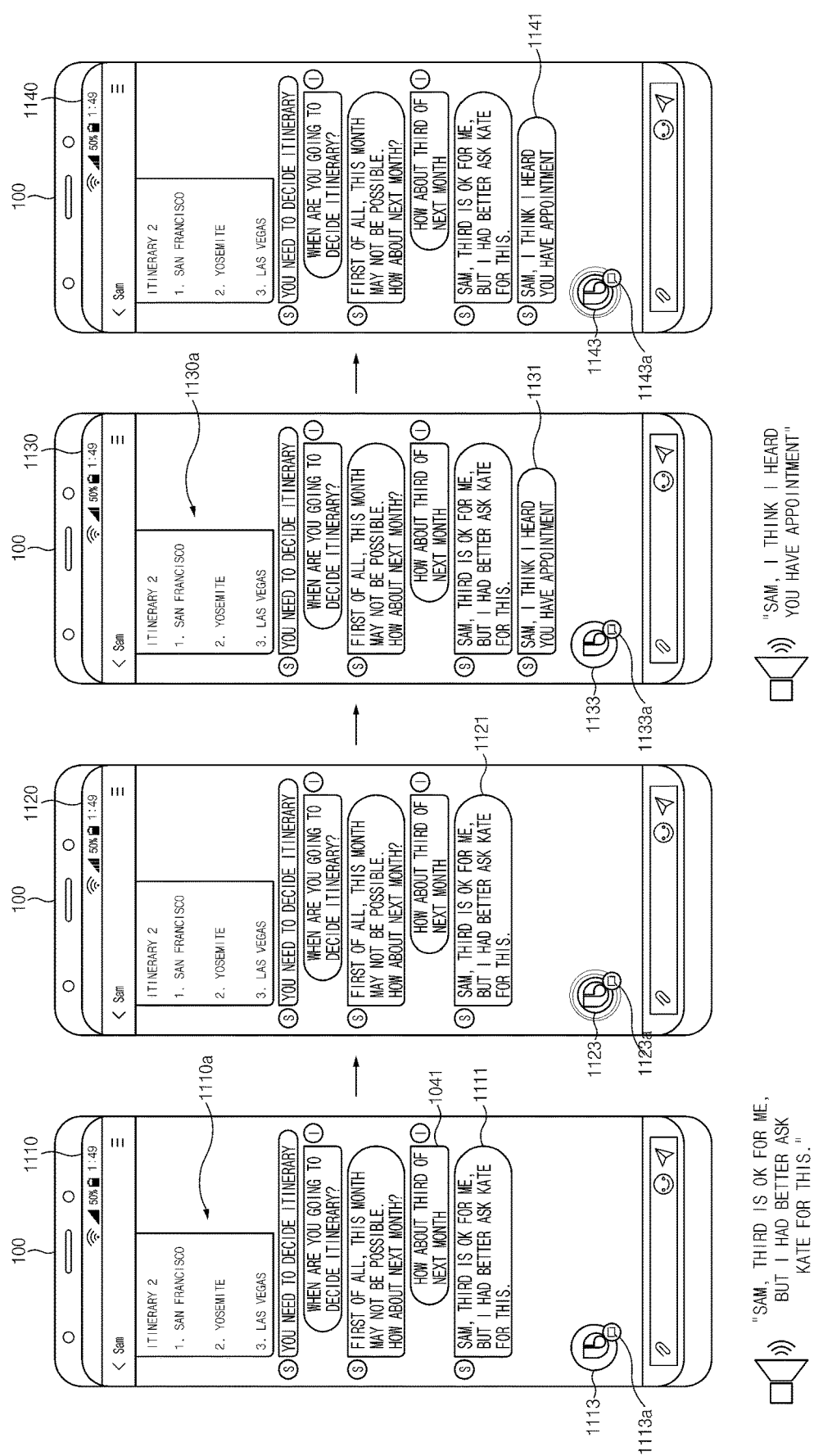
FIG. 11 is a screen illustrating an operation of continuously receiving a message in a chatting mode of a user terminal, according to an embodiment.

According to an embodiment, in screen 1010 to screen 1040, the user terminal 100 may output utilized information through the speaker, without displaying a screen, in which a user input is processed, on the display. FIG. 11 is a screen illustrating an operation of continuously receiving a message in a chatting mode of the user terminal 100, according to an embodiment.

Referring to FIG. 11, before receiving a user input to transmit a reply to the received first message (e.g., "the third is OK for me, but I had better ask Kate for this."), the user terminal 100 may receive a second message (e.g., "I think I heard you have an appointment.").

According to an embodiment, in screen 1110, the user terminal 100 may receive a first message 1111 from the external device and display the first message 1111 on a UI 1110*a* of the executed message app. According to an embodiment, the user terminal 100 may output at least one (e.g., "Sam, the third is OK for me, but I had better ask Kate for this.") of the text of the first message 1111 and information about a sender, through a speaker (e.g., the speaker 120 of FIG. 2).

According to an embodiment, in screen 1120, the user terminal 100 may be in a state (e.g., a listening state) for receiving a user input. For example, the user input may be a request to transmit a message in reply to the first message 1121 (e.g., 1111 of screen 1110).

According to an embodiment, in screen 1130, before receiving the user input, the user terminal 100 may receive a second message 1131 from the external device. For example, the user terminal 100 may receive the second message 1131 before a reply can be formulated. According to an embodiment, the user terminal 100 may display the received second message 1131 on a UI 1130*a* of the message app. According to an embodiment, the user terminal 100 may output at least one of the text of the second message 1131 and information about a sender, through the speaker, such as "Sam—I think I heard you have appointment." For example, the user terminal 100 may switch from a state designated for receiving user inputs, to a new state for audially reproducing the second message 1131 (e.g., via a text-to-speech function).

According to an embodiment, in screen 1140, after completing read-back of the second message 1131, the user terminal 100 may again enter into a state for receiving a user input. For example, the user input may be for generation and transmission of a message in reply to the second message 1141 (e.g., 1131 of screen 1130).

According to an embodiment, the user terminal 100 may vary display of the indicators 1113, 1123, 1133, and 1143 depending on a state for processing a user input. For example, in screen 1110 and screen 1130 in which the received message is output, the user terminal 100 may display the indicators 1113 and 1133 in a first state (e.g., white or no-effect); in screen 1120 and screen 1140 in which a user input is received, the user terminal 100 may display the indicators 1123 and 1143 in a second state (e.g., blue or wave effect). According to an embodiment, the user terminal 100 may display marks 1113*a*, 1123*a*, 1133*a*, and 1143*a* of an app (e.g., a message app), which is currently executed, on the indicators 1113, 1123, 1133, and 1143.

According to an embodiment, when receiving a message from the external device, the user terminal 100 may immediately output the content of the received message. In other words, when receiving the message from the external device, the user terminal 100 may output the content of the received message, without waiting for a user input to output a message.

According to an embodiment, in screen 1110 to screen 1140, the user terminal 100 may output utilized information through the speaker, without displaying a screen, in which a user input is processed, on the display.

Figure 12:
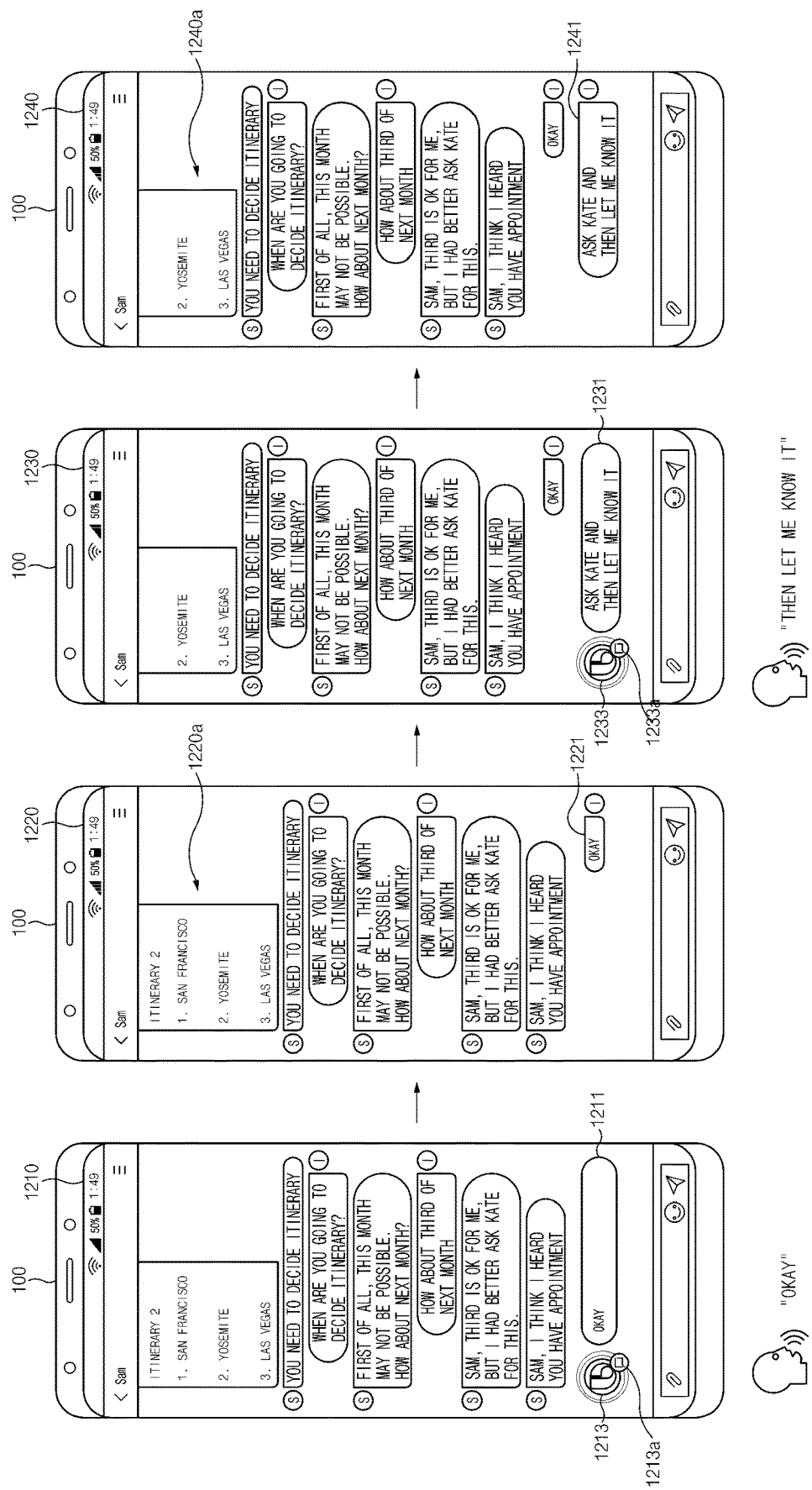
FIG. 12 is a screen illustrating an operation of continuously receiving a user input in a chatting mode of a user terminal, according to an embodiment.

FIG. 12 is a screen illustrating an operation of continuously receiving a user input in a chatting mode of the user terminal 100, according to an embodiment.

Referring to FIG. 12, before receiving a message in reply to the transmitted first message (e.g., "okay"), the user terminal 100 may transmit a second message 1231 to the external terminal (e.g., "ask Kate and then let me know it!").

According to an embodiment, in screen 1210, the user terminal 100 may receive a user input to transmit a first message in reply to the received message. For example, the user input may be a user input of a message that is the reply of the received message. According to an embodiment, the user terminal 100 may display a text 1211 corresponding to the received user input on a display. According to an embodiment, the user terminal 100 may transmit the first message to an external device.

According to an embodiment, in screen 1220, the user terminal 100 may display the transmitted first message 1221 on a UI 1220*a* of the executed message app. According to an embodiment, when not receiving a user input during a specified time or when not receiving a message during a specified time, the state of the user terminal 100 may be switched to a state where a microphone is not operated.

According to an embodiment, in screen 1230, the user terminal 100 may receive a user input to transmit a second message. For example, the user input may include a specified word for changing the state of the user terminal 100. The specified word may include at least one of a wakeup command, a sender's name, and a command to send a message. According to an embodiment, when recognizing the specified word, the state of the user terminal 100 may be switched to a state where a user input is capable of being received. In other words, when recognizing the specified word, the state of the user terminal 100 may be switched to a state where a user input received through a microphone is capable of being processed. According to an embodiment, the user terminal 100 may display a text 1231 corresponding to the received user input on a display. According to an embodiment, the user terminal 100 may transmit the second message to the external device.

According to an embodiment, in screen 1240, the user terminal 100 may display the transmitted second message 1241 on a UI 1240 of the executed message app.

According to an embodiment, in screen 1210 and screen 1230 in which a user input is received, the user terminal 100 may display indicators 1213 and 1233 in a specified state. For example, the specified state may be a state displayed in white and no-effect. According to an embodiment, in screen 1220 and screen 1240 in which a microphone is not operated, the user terminal 100 may not display an indicator. According to an embodiment, the user terminal 100 may display marks 1213a and 1233a of the currently executed app, on the indicators 1213 and 1233.

According to an embodiment, in screen 1210 to screen 1240, the user terminal 100 may output utilized information through the speaker, without displaying a screen, in which a user input is processed, on the display.

Figure 13:
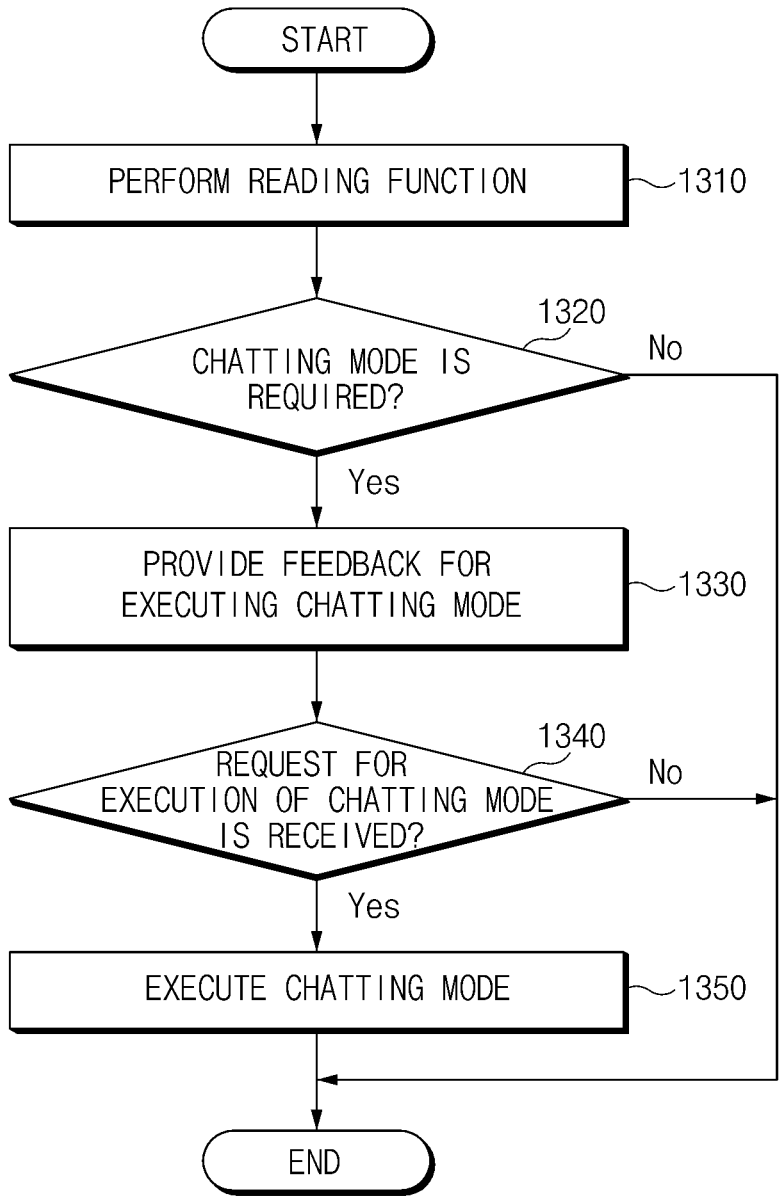
FIG. 13 is a flowchart illustrating an operation in which the mode of a user terminal is changed to a chatting mode, according to certain embodiments.

FIG. 13 is a flowchart 1300 illustrating an operation in which the mode of the user terminal 100 is changed to a "chatting mode" (e.g., a conversational mode), according to certain embodiments.

According to an embodiment, the operation of the user terminal 100 described below may be an operation performed after a processor (e.g., the processor 150 of FIG. 2) executes a program module stored in memory.

According to an embodiment, in operation 1310, the user terminal 100 may perform a reading function of the received message (e.g., execute a text-to-speech on a received text message, and audially read out the received text). According to an embodiment, the user terminal 100 may receive a first user input associated with the received first message. According to an embodiment, the user terminal 100 may change the first text included in the message received in response to a first user input, into a speech and may provide the changed speech through a speaker.

According to an embodiment, in operation 1320, the user terminal 100 may determine whether a chatting mode is to be utilized. According to an embodiment, the user terminal 100 may determine whether execution of a chatting mode is to be executed, based on at least one of the received first message, and a second user input that is based on a voice. For example, the second user input (e.g., a voice input) may request transmission of a second message in reply to the first message. For example, the user terminal 100 may determine whether the additional operation is to be utilized, based on a user input requesting generation of the reply. For another example, the user terminal 100 may determine whether the additional operation is to be utilized, based on the attribute of the received first message. For example, the attribute of the received first message may include the contact frequency of a sender, or whether the first message includes a reply request. That is, chatting mode can be initiated based on the received text message and a voice command from a user received corresponding to the received text message (e.g., a voice command and input to generate a reply); a specific user input requesting the chatter mode (e.g., selection of an icon or hardware button, or specific voice command); an attribute of or related the received first message (e.g., contact frequency with the sender of the message, a reply request included in the first message, or some other known text or combination of text strings include in the first message).

According to an embodiment, in operation 1320, when a chatting mode (e.g., a conversational mode) is not to be utilized (e.g., the path designated by "No"), the user terminal 100 may terminate operations. According to an embodiment, the user terminal 100 may determine whether an app (or a message app) for transmitting or receiving a message supports a chatting mode. When the message app does not support the chaffing mode, the user terminal 100 may terminate a processor after executing the reading function.

According to an embodiment, when the chatting mode is to be utilized (Yes), in operation 1330, the user terminal 100 may provide a user with feedback for executing the chatting mode. For example, the user terminal 100 may provide a display element (such as a guide) for entering a mode for executing the additional operation, based on at least part of the determination of operation 1320.

According to an embodiment, in operation 1340, the user terminal 100 may determine whether a user input verifying the execution of the chaffing mode is received. For example, the user terminal 100 may receive a third user input executing the additional operation, based on at least part of the determination of operation 1320. According to an embodiment, when the user input is not received (e.g., "No"), the user terminal 100 may complete the execution of the reading function and terminate the operation. For example, when receiving a user input prohibiting the execution of the chatting mode, the user terminal 100 may terminate the operation.

According to an embodiment, when receiving a user input indicates a positive request for execution of the chatting mode (e.g., "Yes"), in operation 1350, the user terminal 100 may execute the chatting mode. For example, the user terminal 100 may enter the chatting mode for performing an additional operation, based at least partly on the determination of operation 1320 or the third user input received in operation 1340. For example, in response to a second user input to transmit the second message that is the reply of the received first message, the additional operation may be an operation of receiving a user utterance through a microphone, changing the user utterance into a second text, and transmitting a second message including the second text to an electronic device. According to an embodiment, when a message app supports a chatting mode, the user terminal 100 may enter the chatting mode. As such, the user terminal 100 may transmit or receive a message according to a user input.

FIGS. 14A, 14B, 14C and 14D are screens in which a chatting mode of the user terminal 100 is executed, according to certain embodiments.

Figure 14A:
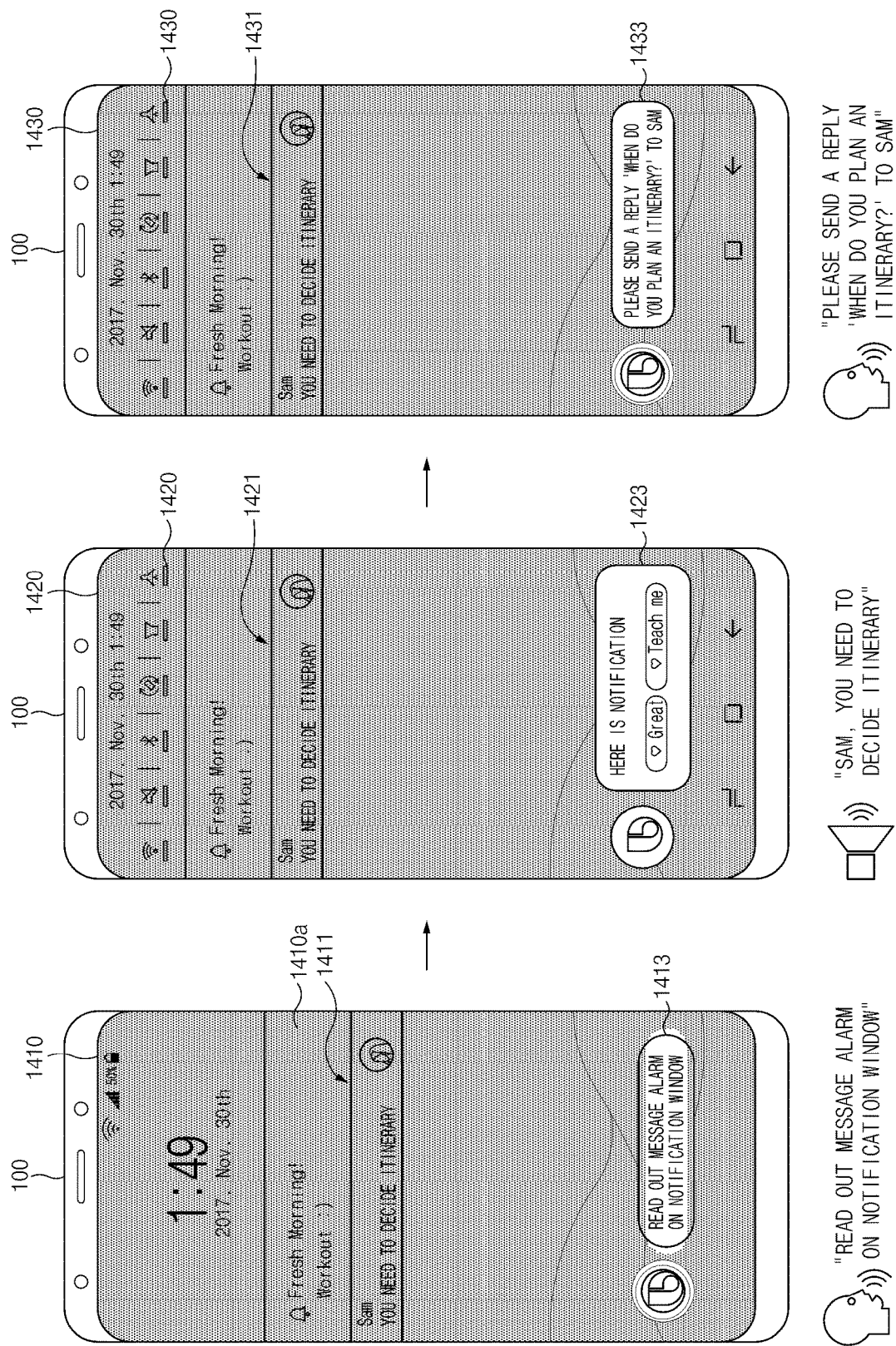
FIG. 14A, FIG. 14B, FIG. 14C and FIG. 14D are screens in which a chatting mode of a user terminal is executed, according to certain embodiments.
Figure 14B:
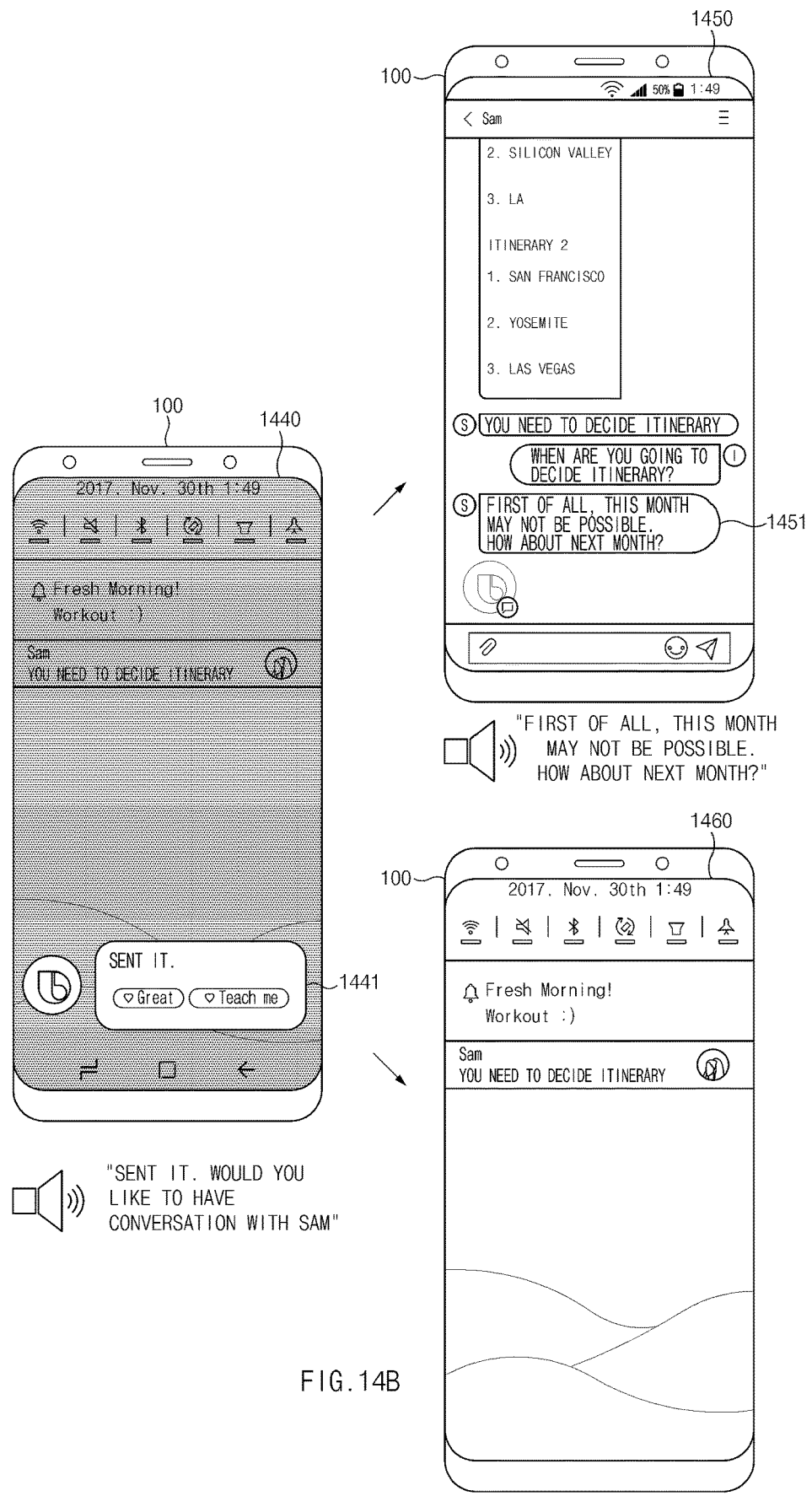

Referring to FIGS. 14A and 14B, the user terminal 100 may provide a user with a procedure in which a user input is processed, through a display.

According to an embodiment, in screen 1410, the user terminal 100 may receive a user input requested read-back of a first message 1411 that is displayed on a notification window 1410a. For example, the user terminal 100 may receive a vocal user input stating: "read out message alarm on notification window!" According to an embodiment, the user terminal 100 may display a text corresponding to the received user input, on a mark 1413 of the display.

According to an embodiment, in screen 1420, the user terminal 100 may output the content a first message 1421 (e.g., 1411 of screen 1410) received through a speaker (e.g., using text-to-speech). For example, the user terminal 100 may output a first message stating, "Sam, you need to decide itinerary", through a speaker. According to an embodiment, the user terminal 100 may display guide information 1423 corresponding to output of the message, on the display.

According to an embodiment, in screen 1430, the user terminal 100 may receive a user input to transmit a second message 1431 (e.g., 1421 of screen 1420) as a reply to the first message. For example, the user terminal 100 may receive a vocal user input stating, "please send a reply, 'when do you plan an itinerary?' to Sam." According to an embodiment, the user terminal 100 may display a text 1433 processed from the vocal user input corresponding to the received user input on the a display. According to an embodiment, the user terminal 100 may transmit the second message to the external device. According to an embodiment, the user terminal 100 may determine whether it is the chatting mode is to be utilized. For example, the user terminal 100 may determine whether to execute the chatting mode, based on the transmitted second message (e.g., "when do you plan an itinerary?"). For example, while awaiting for the answer from the counterpart, to which the second message (e.g., a question-type message) was transmitted, the user terminal 100 may determine whether to execute the chatting mode.

According to an embodiment, in screen 1440, when it is determined to execute the chatting mode, the user terminal 100 may provide a user with feedback for verifying the execution of the chatting mode. Moreover, the user terminal 100 may provide a user with a result of performing a path rule corresponding to a user utterance for transmitting a second message. For example, the user terminal 100 may output a query saying that "Sent it. Would you like to have conversation with Sam?" through a speaker.

According to an embodiment, in screen 1450, when receiving a positive user input responsive to the query (e.g., "yes!"), the user terminal 100 may execute a chatting mode. The user terminal 100 may display the UI of a message app on a display. According to an embodiment, the user terminal 100 may receive a third message 1451 from an external device and may display the third message 1451 on the UI of the message app. For example, the user terminal 100 may receive a third message 1451 "first of all, this month may not be possible. How about next month?" According to an embodiment, the user terminal 100 may output the content of the third message 1451 through the speaker (e.g., the speaker 130 of FIG. 2). For example, the user terminal 100 may output at least one (e.g., "Sam, most of all, this month may not be possible. How about next month?") of the text and information about a sender, through the speaker.

According to an embodiment, in screen 1460, when receiving a user input (e.g., "No!") not to make a request for the execution of the chatting mode, the user terminal 100 may terminate without executing a chatting mode.

Figure 14C:
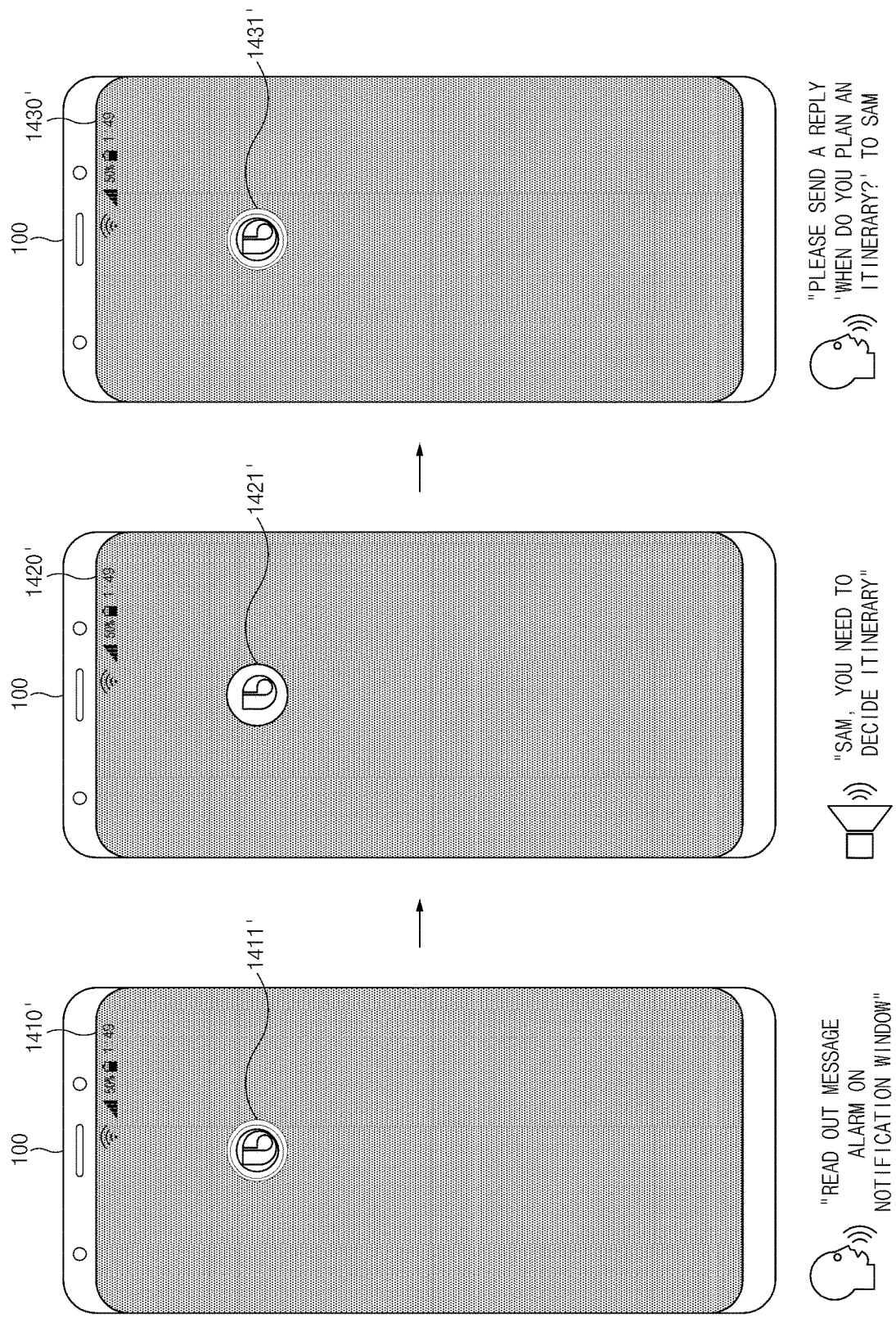
Figure 14D:
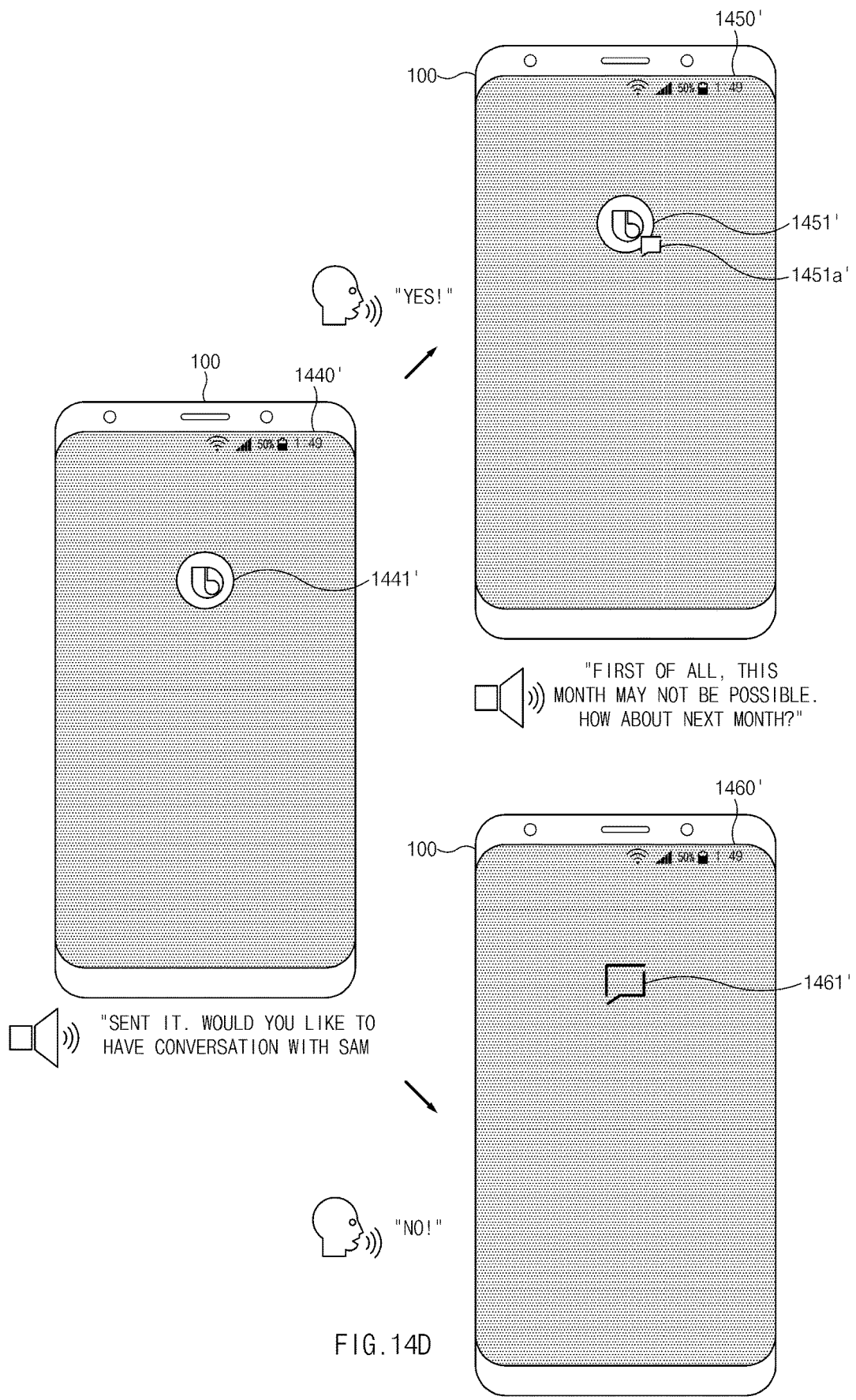

Referring to FIGS. 14C and 14D, the user terminal 100 may not provide a user with a procedure in which a user input is processed, through a display. When the user is in a state where the user cannot see the display (or the eye free state), the user terminal 100 may display at least a part of the processing procedure of the user input on the display or may not display the processing procedure.

According to an embodiment, in screen 1410', the user terminal 100 may receive a user input for performing a reading function of the received first message. According to an embodiment, the user terminal 100 may display a first indicator 1411' of an app for processing a user input. For example, the first indicator 1411' may display a first state (e.g., black) for receiving a user input.

According to an embodiment, in screen 1420', the user terminal 100 may output the received first message through a speaker. The user terminal 100 may display a first indicator 1421' of an app for processing a user input. For example, the first indicator 1421' may be displayed in a second state (e.g., white) for outputting the received message.

According to an embodiment, in screen 1430', the user terminal 100 may receive a user input to transmit a second message that is the reply of the first message. According to an embodiment, the user terminal 100 may display a first indicator 1431' of an app for processing a user input. For example, the first indicator 1431' may be displayed in the first state (e.g., black) for receiving a user input so as to be the same as screen 1410'. According to an embodiment, the user terminal 100 may determine to execute the chatting mode.

According to an embodiment, in screen 1440', when it is determined to execute the chatting mode, the user terminal 100 may provide a user with a feedback for verifying the execution of the chatting mode. Moreover, the user terminal 100 may provide a user with a result of performing a path rule corresponding to a user utterance for transmitting a second message. According to an embodiment, the user terminal 100 may display a first indicator 1441' of an app for processing a user input. For example, the first indicator 1441' may be displayed in the second state (e.g., white) for receiving a user input so as to be the same as screen 1420'. According to an embodiment, the user terminal 100 may determine whether it is utilized to execute the chatting mode.

According to an embodiment, in screen 1450', when receiving a user input (e.g., "yes!") to make a request for the execution of the chatting mode, the user terminal 100 may execute a chatting mode. According to an embodiment, the user terminal 100 may receive a third message from an external device and may output the content of the received third message. According to an embodiment, the user terminal 100 may display a first indicator 1451' of an app for processing a user input. For example, the first indicator 1451' may be displayed in the second state (e.g., white) for receiving a user input so as to be the same as screen 1420'. According to an embodiment, the user terminal 100 may display a mark 1451a' indicating a message app on the indicator 1451'.

According to an embodiment, in screen 1460', when receiving a user input (e.g., "No!") not to make a request for the execution of the chatting mode, the user terminal 100 may terminate without executing a chatting mode. According to an embodiment, the user terminal 100 may display a second indicator 1461' indicating a state where the message is received, on the display.

Figure 15:
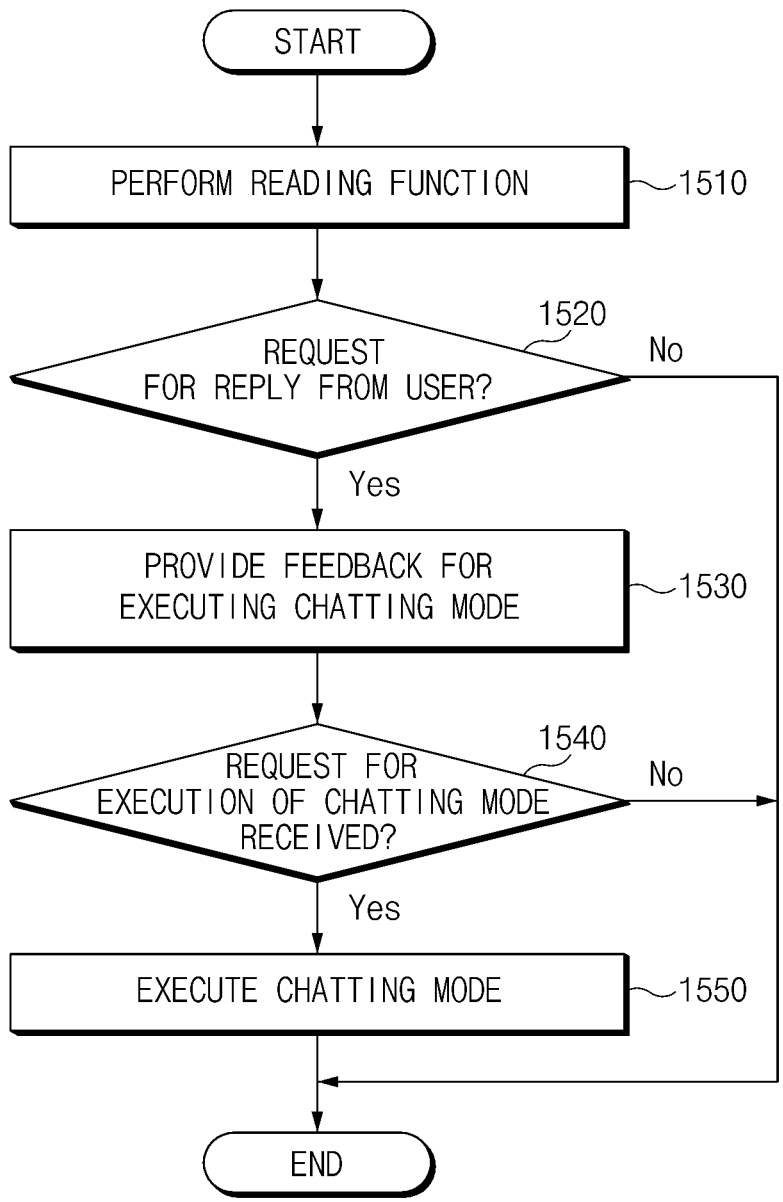
FIG. 15 is a flowchart illustrating an operation in which the mode of the user terminal 100 is changed to a chatting mode after a user terminal receives a reply transmitting request, according to certain embodiments.

FIG. 15 is a flowchart 1500 illustrating an operation in which the mode of the user terminal 100 is changed to a chatting mode after the user terminal 100 receives a reply transmitting request, according to certain embodiments.

Referring to FIG. 15, according to an embodiment, when determining whether the chatting mode in operation 1320 of FIG. 13 is to be utilized, the user terminal 100 may determine whether to make a request for a reply from a user. An operation of the user terminal 100 may be similar to the operation of changing to the chatting mode of FIG. 13.

According to an embodiment, the operation of the user terminal 100 described below may be an operation performed after a processor (e.g., processor 150 of FIG. 2) executes a program module stored in memory.

According to an embodiment, in operation 1510, the user terminal 100 may perform a reading function of the received first message (e.g., a text-to-speech function).

According to an embodiment, in operation 1520, the user terminal 100 may determine whether a request for generation and transmission a reply is detected from a user. In other words, the user terminal 100 may determine whether a chatting mode is to be utilized based on whether the user wishes to generate a response. For example, when receiving a specified user input (e.g., "please reply!") from the user, the user terminal 100 may determine that a chatting mode is to be utilized. According to an embodiment, when the message app does not request the execution of the chatting mode (e.g., "No"), the user terminal 100 may complete the execution of the reading function and may terminate the operation.

According to an embodiment, when the message app requests execution of the chatting mode (e.g., "Yes"), in operation 1530, the user terminal 100 may provide the user with a feedback for executing the chatting mode similarly to operation 1330 of FIG. 13.

According to an embodiment, in operation 1540, the user terminal 100 may determine whether a user input for verifying the execution of a chatting mode is received, (e.g., similar to operation 1340 of FIG. 13). According to an embodiment, when not receiving the user input (No), the user terminal 100 may complete the execution of the reading function and may terminate the operation.

According to an embodiment, when receiving a user input to make a request for the execution of the chatting mode (Yes), in operation 1550, the user terminal 100 may execute the chatting mode similarly to operation 1360 of FIG. 13. As such, the user terminal 100 may transmit or receive a message according to a user input.

According to another embodiment, the user terminal 100 may determine whether the user is in a state (or an eye free state) where the user cannot see the display, between the operation 1510 and operation 1520. According to an embodiment, when the user terminal 100 is in a specified state, the user terminal 100 may determine that the state is the eye free state. For example, when the user terminal 100 is set to the driving mode or connected to a car-kit, the user terminal 100 may determine that the state is the eye free state (e.g., driving state). For another example, when the user terminal 100 senses that an object is in close, through at least one of the proximity sensor and the illuminance sensor, the user terminal 100 may determine that the state is the eye free state (e.g., a state where the display is covered). In other words, the user terminal 100 may determine whether an object is present in a direction in which a display indicates a message. For another example, when the user terminal 100 senses a cover at a specified location through the magnetic sensor, the user terminal 100 may verify the eye free state (e.g., a state where the cover is closed). For another example, when the user's heart rate is not less than a specified value, the user terminal 100 may determine that the state is the eye free state (e.g., a movement state), through the heart rate machine (HRM). According to an embodiment, when a user is in an eye free state, the user terminal 100 may make a request for the execution of a chatting mode. According to an embodiment, the user terminal 100 may provide the user with a feedback for executing a chatting mode.

According to another embodiment, when the user terminal 100 is in a state set by the user, the user terminal 100 may execute a chatting mode. For example, the user terminal 100 may be configured to execute the chatting mode at a specified time (e.g., 6 to 12 pm). For another example, the user terminal 100 may be configured to execute a chatting mode at a specified location (e.g., home).

Figure 16A:
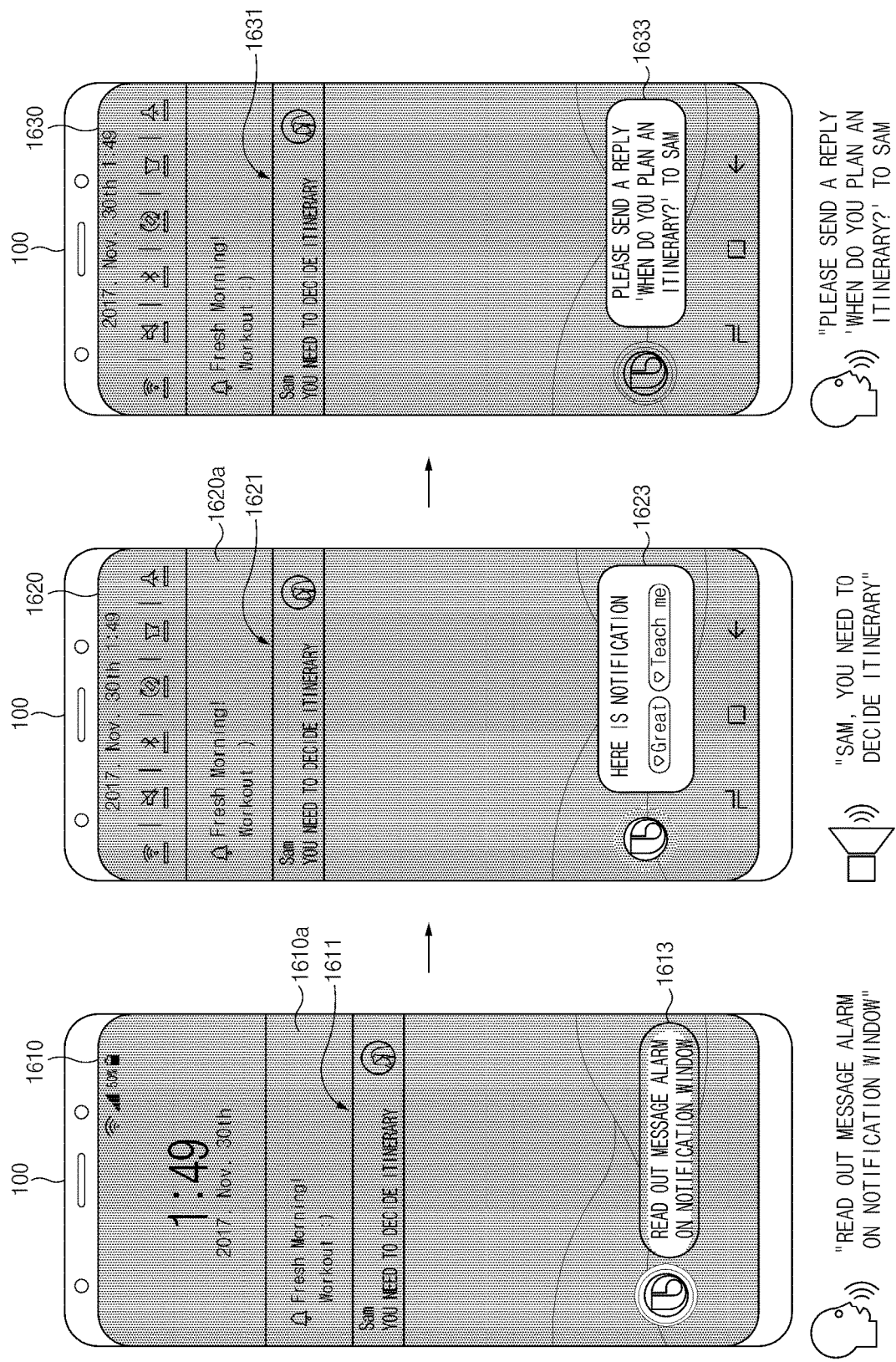
FIG. 16A and FIG. 16B are a screen in which a user terminal receives a reply transmitting request to execute a chatting mode, according to certain embodiments.
Figure 16B:
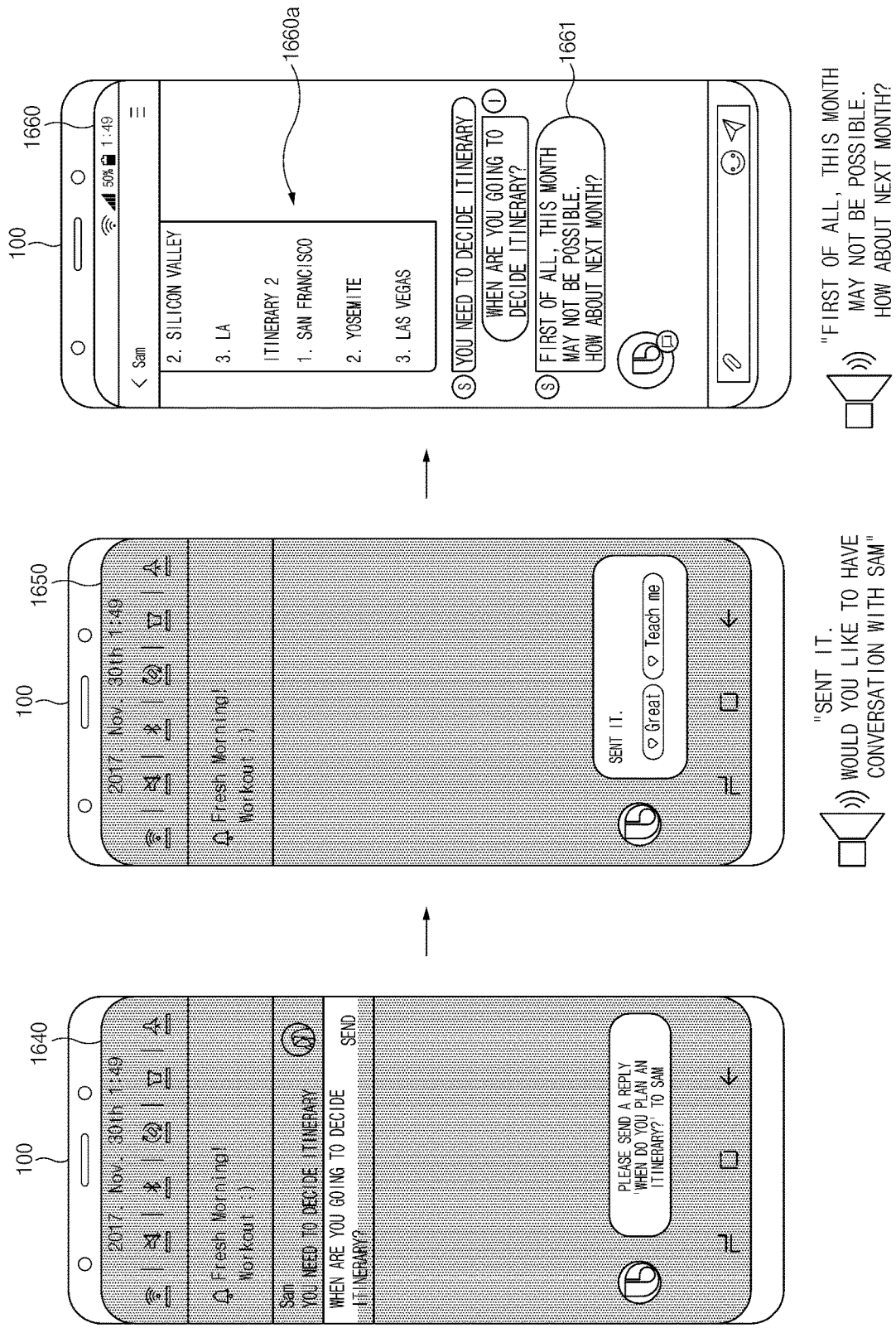
Figure 17A:
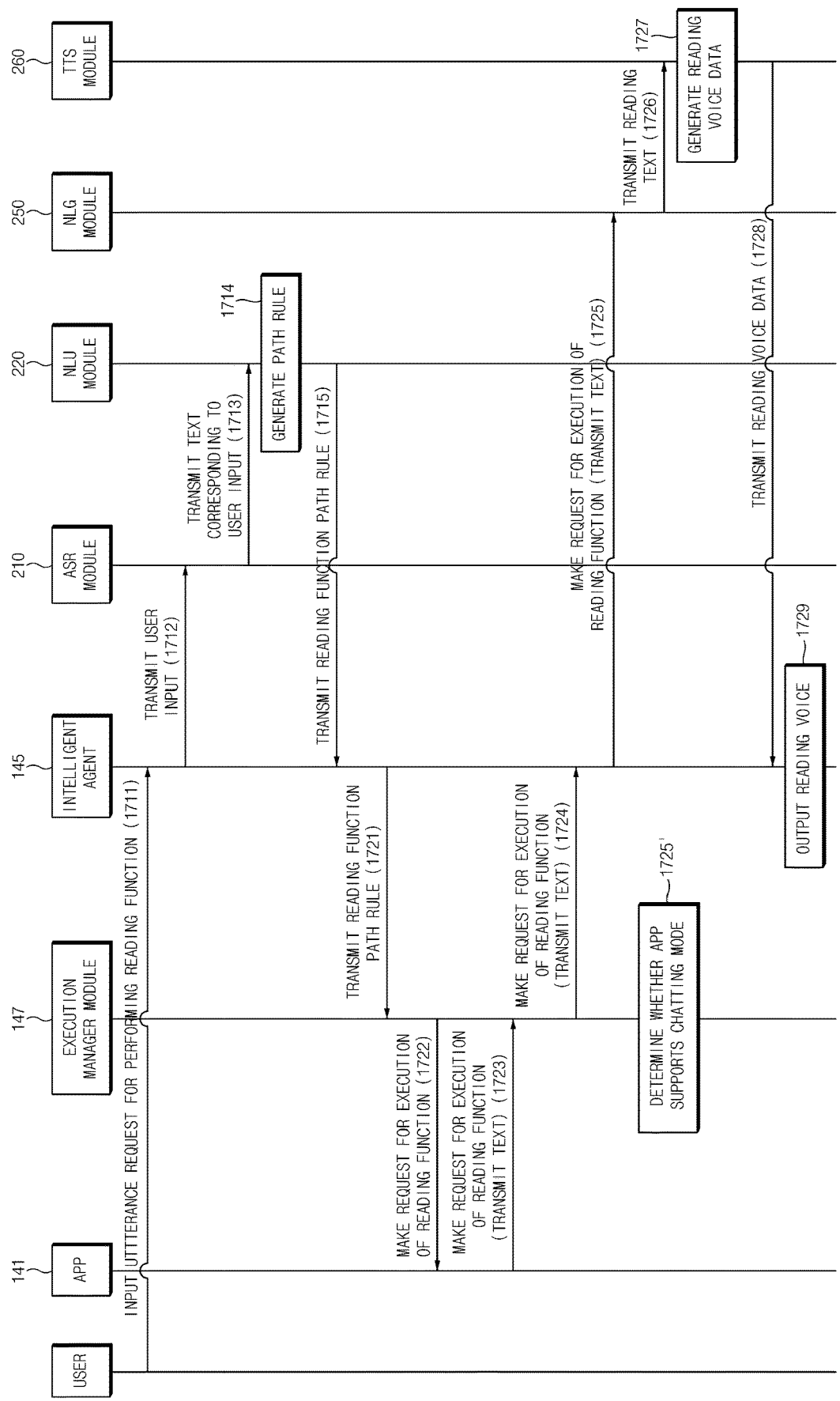
FIG. 17A, FIG. 17B, FIG. 17C and FIG. 17D are a sequence diagram illustrating that a user terminal receives a reply transmitting request to execute a chatting mode, according to certain embodiments.
Figure 17B:
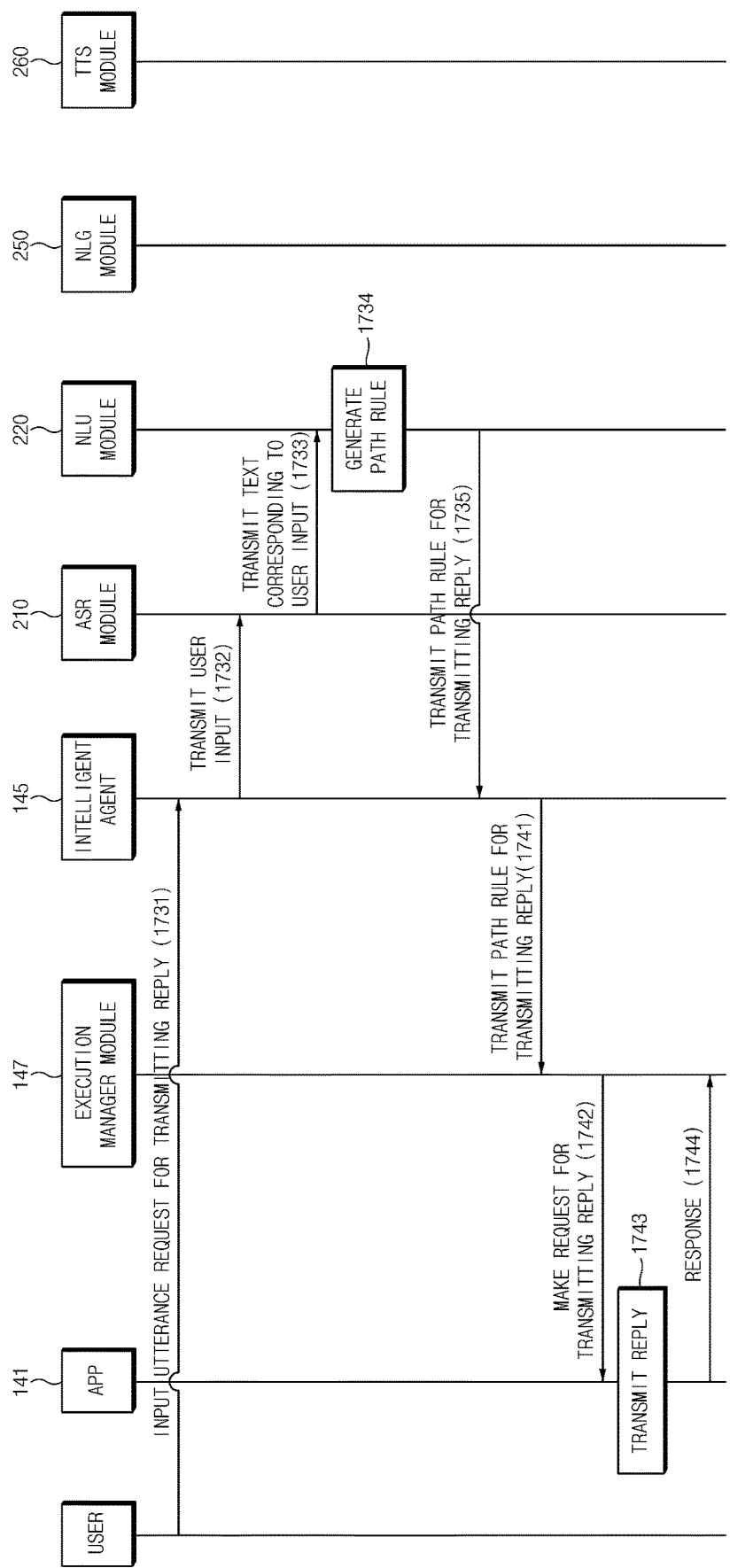
Figure 17C:
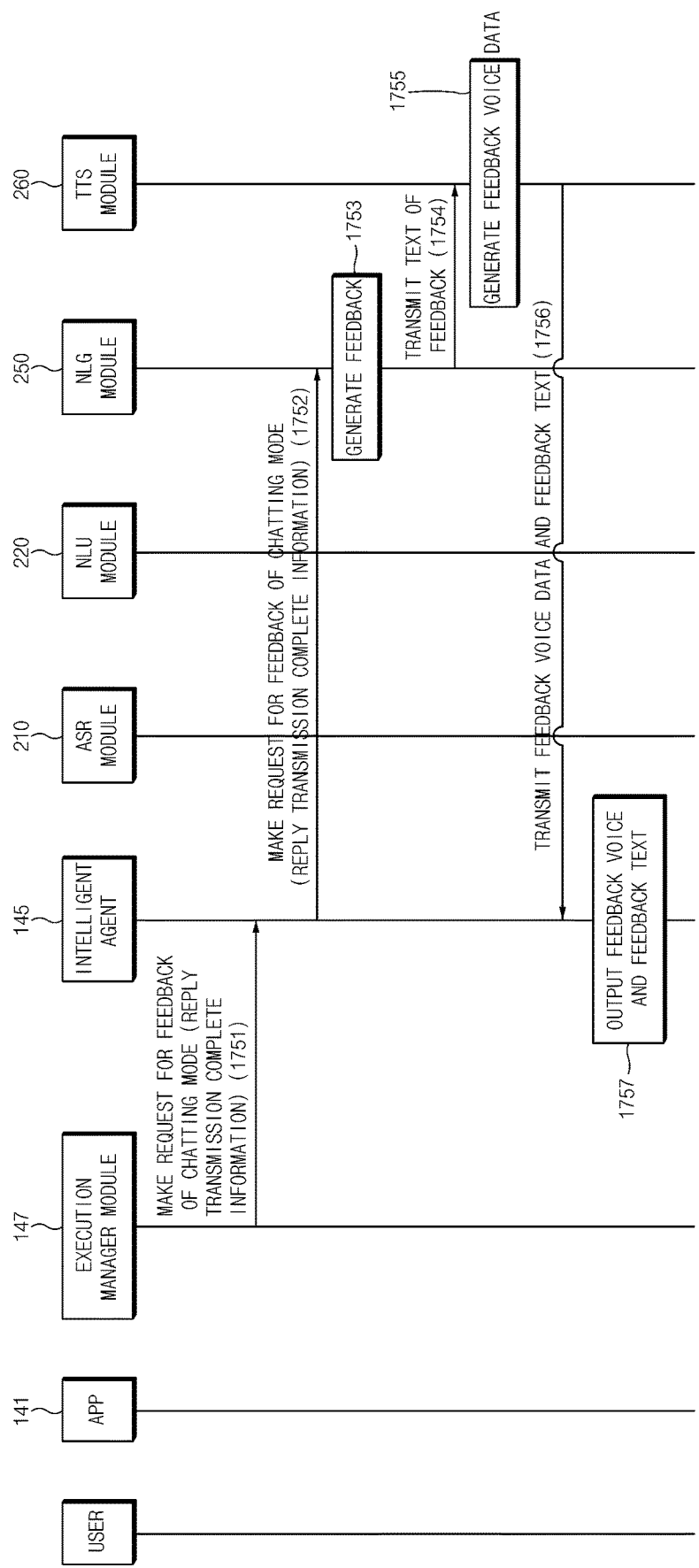
Figure 17D:
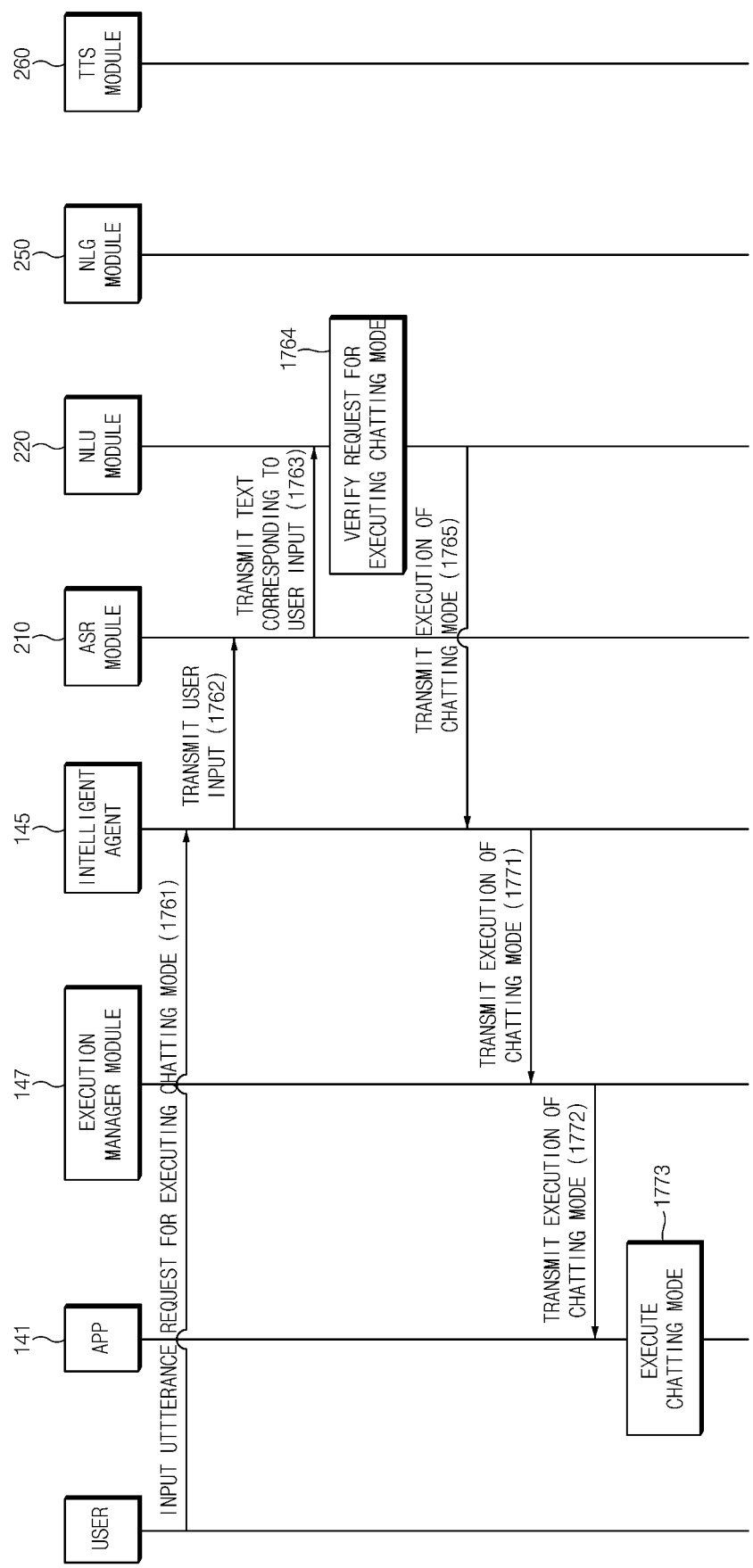

FIGS. 16A and 16B are a screen in which the user terminal 100 receives a reply transmitting request to execute a chatting mode, according to certain embodiments.

According to an embodiment, in screen 1610, the user terminal 100 may receive a user input to perform a reading function on a first message 1611 displayed on a notification window 1610a similarly to screen 1410 of FIG. 14A. According to an embodiment, the user terminal 100 may display a text corresponding to the received user input, on a mark 1613 of the display.

According to an embodiment, in screen 1620, the user terminal 100 may output the content a first message 1621 (e.g., 1611 of screen 1610) received through a speaker similarly to screen 1420 of FIG. 14A. According to an embodiment, the user terminal 100 may display guide information 1623 for outputting a message, on the display.

According to an embodiment, in screen 1630, the user terminal 100 may receive a user input to transmit a second message, which is the reply of the first message 1631 (e.g., 1621 in screen 1620). For example, the user terminal 100 may receive a user input saying that "please send a reply 'when do you plan an itinerary?' to Sam". The user input may include the specified word, for example, "reply". According to an embodiment, the user terminal 100 may display a text 1633 corresponding to the received user input, on a display.

According to an embodiment, in screen 1640, the user terminal 100 may transmit the second message to an external device. According to an embodiment, the user terminal 100 may determine whether it is utilized to execute the chatting mode. For example, the user terminal 100 may determine whether it is utilized to execute the chatting mode, depending on whether a user input includes the specified word. For example, the specified word may include "reply".

According to an embodiment, in screen 1650, when it is determined that it is utilized to execute the chatting mode by recognizing the specified word, the user terminal 100 may provide a user with a feedback for verifying the execution of the chatting mode similarly to screen 1440 of FIG. 14A. Moreover, the user terminal 100 may provide a user with a result of performing a path rule corresponding to a user utterance for transmitting a second message.

According to an embodiment, in screen 1660, when receiving a user input (e.g., "yes!") to make a request for the execution of the chatting mode, the user terminal 100 may execute a chatting mode similarly to screen 1450 of FIG. 14A. According to an embodiment, the user terminal 100 may receive a third message 1661 from an external device and may display the third message 1661 on a UI 1660a of the message app.

FIGS. 17A, 17B, 17C and 17D are a sequence diagram illustrating that the user terminal 100 receives a reply transmitting request to execute a chatting mode, according to certain embodiments.

According to an embodiment, in operation 1711, the intelligent agent 145 of the user terminal 100 may receive a user input for performing a reading function on a first message received from a user. According to an embodiment, in operation 1712, the intelligent agent 145 of the user terminal 100 may forward (or transmit) a user input to an automatic speech recognition module (or an ASR module) 210 of the intelligent server 200. According to an embodiment, in operation 1713, the ASR module 210 of the user terminal 100 may transmit a text corresponding to a user input to the natural language understanding module (or the NLU module) 220. According to an embodiment, in operation 1714, the NLU module 220 of the intelligent server 200 may generate a path rule corresponding to a user input based on the text. For example, the path rule may be a path rule for performing a reading function. According to an embodiment, in operation 1715, the NLU module 220 may forward (or transmit) the generated path rule to the intelligent agent 145 of the user terminal 100.

According to an embodiment, in operation 1721, the intelligent agent 145 of the user terminal 100 may transmit a path rule for performing the reading function, to the execution manager module 147. According to an embodiment, in operation 1722, the execution manager module 147 may make a request for the execution of the reading function for a first message received through the app 141 (e.g., a message app) depending on the transmitted path rule. According to an embodiment, in operation 1723, operation 1724, and operation 1725, the app 141 may transmit a request for performing the reading function together with the text of the first message, to the NLG module 250 of the intelligent server 200 through the execution manager module 147 and the intelligent agent 145. According to an embodiment, in operation 1726, the NLG module 250 may convert the text of the first message into a text (or a reading text) for performing the reading module and may transmit the converted text to the text voice conversion module (or TTS module) 260. According to an embodiment, in operation 1725', the execution manager module 147 may determine whether the app 141 supports a chatting mode. When the app 141 supports the chatting mode, the execution manager module 147 may determine whether it is utilized to execute the chatting mode. According to an embodiment, in operation 1727, the TTS module 260 may generate voice data (or reading voice data) for performing the reading function, based on a reading text. According to an embodiment, in operation 1728, the TTS module 260 may transmit the generated reading voice data to the intelligent agent 145 of the user terminal 100. According to an embodiment, in operation 1729, the intelligent agent 145 may output the reading voice data to a speaker.

According to an embodiment, in operation 1731, the intelligent agent 145 of the user terminal 100 may receive a user input to make a request for transmitting a reply. According to an embodiment, in operation 1732, the intelligent agent 145 may transmit the user input to the ASR module 210 of the intelligent server 200. According to an embodiment, in operation 1733, the ASR module 210 may transmit a text corresponding to a user input to the NLU module 220. According to an embodiment, in operation 1734, the NLU module 220 may generate a path rule corresponding to a user input based on the text. For example, the path rule may be a path rule for transmitting a reply. According to an embodiment, in operation 1735, the NLU module 220 may transmit the generated path rule to the intelligent agent 145 of the user terminal 100.

According to an embodiment, in operation 1741, the intelligent agent 145 of the user terminal 100 may transmit a path rule for transmitting a reply to the execution manager module 147. According to an embodiment, in operation 1742, the execution manager module 147 may make a request for transmitting a reply to the app 141 depending on the path rule. According to an embodiment, in operation 1743, the app 141 may transmit a second message for transmitting a reply, to an external device. According to an embodiment, in operation 1744, the app 141 may notify the execution manager module 147 that the app 141 has transmitted the second message by transmitting a response to the request. According to an embodiment, since a reply request including the specified word of the user is present, the intelligent agent 145 may provide the user with a feedback for executing the chatting mode.

According to an embodiment, when receiving the request, in operation 1751, the execution manager module 147 of the user terminal 100 may transmit, to the intelligent agent 145, the request for providing a feedback of the execution of the chatting mode together with reply transmission complete information. According to an embodiment, in operation 1752, the intelligent agent 145 may transmit, to the NLG module 250 of the intelligent server 200, the feedback request together with the reply transmission complete information. According to an embodiment, in operation 1753, the NLG module 250 may generate a feedback. For example, the feedback may be a feedback for executing the chatting mode. According to an embodiment, in operation 1754, the NLG module 250 may transmit the text of the feedback to the TTS module 260. According to an embodiment, in operation 1755, the TTS module 260 may generate voice data based on the text. According to an embodiment, in operation 1756, the TTS module 260 may transmit not only the generated voice data but also the text data to the intelligent agent 145 of the user terminal 100. According to an embodiment, in operation 1757, the intelligent agent 145 may output feedback voice and feedback text to a speaker and a display, respectively.

According to an embodiment, in operation 1761, the intelligent agent 145 of the user terminal 100 may receive a user input to make a request for executing the chatting mode, from a user. According to an embodiment, in operation 1762, the intelligent agent 145 may transmit the user input to the ASR module 210 of the intelligent server 200. According to an embodiment, in operation 1763, the ASR module 210 may convert a user input into a text and may transmit a text corresponding to the user input to the NLU module 220. According to an embodiment, in operation 1764, the NLU module 220 may verify a request for executing the chatting mode based on the text and may generate a path rule for executing the chatting mode. According to an embodiment, in operation 1765, the NLU module 220 may transmit the path rule to the intelligent agent 145 of the user terminal 100.

According to an embodiment, in operation 1771, the intelligent agent 145 of the user terminal 100 may transmit the request for executing the chatting mode to the app 141 depending on the path rule for executing the chatting mode. According to an embodiment, in operation 1772, the app 141 may execute the chatting mode. According to an embodiment, in operation 1773, the user terminal 100 may transmit or receive a message.

Figure 18:
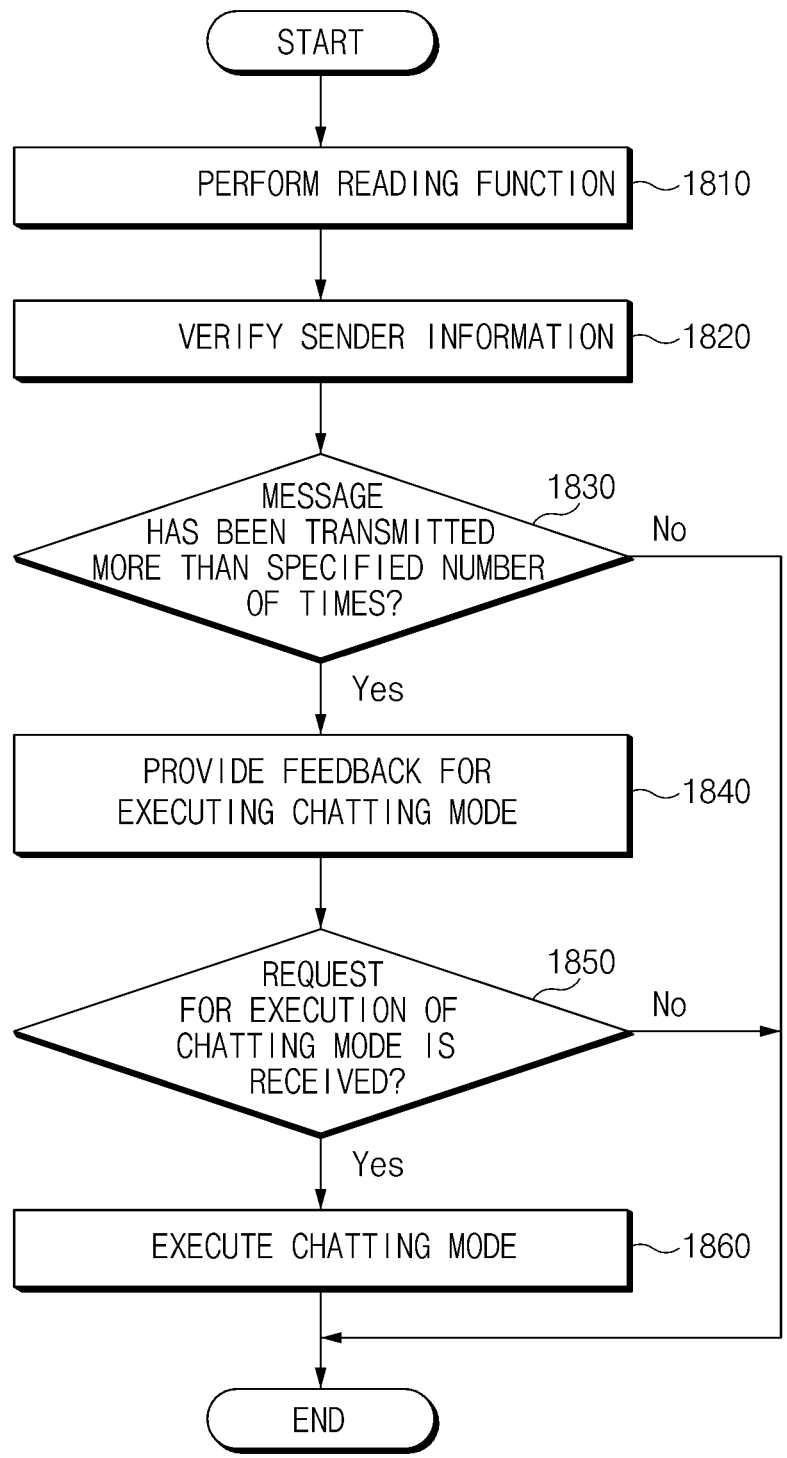
FIG. 18 is a flowchart illustrating that a user terminal verifies sender information to execute a chatting mode, according to an embodiment.

FIG. 18 is a flowchart 1800 illustrating that the user terminal 100 verifies sender information to execute a chatting mode, according to an embodiment.

Referring to FIG. 18, an operation of the user terminal 100 may be similar to the operation of changing to the chatting mode of FIG. 13. According to an embodiment, when determining the chatting mode of operation 1320 in FIG. 13 is to be utilized, the user terminal 100 may determine whether the chatting mode is to be utilized, based on sender information.

According to an embodiment, the operation of the user terminal 100 described below may be an operation performed after a processor (e.g., processor 150 of FIG. 2) executes a program module stored in memory.

According to an embodiment, in operation 1810, the user terminal 100 may perform a reading function of the received first message similarly to operation 1310 of FIG. 13.

According to an embodiment, in operation 1820, the user terminal 100 may verify the sender information of the received first message. For example, the user terminal 100 may verify the frequency of transmitting or receiving a message with the sender by using context information of the user.

According to an embodiment, in operation 1830, the user terminal 100 may determine whether a message has been transmitted (or received) to (or from) the sender more than the specified number of times. In other words, the user terminal 100 may determine whether the execution of the chatting mode is to be utilized, based on the frequency of message of transmitting or receiving a message with the sender. According to an embodiment, when the user terminal 100 does not transmit a message to the sender more than the specified number of times, the user terminal 100 may complete the execution of the reading function and may terminate the operation.

According to an embodiment, when the user terminal 100 transmits a message to the sender more than the specified number of times (Yes), in operation 1840, the user terminal 100 may provide the user with a feedback for executing the chatting mode similarly to operation 1330 of FIG. 13.

According to an embodiment, in operation 1850, the user terminal 100 may determine whether a user input for verifying the execution of a chatting mode is received, similarly to operation 1340 of FIG. 13. According to an embodiment, when not receiving the user input (No), the user terminal 100 may complete the execution of the reading function and may terminate the operation.

According to an embodiment, when receiving a user input to make a request for the execution of the chatting mode (Yes), in operation 1860, the user terminal 100 may execute the chatting mode similarly to operation 1360 of FIG. 13. As such, the user terminal 100 may transmit or receive a message according to a user input.

Figure 19A:
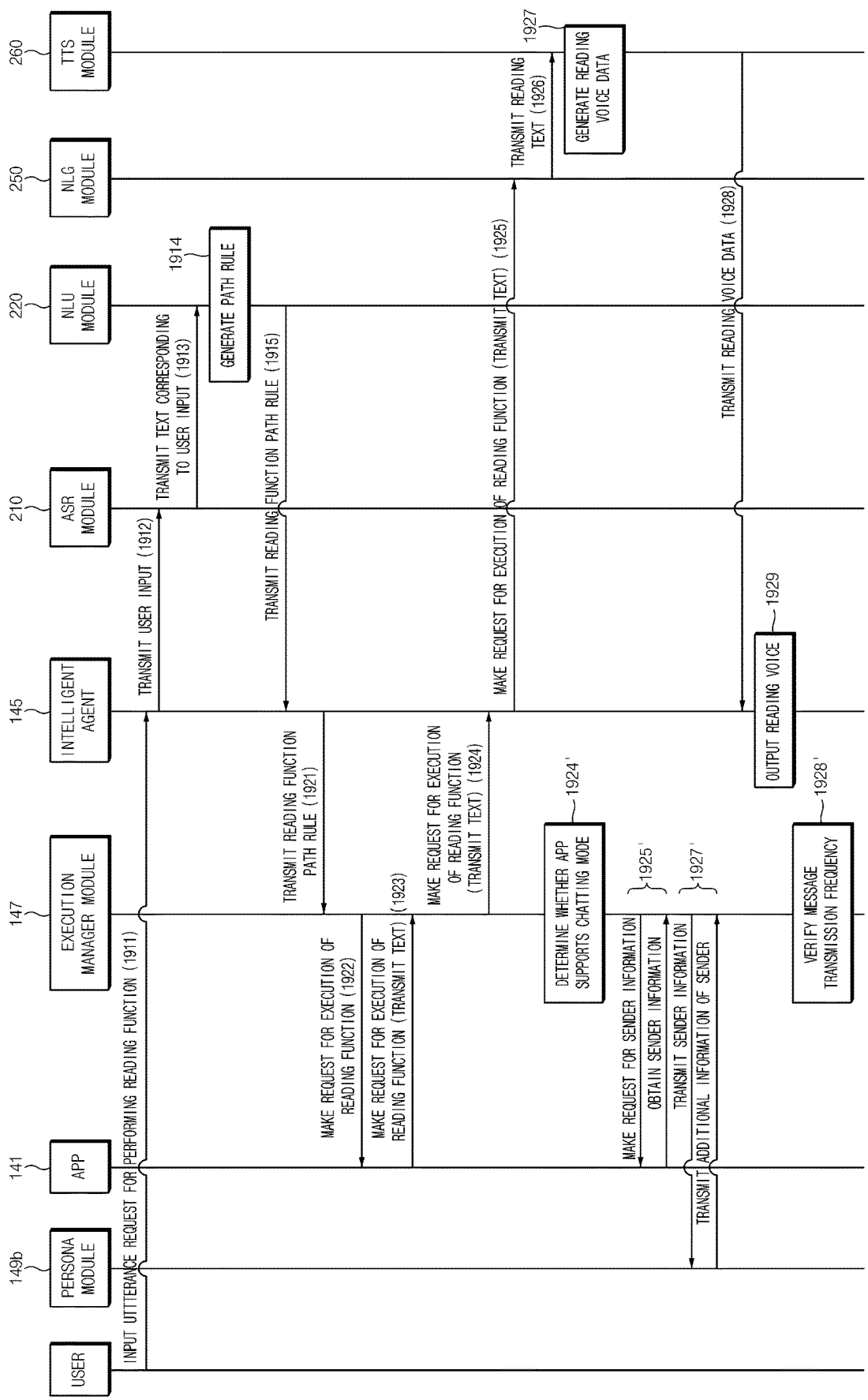
FIG. 19A, FIG. 19B and FIG. 19C are a sequence diagram illustrating that a user terminal verifies sender information to execute a chatting mode, according to an embodiment.
Figure 19B:
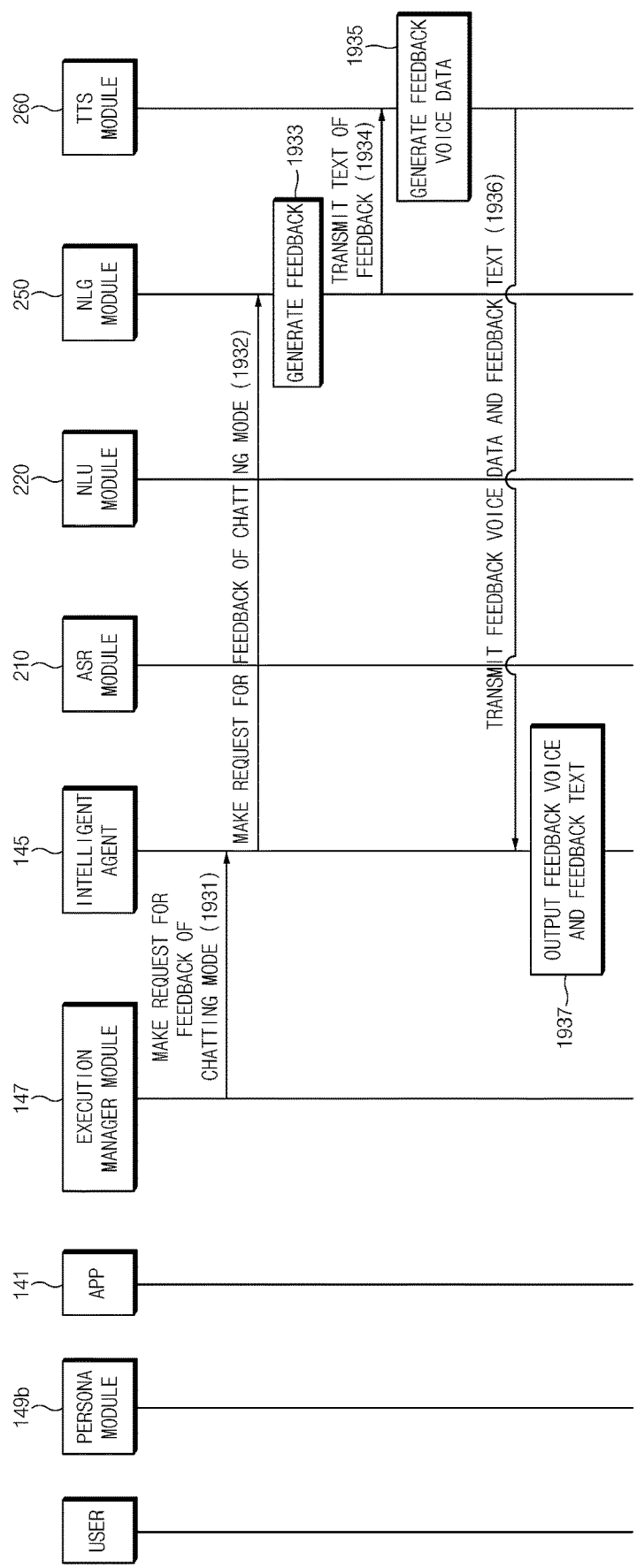
Figure 19C:
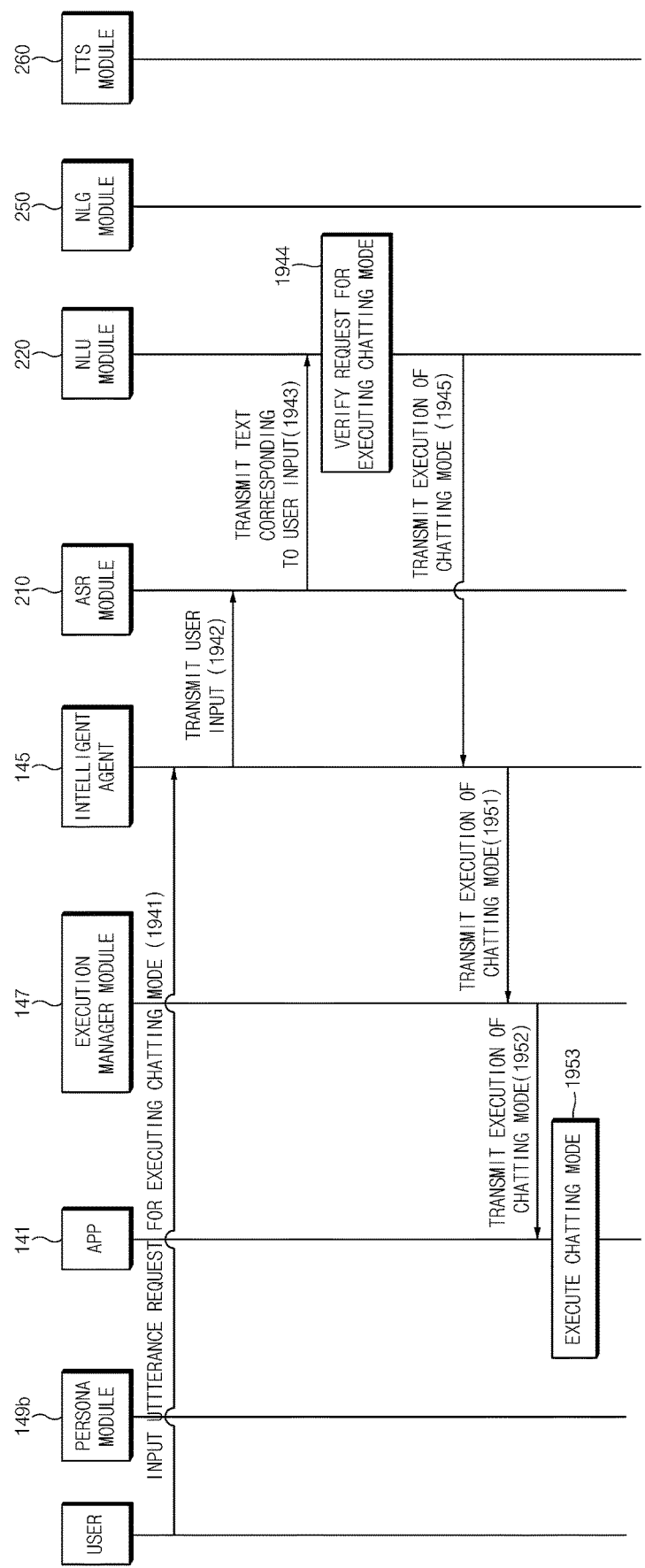

FIGS. 19A, 19B and 19C are a sequence diagram illustrating that the user terminal 100 verifies sender information to execute a chatting mode, according to an embodiment.

According to an embodiment, in operation 1911 to operation 1915, the user terminal 100 and the intelligent server 200 may operate similarly to operation 1711 to operation 1715 of FIG. 17. In other words, the user terminal 100 may receive a path rule for performing a reading function by processing a user input through the intelligent server 200.

According to an embodiment, in operation 1921 to operation 1929, the user terminal 100 and the intelligent server 200 may operate similarly to operation 1721 to operation 1729 of FIG. 17. In other words, the user terminal 100 may perform a reading function on the first message received depending on the path rule, through the intelligent server 200.

According to an embodiment, in operation 1924', the execution manager module 147 of the user terminal 100 may determine whether the chatting mode is supported, similarly to the operation 1725' in FIG. 17. According to an embodiment, in operation 1925', the execution manager module 147 may make a request for information of the sender of the received first message to the app (e.g., a message app) 141 and may obtain the information of the sender. According to an embodiment, in operation 1927', the execution manager module 147 may transmit the information of the sender to the persona module 149*b* and may obtain additional information of the sender. For example, the additional information may include information about the frequency of transmitting (or receiving) a message with the sender. According to an embodiment, in operation 1928', the execution manager module 147 may determine whether the message is transmitted more than the specified number of times. When a message is transmitted more than the specified number of times, the execution manager module 147 may provide a user with a feedback for executing the chatting mode.

According to an embodiment, in operation 1931 to operation 1937, the user terminal 100 and the intelligent server 200 may operate similarly to operation 1751 to operation 1757 of FIG. 17. In other words, the user terminal 100 may provide the user with the feedback through the intelligent server 200.

According to an embodiment, in operation 1941 to operation 1945, the user terminal 100 and the intelligent server 200 may operate similarly to operation 1761 to operation 1765 of FIG. 17. In other words, the user terminal 100 may receive, through the intelligent server 200, a path rule for executing a chatting mode by processing a user input for the feedback.

According to an embodiment, in operation 1951 to operation 1953, the user terminal 100 may operate similarly to operation 1771 to operation 1773 of FIG. 17. In other words, the user terminal 100 may execute the chatting mode.

Figure 20:
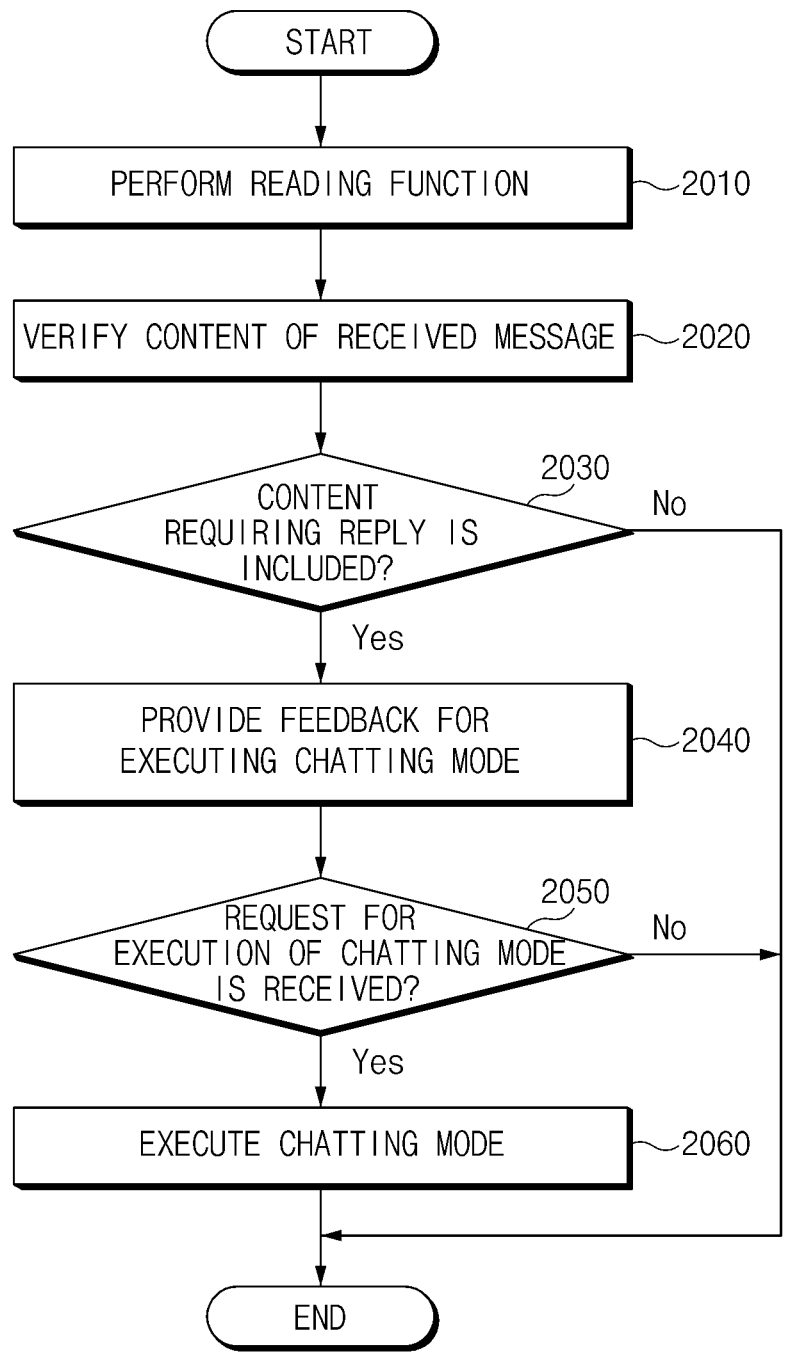
FIG. 20 is a flowchart illustrating that a user terminal verifies content of a received message to execute a chatting mode, according to an embodiment.

FIG. 20 is a flowchart 2000 illustrating that the user terminal 100 verifies content of a received message to execute a chatting mode, according to an embodiment.

Referring to FIG. 20, an operation of the user terminal 100 is similar to the operation of changing to the chatting mode of FIG. 13. According to an embodiment, in operation 1320 of FIG. 13, the user terminal 100 may determine whether the chatting mode is to be utilized, based on the content of the received message.

According to an embodiment, the operation of the user terminal 100 described below may be an operation performed after a processor (e.g., processor 150 of FIG. 2) executes a program module stored in memory.

According to an embodiment, in operation 2010, the user terminal 100 may perform a reading function of the received first message similarly to operation 1310 of FIG. 13.

According to an embodiment, when a message app supports a chatting mode (Yes), in operation 2020, the user terminal 100 may verify the content of the received first message.

According to an embodiment, in operation 2030, the user terminal 100 may determine whether the content utilizing a reply is included in the first message. In other words, the user terminal 100 may determine whether the execution of the chatting mode is to be utilized, based on the content of the received first message. According to an embodiment, when the content utilizing the reply is not included in the first message (No), the user terminal 100 may complete the execution of the reading function and may terminate the operation.

According to an embodiment, when the content utilizing the reply is included in the first message (Yes), in operation 2040, the user terminal 100 may provide a user with a feedback for executing the chatting mode similarly to operation 1330 of FIG. 13.

According to an embodiment, in operation 2050, the user terminal 100 may determine whether a user input for verifying the execution of a chatting mode is received, similarly to operation 1340 of FIG. 13. According to an embodiment, when not receiving the user input (No), the user terminal 100 may complete the execution of the reading function and may terminate the operation.

According to an embodiment, when receiving a user input to make a request for the execution of the chatting mode (Yes), in operation 2060, the user terminal 100 may execute the chatting mode similarly to operation 1360 of FIG. 13. As such, the user terminal 100 may transmit or receive a message according to a user input.

Figure 21A:
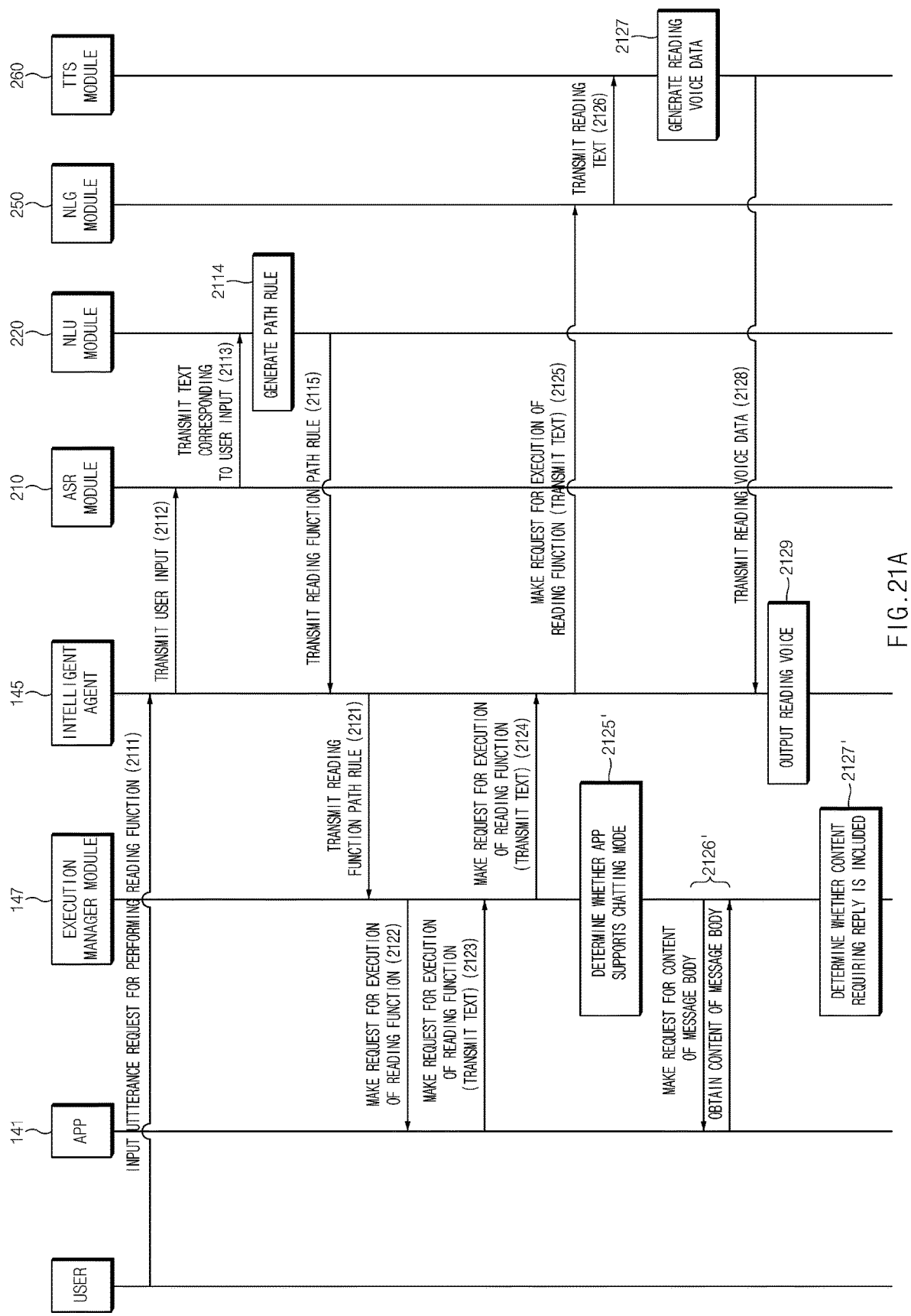
FIG. 21A, FIG. 21B and FIG. 21C are a sequence diagram illustrating that a user terminal verifies content of a received message to execute a chatting mode, according to an embodiment.
Figure 21B:
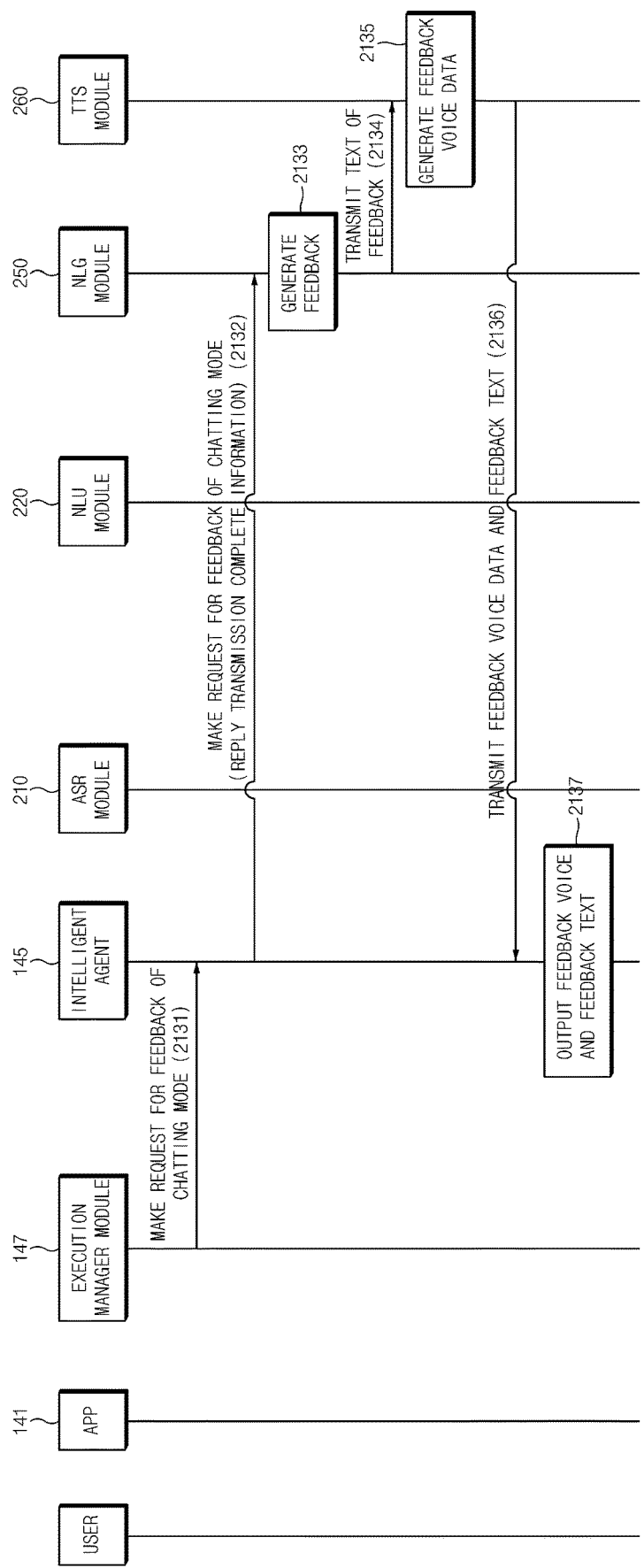
Figure 21C:
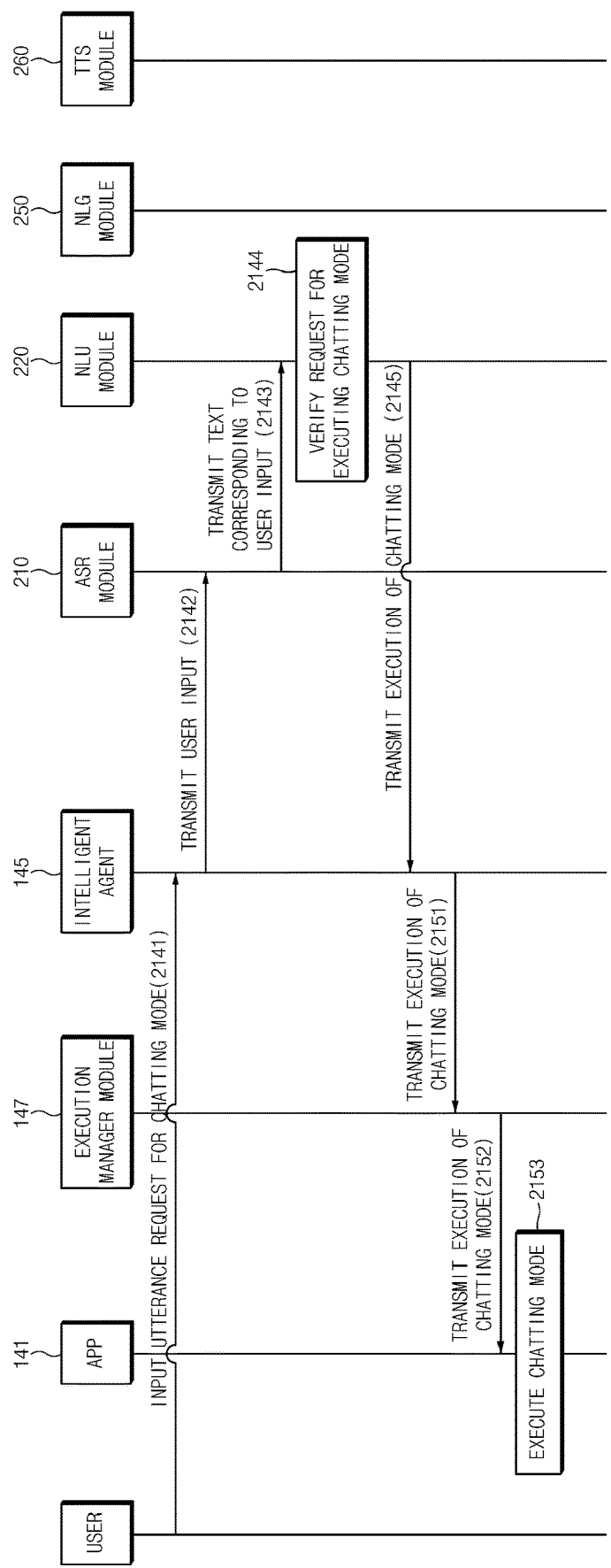

FIGS. 21A, 21B and 21C are a sequence diagram illustrating that the user terminal 100 verifies content of a received message to execute a chatting mode, according to an embodiment.

According to an embodiment, in operation 2111 to operation 2115, the user terminal 100 and the intelligent server 200 may operate similarly to operation 1711 to operation 1715 of FIG. 17. In other words, the user terminal 100 may receive a path rule for performing a reading function by processing a user input through the intelligent server 200. Further description will therefore be omitted.

According to an embodiment, in operation 2121 to operation 2129, the user terminal 100 and the intelligent server 200 may operate similarly to operation 1721 to operation 1729 of FIG. 17. In other words, the user terminal 100 may perform a reading function on the first message received depending on the path rule, through the intelligent server 200. Further description will therefore be omitted.

According to an embodiment, in operation 2125', the execution manager module 147 of the user terminal 100 may determine whether the chatting mode is supported, similarly to the operation 1725' in FIG. 17. According to an embodiment, in operation 2126', the execution manager module 147 may make a request for the content of the received first message to the app (e.g., a message app) 141 and may obtain the content of the received first message. According to an embodiment, in operation 2127', the execution manager module 147 may determine whether the content utilizing a reply is included in the first message. When the content utilizing a reply is included in the first message, the execution manager module 147 may provide a user with a feedback for executing the chatting mode.

According to an embodiment, in operation 2131 to operation 2137, the user terminal 100 and the intelligent server 200 may operate similarly to operation 1751 to operation 1757 of FIG. 17. In other words, the user terminal 100 may provide the user with the feedback through the intelligent server 200.

According to an embodiment, in operation 2141 to operation 2145, the user terminal 100 and the intelligent server 200 may operate similarly to operation 1761 to operation 1765 of FIG. 17. In other words, the user terminal 100 may receive, through the intelligent server 200, a path rule for executing a chatting mode by processing a user input for the feedback.

According to an embodiment, in operation 2151 to operation 2153, the user terminal 100 may operate similarly to operation 1771 to operation 1773 of FIG. 17. In other words, the user terminal 100 may execute the chatting mode.

According to certain embodiments of the present disclosure given with reference to FIGS. 1 to 21, the user terminal 100 may provide a user experience (UE) similar to talking between users, by executing a chatting mode capable of outputting the message received in response to a user input, through a speaker and of transmitting or receiving the message through a user utterance.

Figure 22:
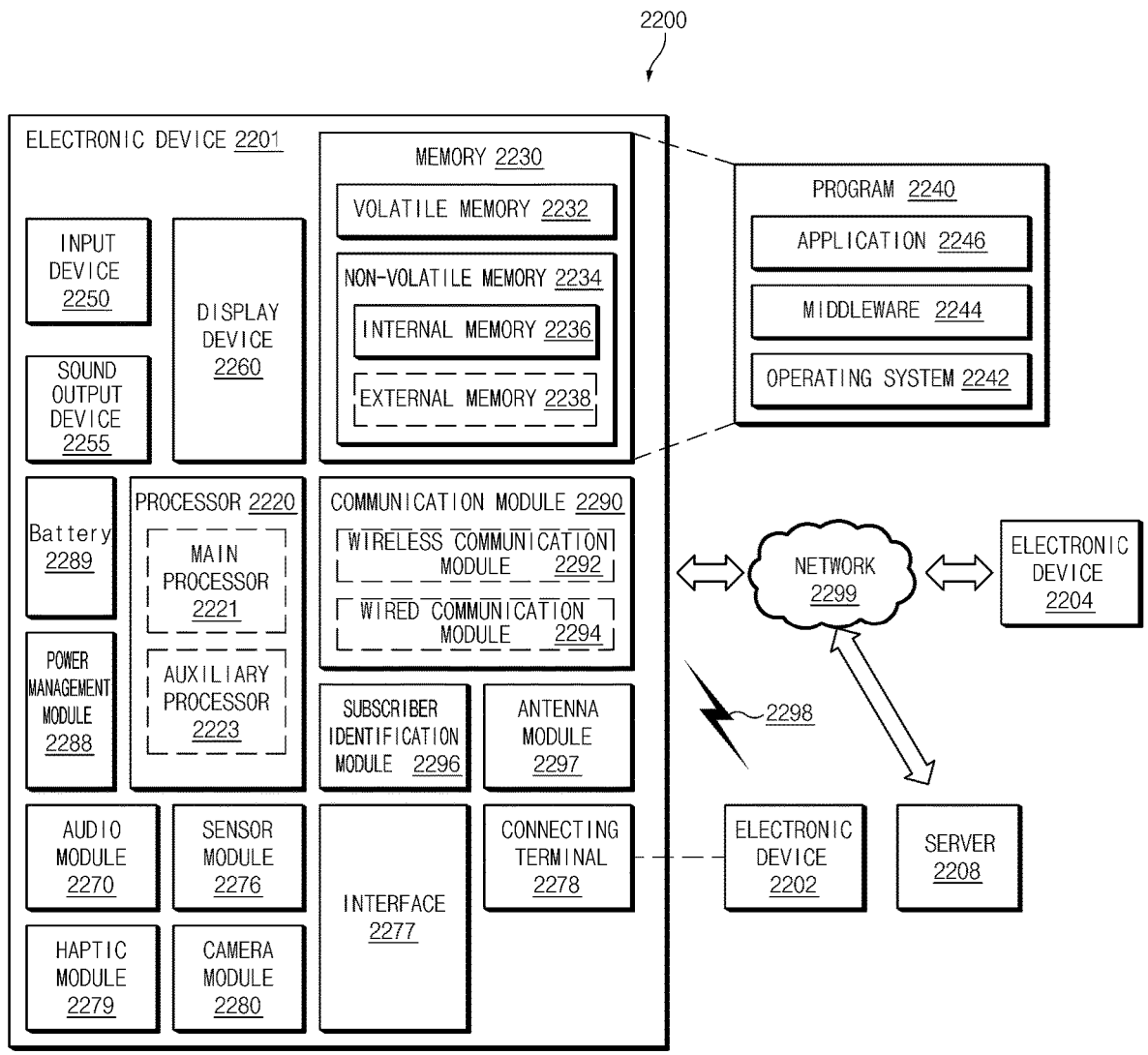
FIG. 22 is a block diagram of an electronic device in a network environment according to certain embodiments.

FIG. 22 is a block diagram illustrating an electronic device in a network environment according to certain embodiments. According to certain embodiments disclosed in the present disclosure, the electronic device may include various types of devices. For example, the electronic device may include at least one of a portable communication device (e.g., a smartphone), a computer device (e.g., a personal digital assistant (PDA), a tablet personal computers (PC), a laptop PC, a desktop PC, a workstation, or a server), a portable multimedia device (e.g., an e-book reader or an MP3 player), a portable medical device (e.g., a heart rate, blood glucose, blood pressure, or a thermometer), a camera, or a wearable device. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit. According to an embodiment, the electronic device may include at least one of, for example, a televisions, a digital video disc (DVD) player, an audio device, an audio accessory device (e.g., a speaker, a head phone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to another embodiment, the electronic device may include at least one of a navigation device, a global navigation satellite system (GNSS), an event data recorder (EDR) (e.g., a black box for vehicle/ship/flight), a vehicle infotainment device (e.g., a head-up display for vehicle), an industrial or home robot, a drone, an automatic teller's machine (ATM), a points of sales (POS) device, a measuring instrument (e.g., a water, electricity, or gas measuring instrument), or Internet of things (e.g., a light bulb, a sprinkler device, a fire alarm, a thermostat, or a street lamp). According to an embodiment of the present disclosure, the electronic device may not be limited to the above-described electronic devices. In addition, for example, as in the case of a smartphone equipped with a measurement function of personal biometric information (e.g., heartbeat or blood sugar), the electronic device may complexly provide the functions of a plurality of devices. The term "user" used herein may refer to a person who uses an electronic device or may refer to a device (e.g., an artificial intelligence electronic device) that uses an electronic device.

Referring to FIG. 22, an electronic device 2201 may communicate with an electronic device 2202 through a first network 2298 (e.g., a short-range wireless communication) or may communicate with an electronic device 2204 or a server 2208 through a second network 2299 (e.g., a long-distance wireless communication) in a network environment 2200. According to an embodiment, the electronic device 2201 may communicate with the electronic device 2204 through the server 2208. According to an embodiment, the electronic device 2201 may include a processor 2220, a memory 2230, an input device 2250, a sound output device 2255, a display device 2260, an audio module 2270, a sensor module 2276, an interface 2277, a haptic module 2279, a camera module 2280, a power management module 2288, a battery 2289, a communication module 2290, a subscriber identification module 2296, and an antenna module 2297. According to some embodiments, at least one (e.g., the display device 2260 or the camera module 2280) among components of the electronic device 2201 may be omitted or other components may be added to the electronic device 2201. According to some embodiments, some components may be integrated and implemented as in the case of the sensor module 2276 (e.g., a fingerprint sensor, an iris sensor, or an illuminance sensor) embedded in the display device 2260 (e.g., a display).

The processor 2220 may operate, for example, software (e.g., a program 2240) to control at least one of other components (e.g., a hardware or software component) of the electronic device 2201 connected to the processor 2220 and may process and compute a variety of data. The processor 2220 may load a command set or data, which is received from other components (e.g., the sensor module 2276 or the communication module 2290), into a volatile memory 2232, may process the loaded command or data, and may store result data into a nonvolatile memory 2234. According to an embodiment, the processor 2220 may include a main processor 2221 (e.g., a central processing unit or an application processor) and an auxiliary processor 2223 (e.g., a graphic processing device, an image signal processor, a sensor hub processor, or a communication processor), which operates independently from the main processor 2221, additionally or alternatively uses less power than the main processor 2221, or is specified to a designated function. In this case, the auxiliary processor 2223 may operate separately from the main processor 2221 or embedded.

In this case, the auxiliary processor 2223 may control, for example, at least some of functions or states associated with at least one component (e.g., the display device 2260, the sensor module 2276, or the communication module 2290) among the components of the electronic device 2201 instead of the main processor 2221 while the main processor 2221 is in an inactive (e.g., sleep) state or together with the main processor 2221 while the main processor 2221 is in an active (e.g., an application execution) state. According to an embodiment, the auxiliary processor 2223 (e.g., the image signal processor or the communication processor) may be implemented as a part of another component (e.g., the camera module 2280 or the communication module 2290) that is functionally related to the auxiliary processor 2223. The memory 2230 may store a variety of data used by at least one component (e.g., the processor 2220 or the sensor module 2276) of the electronic device 2201, for example, software (e.g., the program 2240) and input data or output data with respect to commands associated with the software. The memory 2230 may include the volatile memory 2232 or the nonvolatile memory 2234.

The program 2240 may be stored in the memory 2230 as software and may include, for example, an operating system 2242, a middleware 2244, or an application 2246.

The input device 2250 may be a device for receiving a command or data, which is used for a component (e.g., the processor 2220) of the electronic device 2201, from an outside (e.g., a user) of the electronic device 2201 and may include, for example, a microphone, a mouse, or a keyboard.

The sound output device 2255 may be a device for outputting a sound signal to the outside of the electronic device 2201 and may include, for example, a speaker used for general purposes, such as multimedia play or recordings play, and a receiver used only for receiving calls. According to an embodiment, the receiver and the speaker may be either integrally or separately implemented.

The display device 2260 may be a device for visually presenting information to the user of the electronic device 2201 and may include, for example, a display, a hologram device, or a projector and a control circuit for controlling a corresponding device. According to an embodiment, the display device 2260 may include a touch circuitry or a pressure sensor for measuring an intensity of pressure on the touch.

The audio module 2270 may convert a sound and an electrical signal in dual directions. According to an embodiment, the audio module 2270 may obtain the sound through the input device 2250 or may output the sound through an external electronic device (e.g., the electronic device 2202 (e.g., a speaker or a headphone)) wired or wirelessly connected to the sound output device 2255 or the electronic device 2201.

The sensor module 2276 may generate an electrical signal or a data value corresponding to an operating state (e.g., power or temperature) inside or an environmental state outside the electronic device 2201. The sensor module 2276 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 2277 may support a designated protocol wired or wirelessly connected to the external electronic device (e.g., the electronic device 2202). According to an embodiment, the interface 2277 may include, for example, an HDMI (high-definition multimedia interface), a USB (universal serial bus) interface, an SD card interface, or an audio interface.

A connecting terminal 2278 may include a connector that physically connects the electronic device 2201 to the external electronic device (e.g., the electronic device 2202), for example, an HDMI connector, a USB connector, an SD card connector, or an audio connector (e.g., a headphone connector).

The haptic module 2279 may convert an electrical signal to a mechanical stimulation (e.g., vibration or movement) or an electrical stimulation perceived by the user through tactile or kinesthetic sensations. The haptic module 2279 may include, for example, a motor, a piezoelectric element, or an electric stimulator.

The camera module 2280 may shoot a still image or a video image. According to an embodiment, the camera module 2280 may include, for example, at least one lens, an image sensor, an image signal processor, or a flash.

The power management module 2288 may be a module for managing power supplied to the electronic device 2201 and may serve as at least a part of a power management integrated circuit (PMIC).

The battery 2289 may be a device for supplying power to at least one component of the electronic device 2201 and may include, for example, a non-rechargeable (primary) battery, a rechargeable (secondary) battery, or a fuel cell.

The communication module 2290 may establish a wired or wireless communication channel between the electronic device 2201 and the external electronic device (e.g., the electronic device 2202, the electronic device 2204, or the server 2208) and support communication execution through the established communication channel. The communication module 2290 may include at least one communication processor operating independently from the processor 2220 (e.g., the application processor) and supporting the wired communication or the wireless communication. According to an embodiment, the communication module 2290 may include a wireless communication module 2292 (e.g., a cellular communication module, a short-range wireless communication module, or a GNSS (global navigation satellite system) communication module) or a wired communication module 2294 (e.g., an LAN (local area network) communication module or a power line communication module) and may communicate with the external electronic device using a corresponding communication module among them through the first network 2298 (e.g., the short-range communication network such as a Bluetooth, a WiFi direct, or an IrDA (infrared data association)) or the second network 2299 (e.g., the long-distance wireless communication network such as a cellular network, an internet, or a computer network (e.g., LAN or WAN)). The above-mentioned various communication modules 2290 may be implemented into one chip or into separate chips, respectively.

According to an embodiment, the wireless communication module 2292 may identify and authenticate the electronic device 2201 using user information stored in the subscriber identification module 2296 in the communication network.

The antenna module 2297 may include one or more antennas to transmit or receive the signal or power to or from an external source. According to an embodiment, the communication module 2290 (e.g., the wireless communication module 2292) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 2201 and the external electronic device 2204 through the server 2208 connected to the second network 2299. Each of the electronic devices 2202 and 2204 may be the same or different types as or from the electronic device 2201. According to an embodiment, all or some of the operations performed by the electronic device 2201 may be performed by another electronic device or a plurality of external electronic devices. When the electronic device 2201 performs some functions or services automatically or by request, the electronic device 2201 may request the external electronic device to perform at least some of the functions related to the functions or services, in addition to or instead of performing the functions or services by itself. The external electronic device receiving the request may carry out the requested function or the additional function and transmit the result to the electronic device 2201. The electronic device 2201 may provide the requested functions or services based on the received result as is or after additionally processing the received result. To this end, for example, a cloud computing, distributed computing, or client-server computing technology may be used.

As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Certain embodiments of the present disclosure may be implemented by software (e.g., the program 2240) including an instruction stored in a machine-readable storage media (e.g., an internal memory 2236 or an external memory 2238) readable by a machine (e.g., a computer). The machine may be a device that calls the instruction from the machine-readable storage media and operates depending on the called instruction and may include the electronic device (e.g., the electronic device 2201). When the instruction is executed by the processor (e.g., the processor 2220), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

Each component (e.g., the module or the program) according to certain embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to certain embodiments of the present disclosure may be executed sequentially, in parallel, repeatedly, or in a heuristic method. Also, at least some operations may be executed in different sequences, omitted, or other operations may be added.

While the present disclosure has been shown and described with reference to certain embodiments thereof, it will be understood by those skilled in the art that various changes in form and details may be made therein without departing from the present disclosure as defined by the appended claims and their equivalents.

What is claimed is:

1. An electronic device, comprising:
   a communication interface;
   an input interface including a microphone, an output interface including a speaker;
   at least one processor; and
   at least one memory, wherein instructions stored in the memory, are executable by the at least one processor to:
      receive a first message through the communication interface from an external device;
      in response to receiving a first user input associated with the first message through the input interface, convert first text included in the first message into speech;

output the speech using the output interface;
determine whether to execute an additional operation associated with the first message, based on at least one of a state of the electronic device, the first message, and a second user input received via the microphone; and
initiate a conversational mode for executing the additional operation based at least partly on the determination, wherein the conversational mode is a mode in which the electronic device is performing a reading function without additional user input in response to receiving a message from another user of the external device,
wherein the conversational mode is initiated when detecting that a prespecified word is included in the second user input,
wherein the prespecified word includes a command requesting generation and transmission of a reply text to the first message, and
wherein the instructions are further executable by the at least one processor to:
provide a guide for entering the conversational mode through the output interface based at least partly on the determination; and
receive a third user input for entering the conversational mode, through the input interface.

2. The electronic device of claim 1, wherein the second user input comprises:
receiving a user utterance through the microphone,
wherein the instructions are further executable by the at least one processor to:
convert the user utterance into a second text; and
transmit the second text to the external device through the communication interface.

3. The electronic device of claim 2, wherein the user utterance is converted into the second text using speech-to-text processing.

4. The electronic device of claim 1, wherein, when the prespecified word is absent from the second user input or prior to determining whether the second user input includes the prespecified word, the conversational mode is initiated for executing the additional operation based on determining that the state of the electronic device is in a prespecified state.

5. The electronic device of claim 4, further comprising:
a display; and
at least one sensor, and
wherein the instructions are further executable by the at least one processor to:
detect whether a user can view the display using at least one indicator detected by the sensor, wherein, when the prespecified word is absent from the second user input or prior to determining whether the second user input includes the prespecified word, the conversational mode for executing the additional operation is initiated when the at least one indicator indicates that the user of the electronic device cannot view the display.

6. The electronic device of claim 5, wherein the instructions are further executable by the at least one processor to:
detect, using the at least one sensor, an object proximate to a front of the electronic device from where the display is visible,
wherein, when the prespecified word is absent from the second user input or prior to determining whether the second user input includes the prespecified word, the conversational mode for executing the additional operation is initiated when the object is detected to the front of the electronic device.

7. The electronic device of claim 5, wherein, when the prespecified word is absent from the second user input or prior to determining whether the second user input includes the prespecified word, the conversational mode is initiated when the state of the electronic device indicates the electronic device is disposed at a prespecified location for a prespecified time.

8. The electronic device of claim 1, wherein, when the prespecified word is absent from the second user input or prior to determining whether the second user input includes the prespecified word, the conversational mode is initiated when detecting that another prespecified word is included in the first message.

9. The electronic device of claim 8, wherein the other prespecified word is stored in at least one memory of the electronic device and is associated with requesting a reply from a user of the electronic device.

10. A method in an electronic device, the method comprising:
receiving a first message through a communication interface from an external device;
in response to receiving a first user input associated with the first message through an input interface including a microphone, converting first text included in the first message into speech;
outputting the speech through an output interface of the electronic device including a speaker;
determining whether to execute an additional operation associated with the first message, based on at least one of a state of the electronic device, the first message, and a second user input received via the microphone;
initiating a conversational mode for executing the additional operation based at least partly on the determination;
providing a guide for entering the conversational mode through the output interface based at least partly on the determination; and
receiving a third user input for entering the conversational mode, through the input interface,
wherein the conversational mode is a mode in which the electronic device is performing a reading function without additional user input in response to receiving a message from another user of the external device,
wherein the conversational mode is initiated when detecting that a prespecified word is included in the second user input, and
wherein the prespecified word includes a command requesting generation and transmission of a reply text to the first message.

11. The method of claim 10, wherein the second user input comprises receiving a user utterance through the microphone, the method further comprising:
converting the user utterance into a second text; and
transmitting the second text to the external device through the communication interface.

12. The method of claim 11, wherein the user utterance is converted into the second text using speech-to-text processing.

13. The method of claim 10, wherein, when the prespecified word is absent from the second user input or prior to determining whether the second user input includes the prespecified word, the conversational mode is initiated for executing the additional operation based on determining that the state of the electronic device is in a prespecified state.

14. The method of claim 13, further comprising:
detecting whether a user can view a display of the electronic device using at least one indicator detected by a sensor of the electronic device, wherein, when the prespecified word is absent from the second user input or prior to determining whether the second user input includes the prespecified word, the conversational mode for executing the additional operation is initiated when the at least one indicator indicates that the user of the electronic device cannot view the display.

15. The method of claim 14, further comprising:
detecting, using the at least one sensor, an object proximate to a front of the electronic device from where a display of the electronic device is visible,
wherein, when the prespecified word is absent from the second user input or prior to determining whether the second user input includes the prespecified word, the conversational mode for executing the additional operation is initiated when the object is detected to the front of the electronic device.

16. The method of claim 10, wherein, when the prespecified word is absent from the second user input or prior to determining whether the second user input includes the prespecified word, the conversational mode is initiated when detecting that another prespecified word is included in the first message.

* * * * *